May 22, 1962     F. G. STEELE     3,035,768
ELECTRONIC DIGITAL DIFFERENTIAL ANALYZER
Filed Feb. 10, 1956     7 Sheets-Sheet 1

INVENTOR.
FLOYD G. STEELE
BY
Seymour M. Rosenberg
ATTORNEY

May 22, 1962   F. G. STEELE   3,035,768
ELECTRONIC DIGITAL DIFFERENTIAL ANALYZER
Filed Feb. 10, 1956   7 Sheets-Sheet 2

INVENTOR.
FLOYD G. STEELE
BY
Seymour M. Rosenberg
ATTORNEY

INVENTOR.
FLOYD G. STEELE
BY
Seymour M. Rosenberg
ATTORNEY

May 22, 1962 F. G. STEELE 3,035,768
ELECTRONIC DIGITAL DIFFERENTIAL ANALYZER
Filed Feb 10, 1956 7 Sheets-Sheet 5

INVENTOR.
FLOYD G. STEELE
BY
ATTORNEY

May 22, 1962  F. G. STEELE  3,035,768
ELECTRONIC DIGITAL DIFFERENTIAL ANALYZER
Filed Feb. 10, 1956  7 Sheets-Sheet 6
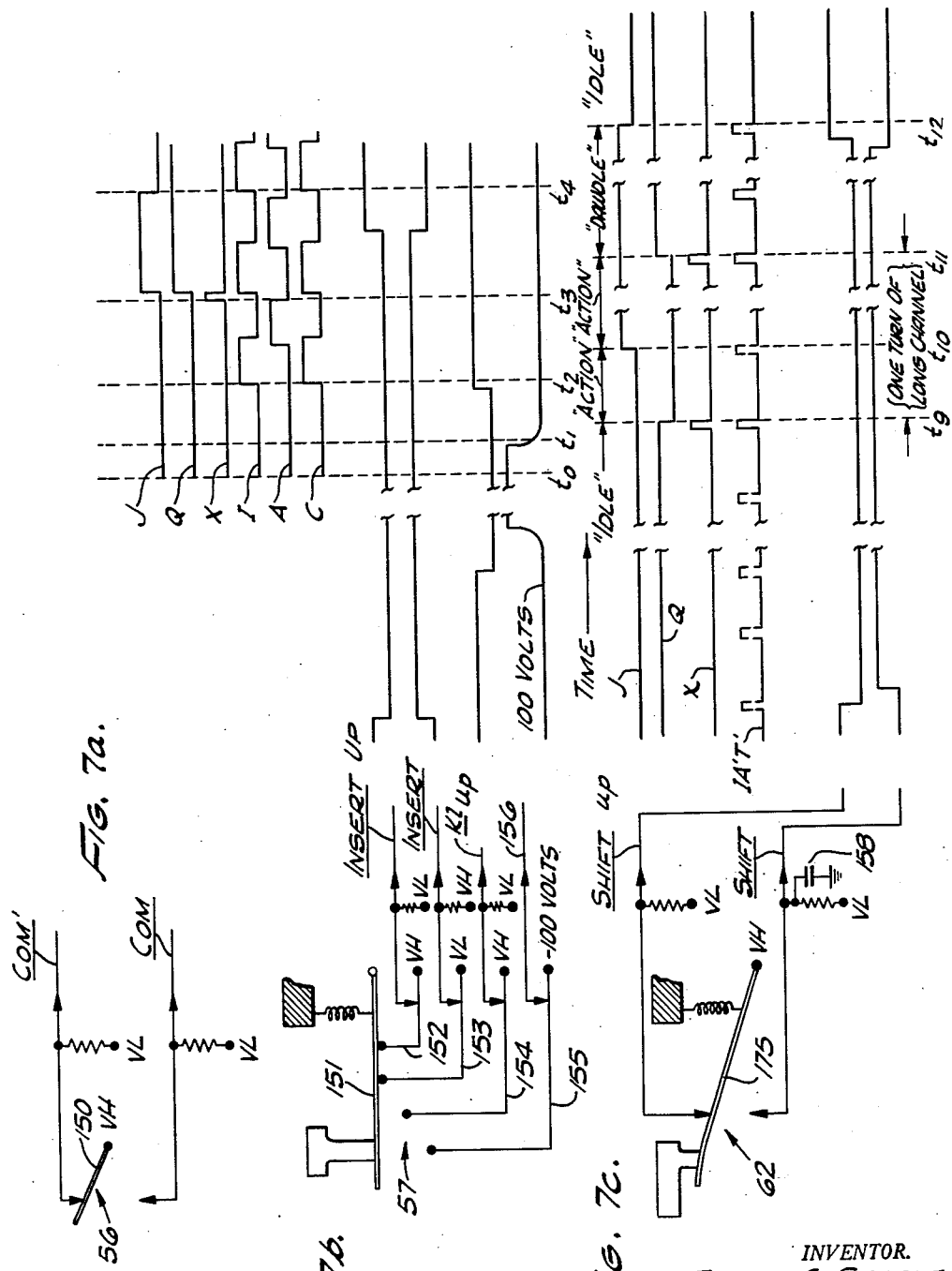
INVENTOR.
FLOYD G. STEELE
BY
Seymour M. Rosenberg
ATTORNEY United States Patent Office 3,035,768
Patented May 22, 1962

3,035,768
ELECTRONIC DIGITAL DIFFERENTIAL ANALYZER
Floyd George Steele, La Jolla, Calif., assignor to Digital Control Systems, Inc., La Jolla, Calif.
Filed Feb. 10, 1956, Ser. No. 564,683
51 Claims. (Cl. 235—152)

The present invention relates to electronic digital computers and more particularly to an electronic digital differential analyzer incorporating unique concepts which occasion greatly reduced equipment complexity and considerable gains in functional performance.

A differential analyzer is usually considered conceptually to be made up of a number of integrators with associated facilities for readily interconnecting these integrators for the solution of differential equations. Since all physical problems and most purely mathematical problems can be reduced to differential equation form, the differential analyzer in its various embodiments (mechanical, electronic analogue, and electronic digital) has become an exceedingly powerful and important tool for the analysis of such problems.

An integrator for purposes of illustration may be considered to be a device in which an initial value $y_0$ is stored and which responds to input rates $dy$ and $dx$ to produce an output rate $dz$ which is related to the input rates by the equation:

$$dz = k(y_0 + \int dy) dx = ky dx$$

where $k$ is an arbitrary scaling constant which is introduced in the operation.

In a differential analyzer, the $dz$ output rates produced by each integrator are available to other integrators for use thereby as $dx$ and $dy$ input rates. Interconnection between integrators is established in this manner, i.e. by selectively connecting the $dz$ output of each integrator to the $dx$ and/or $dy$ input of the same or other integrators. Through suitable interconnection of integrators, as herebefore mentioned, problem solutions are developed by an analyzer.

In mechanical differential analyzers of the well known Bush-Caldwell type, $dx$ and $dy$ inputs and $dz$ outputs of an integrator are provided in the form of shaft rotations and the $y$ value $y_0 + \int dy$ is stored within the integrator as the linear displacement of a shaft. Interconnection between integrators is therefore accomplished by selectively coupling the ($dz$) output shaft of each integrator to the ($dx$ and/or $dy$) input shafts of that or other integrators. In an electronic analogue differential analyzer the $y$ value of an integrator is held as a voltage stored on a capacitor and $dy$ inputs and $dz$ outputs of the integrator are provided as input and output voltages. Commonly an integrator of an electronic analogue analyzer cannot accept a variable $dx$ input but is constrained to integrate with respect to time $t$ so that $dx = dt$ for all integrators. This places great limitations on the use of electronic analogue differential analyzers. Interconnection of integrators in such an analyzer is accomplished by physically connecting conductive wires between the $dz$ output of each integrator and the inputs to which the $dz$ signal is to be applied.

In the electronic digital differential analyzer the $y$ value of an integrator is held stored in digital form as a so-called Y number. The $dx$ and $dy$ input rates and $dz$ output rates are provided as pulse coded signal trains. In a number of digital differential analyzers each signal of such a signal train has a significance of $+1$ or $-1$ scaled to the weight of the lowest order digit of the Y number. In this representation, a positive rate is indicated by an excess of $+1$ valued signals in the signal train which represents the rate and a negative rate is indicated by an excess of $-1$ valued signals while a zero rate is indicated by alternate $+1$ and $-1$ valued signals in the signal train. (It should be noted that other forms of rate representation have also been used, as for example the so-called ternary representation in which corresponding signals in two pulse coded signal trains are utilized to represent the values $+1$, 0, or $-1$.) Increase or decrease of the $y$ value of an integrator in accordance with the equation $y = y_0 + \int dy$ is accomplished by adding or subtracting 1 respectively from the Y number for each $+1$ or $-1$ valued $dy$ input signal received.

Production of $dz$ output signals by an integrator in accordance with the equation $dz = ky dx$ is accomplished through use of a so-called R number which is associated with the Y number. For each $+1$ or $-1$ valued $dx$ signal received the Y number is accordingly added to or subtracted from the R number. In this way the Y number is effectively added to the R number at the rate $dx$. Eventually the R number will overflow—that is exceed predetermined limits assigned to the R number—and the rate at which such overflows occur is taken at the output rate $dz$. Each time the R number overflows in response to addition or subtraction of the Y number the carry digit produced in the formation of the highest order digit of the R number is treated as a $+1$ valued $dz$ output signal; while on the other hand each time the R number does not overflow in response to such addition or subtraction the carry digit produced is treated as a $-1$ valued $dz$ output signal, the train of successive $dz$ signals thus provided forming the $dz$ output rate.

In view of what has already been explained, it is clear that in a digital differential analyzer an individual integrator need not necessarily exist as a separate and distinct physical entity but instead may comprise a stored Y number and an associated stored R number and apparatus for performing the following operations on these numbers in response to applied $dz$ signals: utilizing selected $dz$ signals as $dx$ and $dy$ inputs; decreasing or increasing the Y number in accordance with each $dy$ input; adding or subtracting the Y number from the R number in accordance with the $dx$ input; and producing $dz$ output signals in accordance with the resultant overflows of the R number. In the same manner a plurality of integrators may be provided by storing a plurality of pairs of Y and R numbers and operating serially upon each pair of Y and R numbers, the apparatus for performing these operations thus being time shared so that it successively services each pair of Y and R numbers.

One early multiple integrator electronic digital differential analyzer of the described type to appear commercially was the Maddida machine, which utilized a rotating magnetic drum for the storage of a plurality of pairs of Y and R numbers thereon. The Maddida machine contained nearly 100 tube envelopes (excluding power supply) and almost 1000 crystal diodes in its circuitry for operating upon these pairs of Y and R numbers. Even considering its electronic complexity, the Maddida offered great advantages over the prior art mechanical and electronic analogue analyzers.

Other digital analyzers appearing commercially since the Maddida have tended to develop in the direction of ever increasing electronic complexity partly because of their operation in the binary coded decimal number system rather than the binary number system and partly because of the engrafting of additional features upon the original Maddida design without adequate revision of the basic machine concepts to fully coordinate and integrate these additional features into a new machine design.

The present inventor has long felt that great effort should be directed at simplification rather than elaboration of the electronic complexity of electronic digital differential analyzers, hereinafter referred to as DDA's.

In accordance with this object, the present inventor conceived a novel DDA hereinafter called DDA 780 which is fully disclosed and explained in U.S. patent application 388,780, entitled "Electronic Digital Differential Analyzer," filed October 28, 1953. As disclosed, DDA 780 holds twenty pairs of Y and R numbers stored in interplexed form on a single recirculating channel (called the long channel) of a magnetic drum. The successive pairs of Y and R numbers each with associated decode ($dz$ selection) indicia are stored in respectively successive sections (integrator sections) of the long channel. The drum includes an additional recirculation channel (the short channel) in which are continuously stored the most recent $dz$ output signals produced by the twenty integrator sections. The length of the short channel corresponds to one-half of a single integrator section so that the contents of the short channel recirculate twice during each passage of an integrator section.

Because of this operation all of the $dz$ signals contained in the short channel are serially presented during each passage of an integrator section. So-called $dx$ and $dy$ decode marks are filled (selectively recorded) in the first half (decode portion) of each integrator section. These decode marks as they appear have the effect of selecting corresponding $dz$ signals from the short channel for introduction to the integrator section as $dx$ and $dy$ inputs which will control operations to be performed upon the pair of interplexed Y and R numbers stored in the second half (integrate portion) of the integrator section. In response to such $dx$ and $dy$ inputs new Y and R numbers are formed and rewritten in the integrator section in the spaces formerly occupied by the old Y and R numbers, the carry signal resulting from the formation of the highest order digit of the new R number being introduced into the short channel as the most recent $dz$ output signal of the integrator section.

To simplify in DDA 780 the introduction of such a $dz$ output signal into its appropriate position in the short channel, a so-called "$m$" mark is initially filled into and maintained in the first cell of the short channel and the $dz$ signals in the short channel are regularly precessed with respect to the "$m$" mark so that at each passage of an integrator section the appropriate position for the $dz$ output signal produced by the integrator section is immediately behind the "$m$" mark. As a result of this precession operation every other appearance of the "$m$" mark indicates that the then produced $dz$ output signal should be recorded immediately behind the "$m$" mark. The "$m$" mark is also utilized in conjunction with a two stage programming counter to identify the decode and integrate portions of each integrator section. The "$m$" mark of course appears twice during the passage of each integrator section, its first appearance indicating the beginning of the decode portion and its second appearance indicating the beginning of the integrate portion of the integrator section.

One feature of the prior art DDA 780 is that coding facilities are provided for each integrator section for selecting a plurality of $dz$ signals for introduction to the integrator section as $dy$ inputs thereto, these signals being accumulated and summed in a four stage "$\Sigma dy$" flip-flop counter, the sum ($\Sigma dy$) thus formed in the counter being serially added to the Y number upon its appearance. As a result of this feature each integrator section can be interconnected on its $dy$ input with a plurality of other integrator sections. The four stage $\Sigma dy$ counter can hold the numbers $+7$ to $-7$ and therefore each integrator section can receive $dy$ inputs from at most seven other integrator sections unless additional flip-flop stages are provided for the four stage $\Sigma dy$ counter.

Although multiple $dy$ inputs to an integrator section could be provided in DDA 780 in the described manner, no facilities were provided for summing $dx$ inputs to an integrator section. Ordinarily therefore each integrator section in DDA 780 can receive a $dx$ input from only one other integrator section. Under certain conditions a second $dx$ input can be received from a second integrator section, this second $dx$ input if a $-1$ value having no effect and if a $+1$ value having the effect of reversing the sign of the first $dx$ input. Thus in DDA 780 sign reversal of $dx$ inputs may be accomplished by initially filling one integrator section so that it continuously produces $+1$ $dz$ output signals, these output signals being utilized as second (sign reversing) $dx$ inputs for those integrator sections where sign reversal of the $dx$ input is required. The disadvantage of this method of providing sign reversal is that an entire integrator section has to be devoted to the task of producing uniform $+1$ valued sign reversal outputs, thus reducing the number of integrators available for problem solution. An additional disadvantage is that there are no facilities for providing sign reversal of $dy$, an operation which is often desirable.

Even considering its limitations DDA 780 represented a remarkable achievement from the point of view mathematical power and of reduction of electronic complexity. Only thirteen electronic flip-flop units and approximately 300 diode rectifiers were required for the mechanization of DDA 780. Thus the number of components required in DDA 780 was far fewer than the number required in prior art DDA's, resulting in high reliability and great reductions in size and cost.

However the present inventor has now conceived and developed the DDA of the present invention which incorporates a number of outstanding improvements over DDA 780. In the DDA of the present invention the component count has been considerably reduced, there being only ten flip-flop units in the DDA of the present invention as compared with thirteen in DDA 780 and there being approximately thirty percent fewer diodes required for equivalent mechanizations. Moreover in the DDA of the present invention virtually all of the above-described disadvantages of DDA 780 have been corrected and in addition a number of valuable new operating features have been incorporated.

Probably the most significant feature of improvement is that the four stage $\Sigma dy$ counter has been largely eliminated, summing of multiple $dy$ input signals being accomplished by an entirely different process which requires only two flip-flops for its mechanization and which is capable of summing an indefinite number of $dy$ inputs (rather than being limited to a maximum of seven inputs) without requiring any additional circuitry.

According to this new process for summing input signals, each integrator section which is to receive multiple $dy$ input signals has stored therein a number which is designated the $\Sigma dy$ remainder number, the digits of this remainder number being stored on the memory surface in the same way that other signals of the integrator section are recorded.

At each passage of such an integrator section, all of the multiple $dy$ signals which are to be received by that integrator section are successively added to the remainder number to form a sum, at least the highest order digit of this sum being utilized as the $dy$ input to the integrator section while the lower digits of the sum are rewritten in the memory (in the same positions within the integrator section) as the new remainder number. Effectively what has been accomplished is that plural $dy$ input signals to an integrator section are now summed and stored in the memory rather than in an external flip-flop counter, at least the highest order digit of each sum being supplied as the $dy$ input to the associated integrator section and remaining digits being stored in the memory to modify later summations. Other unique features of the summation operation will appear at later points in the present specification.

Another important improvement found in the present DDA relates to the sign reversal operation. In the present DDA each integrator section contains a cell in which a so-called sign reversal mark may be filled. If a sign reversal mark is initially placed in the integrator section each $dx$ input received by the section thereafter is automatically reversed in sign upon the appearance of the sign reversal mark. Thus in the present DDA it is no longer necessary to "use up" an integrator section to accomplish sign reversal of $dx$ inputs, sign reversal now being readily coded into the machine through use of the sign reversal marks.

It will be recalled that in DDA 780 only $dy$ inputs could be summed and only $dx$ inputs could have their sign reversed. In the present DDA it is possible to vary this normal operation so as to sum $dx$ inputs and also to apply sign reversal to $dy$ inputs. This is accomplished by use of a so-called exchange operation. When the exchange operation is utilized in connection with an integrator section, $dx$ and $dy$ inputs to that section are effectively interchanged after their formation so that the signal formed by the summation operation can serve as the $dx$ input and a signal which has previously had its sign reversed can serve as the $dy$ input to the integrator section. A single "exchange mark" filled into an integrator section orders the performance of the exchange operation for that integrator section.

Another improvement in the present DDA over DDA #780 is the elimination of a flip-flop which in DDA 780 is devoted to holding each $dx$ input throughout the addition of the associated Y and R numbers. It will be recalled that each Y number is to be added to or subtracted from the corresponding R number in accordance with the sign of the associated dx signal. Since the operation required for subtraction of two binary numbers is different from that required for addition, it is necessary to continuously know throughout the operation whether an addition or subtraction is to be performed (i.e. know the sign of $dx$ throughout the operation). However in the present DDA each Y number is stored in so-called difference notation rather than normal binary notation. Because of certain unique features of the difference notation, it has been possible to develop a process for combining the Y and R numbers in which knowledge of $dx$ is required only at the time that the first or lowest order digit of the new R number is formed. After that time knowledge of $dx$ is no longer required and the flip-flop which held $dx$ may thereafter be utilized for other purposes in combining the Y and R numbers. Moreover the use of difference notation allows considerable reduction in the number of diode rectifiers required for mechanizing the combining of the Y and R numbers.

Another important advantage of the present DDA is that accuracy of computation has been considerably increased by the incorporation in each integration of so-called "round-off" and "trapezoidal" corrections whose nature will be later explained. The inclusion of these corrections greatly reduces growth of error in the Y and R numbers caused by the limited length of these numbers and by the integration approximations which are utilized. The corrections are introduced in novel and extremely simplified manner by developing an initial carry digit which is utilized in forming the first digit of the new R number. The introduction of the correction is further simplified by using a relationship which has been discovered to exist between the corrections and the $dy$ signal.

An additional important improvement in the present DDA relates to the novel manner in which the decode and integrate portions of each integrator section are demarked by so-called "phase control marks" which are filled into every other cell of the short channel. In DDA 780 the beginnings of the decode and integrate portions were indicated by the appearance and reappearance of the "$m$" mark. In order to be continuously apprised of the phase of operation (decode or integrate) throughout the passage of an integrator section it was necessary to utilize the "$m$" mark at each appearance to change the state of two programming flip-flops to indicate the phase of operation begun, these flip-flops then providing the continuous or prolonged phase control information which is required. In the present DDA however, by providing a plurality of phase control marks distributed throughout the short channel, these marks themselves continuously (since one of them always appears in either the read or write flip-flop of the short channel) provide the required phase control information. On an automatic basis each signal applied to the write flip-flop of the short channel is reversed in value. Thus during one recirculation of the short channel (during passage of the decode portion) all of the phase control marks appearing in the read flip-flop have "0" values and during the next recirculation of the short channel (during passage of the integrate portion) have "1" values because of the described reversal of signal. In this manner the phase control marks continuously indicate by their "0" and "1" values whether the DDA is in a decode or integrate phase of operation.

Obvious advantages flow from use of the phase control marks in this manner. Since an "$m$" mark is not filled into the short channel, it is not necessary to have special filling and marking operations for the short channel. Since the described reversal of signals in the short channel is an automatic function of the DDA, initial filling of phase control marks (and also of initial "0" values of $dx$ signals) into the short channel is automatically accomplished whenever the DDA is cleared. In addition much of the logical gating in the DDA, particularly that gating which is associated with the read and write flip-flops of the short channel, is greatly simplified since identification of the "decode" or "integrate" phase of operation is already inherent in the contents of these flip-flops. Moreover all gating which in DDA 780 was associated with the setting of programming flip-flops by the "$m$" mark is eliminated in the present DDA.

An additional feature found in the present DDA which is not found in DDA 780 is that input and output facilities are provided for supplying certain of the $dz$ signals to external output units (such as graph plotters) and also for accepting input signals provided by external input units (such as curve followers, other DDA's, or other input devices). Besides the obvious convenience offered by this feature, it should also be noted that this feature allows the DDA to be linked up with other DDA's to produce exceedingly powerful computing ensembles, and also permits the DDA to be readily incorporated in digital simulation equipment.

Still another improvement which is incorporated in the DDA of the present invention is related to the manner in which signals are written into the long channel. Each signal appearing in the read flip-flop of the long channel is uniformly transferred to the write flip-flop of the channel either reversed (complemented) or unchanged in value in accordance with the high or low level of a control signal designated X. All entry of signals into the long channel is therefore accomplished by controlling the X signal. Strict adherence to this mode of operation at all times has permitted important and often surprising logical simplifications in the operations performed on the signals of the long channel.

It is therefore an object of the invention to provide a DDA having many fewer components than prior art instruments and yet providing greater mathematical power and facility of coding.

It is another object of the invention to provide a DDA, employing a cyclically operable memory device, which includes equipment for summing multiple inputs to an integrator section without requiring an electronic summation counter external to the memory.

It is an object of the invention to provide a multiple integrator DDA, employing a cyclically operable storage device, which includes apparatus for cyclically summing a plurality of $dz$ signals received by an integrator section storing lower order digits of the sum in the storage device and supplying at least the highest order digits of the sum to the integrator section as an input thereto.

It is another object of the invention to provide, in a cyclically operable magnetic memory DDA, apparatus for serially selecting at each cycle of operation a plurality of $dz$ outputs originated by predetermined integrator sections and serially adding each of these $dz$ signals to a remainder number stored in the magnetic memory, at least the highest order digit of the sum thereby produced being supplied to an associated integrator section as an input thereto while lower digits of the sum are stored in the magnetic memory as a new remainder number.

It is an object of the invention to provide a cyclically operable magnetic memory DDA which includes apparatus for summing a plurality of output signals originated by predetermined integrators, applying at least the highest order digit of the sum to an associated integrator section, and storing lower order digits of the sum in the magnetic memory.

It is an object of the invention to provide a DDA including apparatus for reversing the sign of a $dx$ or $dy$ input to an integrator section by utilization of an associated sign reversal mark stored in the memory of the DDA.

It is another object of the invention to provide a DDA in which a $dx$ or $dy$ input received by an integrator section may be uniformly reversed in sign in response to appearance of a predetermined sign reversal mark initially filled into the integrator section.

It is an object of the invention to provide a DDA including circuitry for exchanging or interchanging the normal $dx$ and $dy$ inputs to an integrator section after their formation.

It is another object of the invention to provide a DDA wherein normal dx and dy inputs to an integrator section are exchanged after their formation in response to appearance of a predetermined exchange mark filled into the integrator section.

It is yet another object of the invention to provide a DDA having facilities for summing $dz$ signals to form a normal $dy$ input to an integrator section and further including circuitry for thereafter exchanging the normal $dx$ and $dy$ inputs to produce a $dx$ input representing the summation of the $dz$ signals.

It is still another object of the invention to provide a DDA having circuitry for reversing the sign of a normal $dx$ input to an integrator section and further including means for thereafter exchanging the normal $dx$ and $dy$ inputs to produce a $dy$ input which is reversed in sign.

It is an object of the invention to provide a DDA in which Y numbers are added and subtracted from corresponding R numbers in accordance with the sign of associated $dx$ input signals wherein storage and knowledge of the value of a $dx$ input is only required at the time the first digit of an associated Y number is combined with the first digit of the corresponding R number.

It is another object of the invention to provide a DDA wherein Y numbers are stored in difference form so that additions or subtractions of a Y number from an R number in accordance with a $dx$ input signal are accomplished by identical operations varying only as they affect the first digits of the Y and R numbers, the $dx$ signal being required only at the time the first digit of the Y number is combined with the first digit of the R number.

It is an object of the invention to provide a DDA wherein trapezoidal and round-off corrections are added to an R number by forming a single carry digit which is utilized in forming the lowest order digit of the new R number.

It is another object of the invention to provide a DDA wherein a correction added to the R number of an integrator section is a single digit equal to $dy$ when $dx$ equals $+1$ and the reverse of $dy$ when $dx$ equals $-1$.

It is an object of the invention to provide means for demarking successive equal length portions of a first cyclically operable storage channel by providing a plurality of like valued information signals stored in a recirculation channel whose length is equal to one of said portions and which includes means for automatically reversing the value of each signal as it is rewritten therein, whereby the information signals appearing have alternate values at each recirculation of the short channel and thereby demark successive equal length portions of the storage channel.

It is another object of the invention to provide a DDA wherein successive decode and integrate portions of a long recirculation channel are identified by phase control marks filled into a short recirculation channel whose length is equal to one of said portions, each mark being reversed in value as it is rewritten in the short channel so that the marks appearing have alternate values at each recirculation of the short channel to thereby identify the successive decode and integrate portions.

It is an object of the invention to provide apparatus for operating upon bivalued signals stored in a recirculating channel by uniformly transferring each signal from a read point to a write point of the channel either unchanged or reversed in value in accordance with the value of an applied control signal.

It is another object of the invention to provide means for introducing successive input signal information into an information signal recirculating channel by transferring each information signal between read and write points of the channel either reversed or unchanged in value in accordance with the value of a control signal, the control signal having one value whenever an input signal has the same value as a simultaneously appearing information signal and having its other value whenever an input signal value is different from the value of a simultaneously appearing information signal.

The novel features which are believed to be characteristic of the invention both as to its organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only, and are not intended as a definition of the limits of the invention.

FIG. 4 is a functional diagram illustrating for purposes of example the contents of one integrator section of the DDA and also illustrating on a common time scale the contents of the short channel during passage of the integrator section;

FIG. 5 is a diagram illustrating the waveform of one flip-flop output signal as it would appear during passage of the integrator section shown in FIG. 4;

FIGS. 6a and 6b are circuit diagrams illustrating the construction of four gating networks and a gating circuit which are included within a gating matrix of the DDA;

FIGS. 7a through 7e are circuit diagrams illustrating seven switches which are utilized in the DDA and also presenting various waveforms which are illustrative of the operation performed by these switches.

*Mathematical Concepts*

In order to fully understand the manner in which the DDA of the present invention is mechanized, it is desirable to have some familiarity with the mathematical concepts which underlie the use of the DDA. One of the best ways of developing these concepts is to consider briefly some of the operations performed by a coder or mathematician in formulating and coding a problem for solution by the DDA.

Basically to solve a problem with the DDA what is required of a coder is that he discover how integrator sections of the DDA should be interconnected in order to develop a problem solution and also to specify initial values for the Y numbers which are contained in those integrators. Once these interconnections and initial values have been found, they are readily entered into the DDA. Interconnections between integrator sections are established by initially filling appropriate $dx$ and $dy$ decode marks into the integrator sections being utilized and initial values of the various Y numbers are entered by filling the digits of these numbers into spaces reserved therefor in the various integrator sections.

Figure 1:
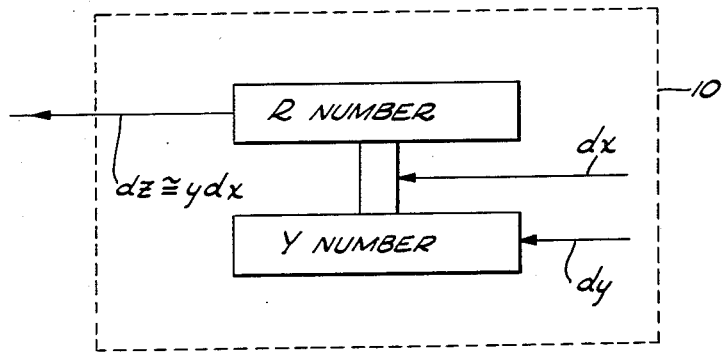
FIG. 1 is a block diagram illustrating a functional representation of an integrator section.

In accomplishing his duties a coder does not require exact knowledge as to how integrator sections are disposed and mechanized but instead can make use of diagrammatic or functional representations of the integrator sections, which are sufficient for his purposes. Such a functional representation of an integrator section, integrator diagram 10, is shown in FIG. 1 and is seen to comprise a depiction of a Y number (which represents a $y$ value), an associated R number, $dx$ and $dy$ inputs for controlling operations upon these numbers, and a $dz$ output which represents the product $ydx$. It is, of course, understood that the Y number is increased or decreased by the $+1$ or $-1$ values of each $dy$ input and that the Y number is added to or subtracted (by adding its complement) from the R number in accordance with the $+1$ or $-1$ value of each $dx$ input signal, the carry digits originating from the highest order digit of the R number serving as the $dz$ output signals.

The R and Y numbers are assumed in the following discussion to be expressed in binary form, and are assumed to each have the same number of digits. (Actually for purposes of equipment simplification, the Y number in the present DDA is stored in so-called "difference" form which is closely related to the binary form.) The Y number will be assumed to have $n$ digits to the right of the binal point and one digit (a so-called sign digit) to the left of the binal point so that the Y number can express the numbers lying between zero (0.0000 . . .) and almost two (1.1111 . . .). Since the R number has the same number of digits as the Y number, it has $n+1$ digits and for convenience the highest order digit of the R number is designated as $R_{n+1}$.

As stated before a Y number of an integrator section represents a $y$ value which is held stored in the integrator section. The relationship that exists between a Y number and the $y$ value it represents is that:

$$Y = 1 + y$$

where $y$ is allowed to have any value lying between $+1$ and $-1$. Thus if a coder decides that an initial $y$ value of $+\frac{1}{2}$ is to be filled into an integrator section, he forms the Y number 1½ (in binary 1.10000 . . .) and, after converting this binary Y number to difference form, fills it into the integrator section. The mathematical basis for the described representation of $y$ values by corresponding Y numbers will not be presented here since it has been described in detail in the prior art literature relating to DDA's (see article entitled, "The Decimal Digital Differential Analyzer," by Mendelssohn, in Aero Engineering Review, February 1954) and is also specifically described in the above-mentioned copending U.S. patent application Serial No. 388,780.

Figure 2:
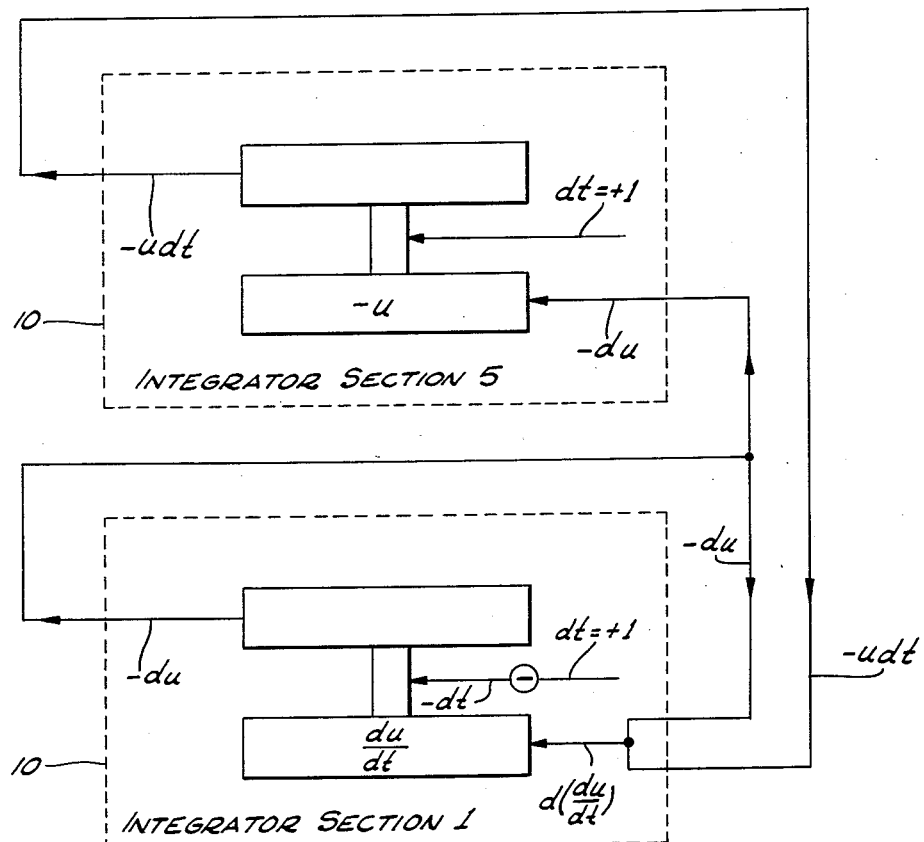
FIG. 2 is a schematic diagram illustrating the interconnection of two functionally represented integrator sections for the solution of a predetermined differential equation.

The manner in which required interconnections of integrator sections are found for solution of a specified differential equation is illustrated in FIG. 2, wherein is shown a diagrammatic set-up for the solution of the following differential equation.

$$\frac{d^2u}{dt^2} + \frac{du}{dt} + u = 0$$

As a preliminary step, this equation is rewritten as a difference equation of the form:

$$d\left(\frac{du}{dt}\right) = (-du) + (-udt)$$

To solve this equation, it is first assumed that the rate $$d\left(\frac{du}{dt}\right)$$

is available as an input to an integrator section. Then by means of successive integrations the rates $(-du)$ and $(-udt)$ are developed. These rates are then summed to form a resultant rate $(-du)+(-udt)$. Since this resultant rate is equal to $$d\left(\frac{du}{dt}\right)$$

it is utilized as such and thereby supplies the originally assumed input rate $$d\left(\frac{du}{dt}\right)$$

As shown diagrammatically in FIG. 2, only two integrator sections (integrator sections 1 and 5 for example) are required for the solution of this problem. As explained hereinabove and shown in FIG. 2, the rate $$d\left(\frac{du}{dt}\right)$$

is assumed available and is applied as a $dy$ input to integrator section 1 so that the quantity $$\frac{du}{dt}$$

is accumulated and represented by the Y number of integrator section 1.

To form the first required output rate $-du$, the rate $-dt$ must be applied as the $dx$ input to integrator section 1. It will be appreciated that the rate $dt$ is the rate of the independent variable of Equation 2 and may therefore be assigned any arbitrary value. For purposes of coding simplification it is assigned the value $+1$, for the reason that in the present DDA a $+1$ rate is always automatically available to the $dx$ input of each integrator section if no other $dx$ inputs are coded therein. The required output rate $(-du)$ is therefore obtained from integrator section 1 by utilizing this automatically available $+1$ rate as the rate $dt$ and reversing its sign (as indicated by the symbol $\ominus$) to form a $-dt$ rate which is applied as the $dx$ input to the integrator section.

To form the second required rate $(-udt)$ another integrator section (integrator section 5), is utilized. The rate $-du$ is applied as a $dy$ input to integrator section 5 so that the quantity $-u$ is accumulated therein. Since the required output rate equals $(-udt)$ the rate $dt$ must be applied as a $dx$ input to integrator section 5. Thus as shown in FIG. 2 the automatically available $+1$ rate is again utilized as the rate $dt$ and is applied to the $dx$ input of integrator section 5. The output rate produced by integrator section 5 is accordingly $-udt$. (If a $dt$ rate other than $+1$ were desired, it would be supplied, by appropriate coding, from other integrator sections or could even be supplied from an external source such as a curve follower.)

The only step remaining is to sum the two rates $-du$ and $-udt$ to form the resultant rate $(-du)+(-udt)$ and provide this resultant rate as the $dy$ input rate $$d\left(\frac{du}{dt}\right)$$

of integrator section 1. This summation as indicated in FIG. 2 is automatically accomplished within integrator section 1.

A preliminary coding diagram has therefore been completed which serves to indicate to the coder what integrator interconnection and initial conditions are required for the solution of equations. For example from FIG. 2, it is clear that for the solution of this problem appropriate initial values of $$\frac{du}{dt}$$

and $-u$ must be filled into the memory as the Y numbers of integrator sections 1 and 5 respectively. In integrator section 1 a sign reversal mark must be filled and also two $dy$ decode marks in appropriate positions to select the $dz$ outputs of integrator sections 1 and 5 respectively. As explained no $dx$ decode mark need be filled in the integrator section since the $+1$ rate is then automatically available. In the same manner referring to integrator section 5 it is clear that a $dy$ decode mark must be filled therein in an appropriate position to select the $dz$ output of integrator section 1. Once again a $dx$ decode mark is not required since the automatically available $+1$ rate is utilized.

In further coding steps the question of appropriate scaling relationship would be considered. Scaling of a problem is largely controlled by varying the effective lengths of the Y and R numbers and also through choice of initial values of Y numbers. However the scaling operations will not be discussed here since these problems are mathematically complex in nature and familiarity with them is not required for understanding of machine operation.

*Generalized Description of the DDA*

Figure 3:
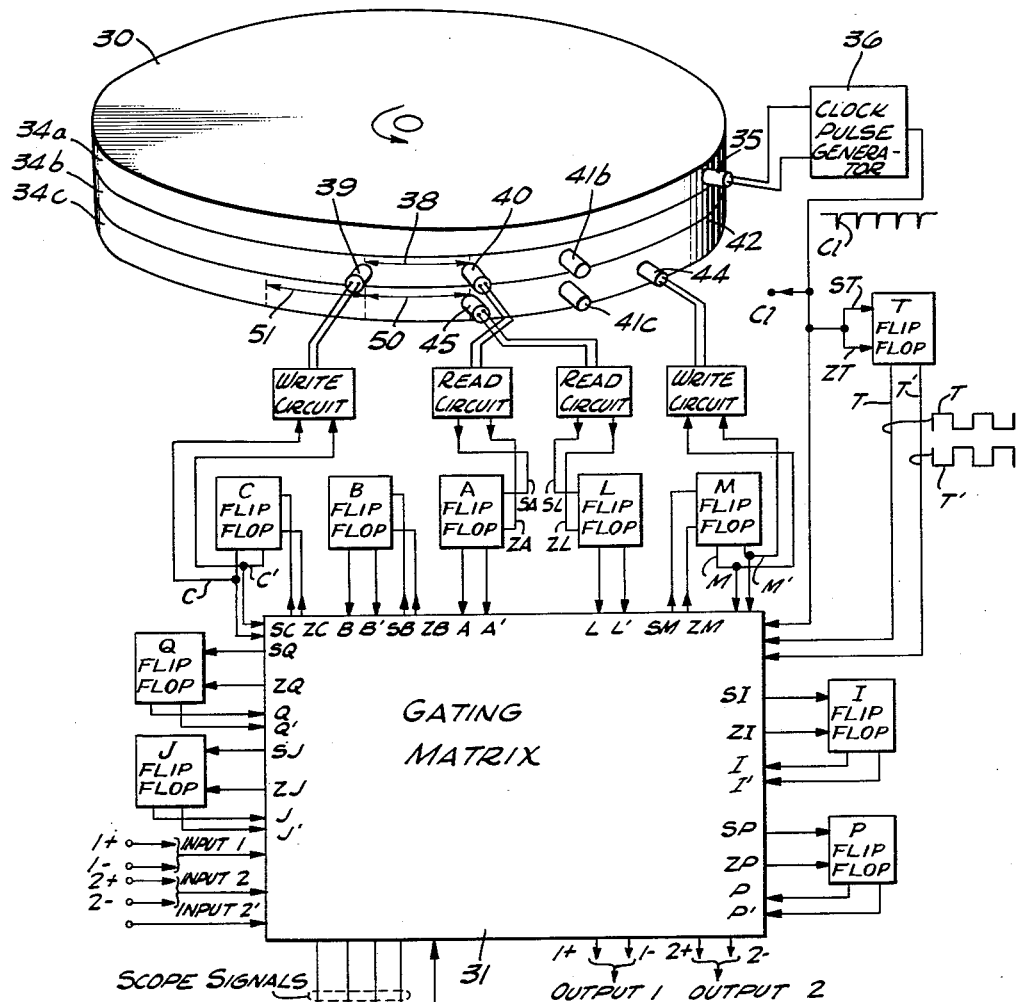
FIG. 3 is a schematic diagram in partly block form illustrating a magnetic drum DDA which is a preferred embodiment of the present invention.
Figure 3:
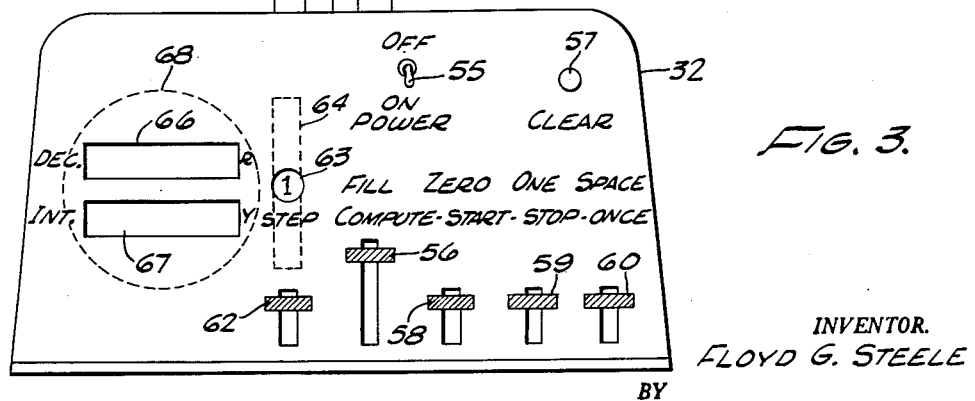

Referring now to FIG. 3, there is shown a magnetic drum DDA according to the present invention which is seen to comprise as its basic components a rotatable magnetic drum 30 with associated magnetic transducers and read-write circuitry for reading and writing magnetic signals on the surface of the drum; a plurality of flip-flops designated A, B, C, L, M, I, P, Q, J and T respectively; a gating matrix 31 which receives output signals from the flip-flops and applies resultant input signals to the flip-flops; and a control panel 32, including a plurality of control switches which are utilized for generating electrical signals. These signals, called switch signals are also applied to gating matrix 31 to initiate and control the various operations of the DDA.

As shown in FIG. 3, drum 30 has three magnetizable tracks or bands 34a, 34b and 34c established about its periphery.

In track 34a, a timing signal waveform or so-called clock pulse waveform is permanently recorded, this waveform comprising a large plurality of evenly spaced timing signals recorded about the periphery of the drum as successively adjacent regions or cells of the drum surface which are alternately magnetized in opposite directions of polarization. Upon rotation of drum 30 each passage of a recorded timing signal beneath a magnetic recording or transducer "read" head 35, which is positioned adjacent track 34a, causes the head to produce a corresponding electrical signal, these electrical signals being applied to a wave shaping circuit or clock pulse generator 36 which converts the signals to an output train of sharp electrical "clock" pulses $Cl$. Each appearance of a clock pulse $Cl$ indicates that one of the magnetized timing cells on track 34a is passing beneath head 35. The clock pulses $Cl$ are utilized to synchronize almost all of the operations of the computer, transitions in the electronic 1 or 0 states of the flip-flop circuits being made only upon the appearance of a clock pulse signal, and recording in magnetic form of bivalued 1 or 0 signals upon tracks 34b and 34c being synchronized with the clock pulses in such a manner that these tracks are effectively divided into discrete cells, corresponding to the timing track cells, in which a single bivalued signal may be recorded as one of two alternate directions of magnetic polarization.

In track 34b, a recirculating binary information channel (called the "short channel") having a storage capacity of forty bivalued signals is maintained over that segment of the track, designated segment 38, lying between a "write" head 39 and a "read" head 40 which are positioned adjacent track 34b. In track 34c a second recirculating channel, designated the "long channel" having a storage capacity of 1600 "bits," is maintained over that segment of track 34c, designated segment 42, lying between a "write" head 44 and a "read" head 45 which are positioned adjacent track 34c. Tracks 34b and 34c are also provided with "erase" heads 41b and 41c, respectively, for erasing the signals stored in the channels after such signals have passed "read" heads 40 and 45.

A recirculating binary information channel is a type of storage device, well known to those skilled in the art, in which bivalued signals recorded at a "write" point are transported after a predetermined delay to a "read" point, each signal received at the "read" point being reapplied to the "write" point, so that in operation signals recorded at the "write" point circulate and recirculate through the information loop thus established.

For the "short channel" of the present invention, the path of information flow for signals recorded on track 34b by "write" head 39 is briefly as follows: 1 and 0 signals so recorded pass from "write" head 39 to "read" head 40 and thence pass by means of a "read" circuit 46 to flip-flop A where they appear as corresponding electrical 1 or 0 states of flip-flop A. From flip-flop A the signals are ordinarily transferred, through operation of gating matrix 31, directly to flip-flop C. In the transfer from flip-flop A to flip-flop C the signals are reversed in value, so that 1 and 0 signals appearing in flip-flop A appear next in flip-flop C as 0 and 1 signals respectively. Flip-flop C in turn controls a "write" circuit 47 which is coupled to "write" head 39, and in this manner flip-flop C is effective for writing or recording beneath "write" head 39 the signals transferred to the flip-flop, thereby completing a loop for recirculation of information signals. In certain operations of the computer, flip-flop B is inserted within this recirculation loop between flip-flops A and C, so that signals pass from flip-flop A to flip-flop B before being transferred, reversed in value, to flip-flop C.

As stated hereinbefore the above-described "short channel" has a storage capacity of 40 bivalued signals or bits, the total time required for a bit to traverse the recirculation loop therefore being equal to 40 timing intervals as demarked by clock pulses $Cl$. In the particular embodiment of the invention shown in FIG. 3 the spacing between "write" head 39 and "read" head 40 corresponds very nearly to 40 cell spaces, each signal therefore being delayed substantially, the entire 40 timing intervals in passing from "write" head 39 to "read" head 40, negligible additional delay encountered by the signal as it traverses the remainder of the "short channel" recirculation loop through flip-flops A and C. Figuratively speaking flip-flops A and C act as windows through which the respective contents of the magnetic cells passing beneath "read" head 40 and "write" head 39 are simultaneously displayed in electrical form.

In the same manner, referring now to the "long channel" which has a storage capacity of 1600 bits, the length of segment 42 extending from "write" head 44 to "read" head 45 is substantially 1600 cells. The recirculation loop for a single passing from "write" head 44 to "read" head 45 is completed through a "read" circuit 48, flip-flop L, flip-flop M and finally through a "write" circuit 49 back to "write" head 44. Each signal passing from "write" head 44 to "read" head 45 is thus transferred by means of "read" circuit 48 to flip-flop L and thence through operation of gating matrix 31 to flip-flop M which applies the signal through write circuit 49 to write head 44 to thereby complete the recirculation loop. In each transfer of a bivalued signal from flip-flop L to flip-flop M, the signal is either transferred unchanged or complemented in value in accordance with the values of signals applied to gating matrix 31 by the computer flip-flops. In certain of the operations of the computer known as the "fill" operations flip-flop B is utilized to control gating matrix 31 so that signals transferred between flip-flops L and M are effectively passed from L to B and thence to M.

In operation of the specific embodiment hereinbelow described of the DDA of the present invention, the 1600 cells of the long channel are divided into twenty equal "integrator sections," each integrator section having twice the length of the short channel and therefore comprising eighty consecutive cells of the long channel. In each individual integrator section are stored all of the signals relating to the operation of a single integrator. The nature of these stored signals will be explained in more detail hereinbelow. However it will be understood at this time that each integrator section includes signals representing a pair of associated Y and R numbers and also so-called "$dx$ decode signals" and "$dy$ decode signals" which in operation control the introduction of $dz$ information into the integrator sections. The first forty cells, denoted the "decode portion," of each integrator section are utilized for the storage of the $dx$ and $dy$ decode signals; while the remaining forty cells, denoted the "integrate portion," of each integrator section are utilized for the storage of the signals representing the associated pair of Y and R numbers. Thus the decode and integrate portions each have the same length (forty cells) as the short channel.

Within the forty cells of the short channel are recorded bivalued signals representing the $dz$ overflows arising from the twenty integrator sections. Since the short channel has the same length as a decode portion in the long channel, all of the $dz$ representing signals in the short channel will pass beneath read head 40 during the time required for a decode portion to pass in the long channel beneath read head 45. The short channel will then, accomplish another "turn" (another complete circulation of its stored signals) as the succeeding integrate portion passes beneath the read head. Thus the short channel "turns" twice during the passage of an integrator section, turning once for the passage of a decode portion and turning again for the passage of the succeeding integrate portion.

To assist in understanding this operation, it is helpful to refer again to FIG. 3 and to assume for purposes of example that an integrator section is just beginning to travel past read head 45, the first cell of the integrator section then lying beneath read head 45 and the signal contained therein simultaneously appearing in flip-flop L. The decode portion of the integrator section will then extend over a segment 50 of track 34c corresponding in length to segment 38 of the short channel; while the succeeding integrate portion would extend over an immediately succeeding equal length segment 51 of track 34c.

Figures 4, 5:
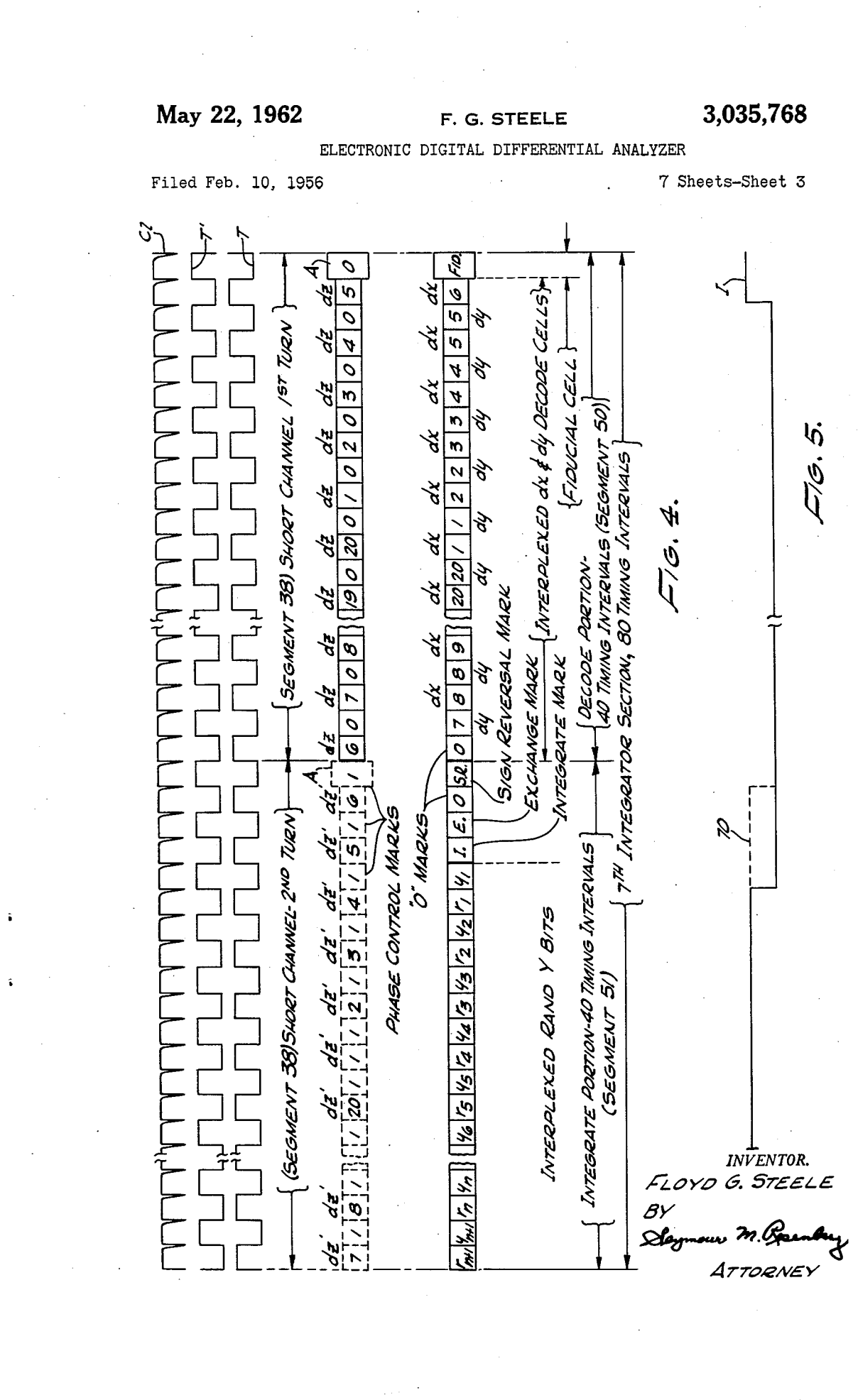

Referring now to FIG. 4 there is shown a diagram which symbolically represents the contents of segments 38, 50 and 51 for that situation in which the seventh integrator section of the twenty integrator sections is just beginning to pass beneath read head 45. Since signals stored in the serially appearing cells of the short and long channels will be serially available in the same order in flip-flops A and L respectively, the diagram of FIG. 4 may also be thought of as symbolically displaying on a right-to-left scale, the successive signals which will be contained in flip-flops A and L during the eighty timing intervals required for the passage of the eighty cells of the integrator section beneath read head 45.

In accordance with this time datum there are also shown in FIG. 4 one voltage waveform representing the clock pulses Cl which demark the successive timing intervals and a pair of waveforms representing output signals produced by flip-flop T in response to the application thereto of the successive clock pulses Cl. These output signals produced by flip-flop T are designated signal T and signal T' respectively. As illustrated in FIG. 3, each clock pulse Cl is simultaneously applied to both input conductors (designated ST and ZT respectively) of flip-flop T, this having the effect it will be understood of reversing the electrical state of flip-flop T upon each appearance of a clock pulse Cl. Thus flip-flop T has alternate "0" and "1" electrical states during successive timing intervals. These alternating electrical states of flip-flop T are manifested externally by the voltage levels of the complementary output signals T and T' produced by flip-flop T, signal T having a high voltage level whenever flip-flop T is in its "1" state and a low voltage level when flip-flop T is in its "0" state, while on the other hand complementary signal T' has respectively corresponding low and high voltage levels.

A similar nomenclature will be adopted for designating the pairs of complementary output signals produced respectively by the other flip-flops in the DDA, flip-flops A, B and C for example each producing a corresponding pair of complementary output signals A and A', B and B', C and C' respectively, each pair of output signals indicating the state of the associated flip-flop in the described manner. For purposes of clarity, all conductors will be normally designated in terms of the signals applied over the conductors, the conductor for example over which signal T is applied being referred to as conductor T. Moreover it will be understood that each flip-flop has a pair of set and zero input conductors designated the S and Z input conductors respectively and further designated by an alphabetical postscript corresponding to the alphabetical designation of the flip-flop. For example ST and ZT, SA and ZA, SB and ZB are the pairs of input conductors associated with flip-flops T, A and B respectively and the input signals applied over these conductors are correspondingly designated as the signals ST and ZT, SA and ZA and SB and ZB respectively. As described above simultaneous application of set (S) and zero (Z) input signals to a flip-flop has the effect of reversing the state of the flip-flop. Application of only the set (S) signal to the flip-flop has the effect of "setting" the flip-flop to its "1" state while application of only the zero (Z) signal to the flip-flop has the effect of "zeroing" the flip-flop to its "0" state.

Returning again to a consideration of FIG. 4 it is seen referring to the short channel, that during the first turn of the short channel the first cell of the short channel and alternate cells thereafter contain phase control marks, each representing a binary "0" while the second cell and consecutively alternate cells thereafter contain so-called $dz$ signals representing the $+1$ or $-1$ $dz$ overflow digits arising from the twenty integrator sections.

These $dz$ signals will be hereinafter designated as $dz_1$, $dz_2 \ldots dz_{20}$, where the subscript number refers to the number of the integrator section from which the $dz$ signal arises. As shown in FIG. 4, during the first turn of the short channel corresponding to passage of the decode portion of integrator section 7, $dz_5$ appears in the second cell of the short channel, the successively thereafter appearing $dz$ signals being $dz_4$, $dz_3 \ldots dz_1$ and then $dz_{20}$, $dz_{19} \ldots dz_6$. A $+1$ or $-1$ value of a $dz$ overflow digit arising from an integrator section is represented by a "1" or "0" value respectively of the corresponding $dz$ signal. As will be later explained, at the time that integrator section 7 begins its passage, the new $dz_6$ signal arising from the immediately preceding integrator section 6, is available in flip-flop B, while as shown in FIG. 4, the old $dz_6$ signal which must now be replaced, is in the last cell of the short channel (first turn). In the compute operations of the present computer, during this first turn of the short channel, each of the $dz$ signals in the channel is delayed two timing intervals by storage in flip-flop B so that they are precessed or shifted back two cell spaces with respect to their original positions as they are rewritten in the short channel. The new $dz_6$ signal is inserted in the cell formerly occupied by $dz_5$ and the old $dz_6$ signal is not rewritten and is thereby removed from the short channel.

Thus as shown in FIG. 4 during the second turn of the short channel $dz_6$ (actually $dz_6'$) appears in the second cell of the short channel and $dz_7$ (actually $dz_7'$) appears in the last cell of the short channel. The $dz$ signals are not processed during the second turn of the short channel and therefore the appearance of the short channel will be unchanged as it begins its first turn during passage of the decode portion of the succeeding eighth integrator section (not shown). Thus during passage of the eighth integrator section the $dz_7$ signal will be appropriately positioned for removal from the short channel (at a time when a new $dz_7$ will be available from integrator section 7) in the same manner that, during passage of the seventh integrator section, the old $dz_6$ signal was positioned for removal from the short channel (at a time when a new $dz_6$ was available from integrator section 6).

As illustrated in FIG. 4, the short channel is synchronized with respect to flip-flop T in such manner that at each appearance of a $dz$ signal flip-flop A output signal T is at a high "1" representing level while at each appearance of a phase control signal in flip-flop A, output signal T is at a low level (and therefore signal T' is at a high "1" representing level). Because of the hereinbefore described reversal of signals in transferring from flip-flop A to flip-flop C (and from B to C) each of the $dz$ signals and phase control marks is reversed in value as it is rewritten through flip-flop C into the short channel. Thus as illustrated in FIG. 4, during the second turn of the short channel, each phase control mark appearing in flip-flop A has a binary "1" value, while each of the $dz$ overflow signals appearing in flip-flop A are also reversed in value appearing therefore during the next turn of the short channel as complementary signals $dz'$. The described reversal of the phase control marks at each turn of the short channel is one of the features of the present invention. Because of this described operation, the phase control marks always have a "0" value during the decode portion of an integrator section and have a "1" value during the integrate portion of each integrator section. The phase control signals thus unequivocally indicate during computation whether the computer should be in a decode phase of operation or an integrate phase of operation.

For example, a decode phase of operation is indicated at any time T' (a timing interval during which signal T' is high) by the appearance of a "0" valued phase control mark in flip-flop A, while during any time T a decode phase of operation is indicated by the appearance of a "1" valued phase control mark in flip-flop C. (Since each phase control mark is reversed in value on being transferred from flip-flop A to flip-flop C.) In the same manner as integrate phase of operation is indicated during any time T' by the appearance of a "1" valued phase control signal in flip-flop A and at any time T by the appearance of a "0" valued phase control mark in flip-flop C. This system for identification of decode and integrate portions by means of the alternately reversing values of the phase control marks allows considerable savings in equipment in comparison with that required in the prior art to accomplish the same function.

Referring now to the long channel and examining first the decode portion of integrator section 7 shown in FIG. 4, it is seen that the first cell of the decode portion (called the fiducial cell) is reserved for a so-called fiducial mark, this being a "1" valued signal appearing in operation in the first cell of only one of the twenty integrator sections. Excluding the last cell of the decode portion which is always filled with a permanent "0" valued mark, the remaining cells of the decode portion are alternately $dx$ and $dy$ decode cells which are used for storing so-called $dx$ and $dy$ decode marks, respectively. As shown in FIG. 4 each decode cell is numbered so that it bears the same number as the preceding $dz$ signal. Thus the $dy$ decode cell which is preceded by $dz_5$ is designated $dy_5$ decode cell and the following $dx$ decode cell is designated $dx_5$ decode cell.

A $dx$ decode mark is a "1" valued signal which controls the selection of a corresponding $dz$ signal from the short channel for introduction to the integrator section as a $dx$ input. For example a $dx$ decode mark in cell $dx_5$ has the effect of selecting the $dz_5$ signal. Normally a $dx$ decode mark will be filled if at all into only one of the $dx$ decode cells.

A $dy$ decode mark is a "1" valued signal which may be selectively filled into one or a plurality of $dy$ decode cells. Each $dy$ decode mark has the effect of selecting the corresponding $dz$ signal from the short channel, these $dz$ signals being summed to form a $dy$ input to the integrator section. The value of such a sum is called the summation $dy$ (abbreviated $\Sigma dy$). The highest order digit of $\Sigma dy$ is carried over to the integrator portion to serve as a $dy$ input thereto. The remaining lower digits of $\Sigma dy$ are viewed as comprising a so-called remainder number, the digits of this remainder number being stored in all but the first of those $dx$ decode cells which immediately follow $dy$ decode marks. For example referring to FIG. 4, if $dy$ decode marks had been filled into the $dy$ decode cells 5, 4, 2 and 1 then the $dx$ decode cells 4, 2 and 1 would be reserved for the digits of the remainder number. Signals stored in these cells of the operation of the DDA preferably represent the digits of the remainder number (the lower digits of $\Sigma dy$) in what is known as "dinary" notation. The manner in which the remainder number is represented by bivalued signals in the dinary notation will be described at a later point in this specification.

Referring next to the integrate portion of the integrator section shown in FIG. 4, it is seen that the first cell of the integrate portion is reserved for so-called "sign reversal mark," a "1" valued signal which may be selectively filled into this cell. The second cell of the integrate portion always contains a "0" mark and additional "0" marks may be filled into succeeding cells to thereby establish the digit length of the Y and R numbers which are stored in the integrate portion. In the cell following the last of such "0" marks, a so-called "exchange mark" may be selectively filled. In the cell following the exchange mark there may be filled a so-called "integrate mark," a "1" valued signal which is provided to indicate that the remaining cells of the integrate portion will contain signals representing the digits of the Y and R numbers associated with the integrator section. Thus as shown in FIG. 4, the remaining cells of the integrate portion are filled with alternate $y$ signals and $r$ signals designed $y_1$, $y_2 \ldots y_n$, $y_{n+1}$ and $r_1$, $r_2 \ldots r_n$, $r_{n+1}$ respectively, the $y$ signals representing the associated Y number and $r$ signals representing the associated R number of the integrator section. Insofar as the $r$ signals are concerned, the successive signals $r_1 \ldots r_{n+1}$ represent the successive digits in ordinary binary notation of the R number. The signal $r_1$ for example, is a "1" or "0" signal representing $1.2^{-n}$ or $0.2^{-n}$ respectively.

In operation of the computer of the present invention, the Y number is not represented, however, in conventional binary notation, but is represented in so-called difference notation, the signals $y_1 \ldots y_n$ thereby indicating the successive digits of the Y number in this difference notation and the signal $y_{n+1}$ indicating the sign digit of the Y number in this notation. The nature of the difference notation will be explained at a later point in this specification, it being sufficient at this point to state that the Y numbers are initially filled and thereafter generated in this notation.

It will be understood that to place the DDA in operation for solution of a new problem it is necessary to fill into each integrator section $y$ and $r$ signals corresponding to desired initial values of the Y and R numbers for that integrator section and also to fill appropriate signals ($dx$ decode marks, $dy$ decode marks and possibly signals representing initial values of the remainder number of $\Sigma dy$) into the $dx$ and $dy$ decode cells.

Since facilities must be provided for filling signals into the $dx$ and $dy$ decode cells and for filling $y$ and $r$ signals into each integrator section, the same facilities are utilized for filling the remaining cells of each integrator section with appropriate marks, as shown in FIG. 4. In addition phase control marks and initial values of the $dz$ signals must be filled into the cells of the short channel. All of these filling operations may be performed by an operator through utilization of the control switches provided on switch panel 32 shown in FIG. 3.

*General Description of "Fill" Operations*

The first steps ordinarily performed by an operator in placing the computer into operation for the solution of a new problem, is to switch on a power switch 55 thereby supplying electrical power to the computer, and then to place a two-position fill-compute lever switch 56 at its upper or fill position as shown in FIG. 3. Lever switch 56 is always placed in its fill position when filling operations are to be performed and placed at its lower or compute position immediately before compute operations are to be begun.

Next a pushbutton type clear switch 57 is depressed, this having the effect of setting each of the computer flip-flops to its "0" state and also of erasing all signals recorded in the long and short channels, thereby effectively removing from the computer all old information remaining in the computer from previous problems. The pushbutton of clear switch 57 is spring loaded to rise as the operators hand is removed from it, and during this return stroke or "up" stroke of clear switch 57 the phase control marks and initial "0" values of the $dz$ signals are recorded in the short channel. In addition a single fiducial mark is recorded in the long channel. This recording of the phase control marks and the fiducial mark is called the "mark" operation. The phase control marks thereafter serve to indicate the boundaries of the decode and integrate portions of each integrator section while the fiducial mark serves as a reference signal which identifies the particular integrator section in which the fiducial mark has been recorded and thereby allows operations to be performed which only pertain to that integrator section.

After a fiducial mark has been inserted in an integrator section through operation of clear switch 57, the remaining cells of that integrator section may be selectively filled with "0" and "1" signals through utilization of a switch 58 and a switch 59 which are normally spring loaded to an up position. The functions of these switches are dependent upon the position of the fill-compute switch 56, switches 58 and 59 having functions denoted "zero" and "one" respectively when switch 56 is at its fill position and having functions denoted as "start" and "stop" respectively when switch 56 is at its compute position.

When switch 56 is at its fill position as shown in FIG. 3, depression of switch 58 or switch 59 causes a "0" or "1" signal respectively to be filled into the second cell of the integrator section (this being the cell immediately following the fiducial mark). Upon the next operation of one of the lever switches 58 or 59 the previously recorded signal is shifted from the second cell to the third cell of the integrator section and a new "0" or "1" signal is recorded in the second cell. In the same manner at each successive depression of a lever switch 58 or 59 previously recorded signals are shifted back one cell and a new "0" or "1" signal is recorded in the second cell of the integrator section. Thus in the filling of an integrator section after 79 selective operations of the lever switches 58 or 59 all of the cells of the integrator section will have been filled with desired "0" or "1" signals.

Another spring loaded lever switch 60 is provided, which is sometimes utilized during the filling of an integrator section to accomplish what is called "spacing" of the signals recorded in an integrator section. Each depression of switch 60 causes all signals (with the exception of the fiducial mark) recorded in the integrator section to shift back one cell. The signal recorded in the last cell is not lost but is brought forward and placed in the second cell. Successive depressions of switch 60 thus causes what might be described as a circular precession or movement of the signals recorded in the channel, each signal moving stepwise backwards towards the last cell of the integrator section and from there being transferred to the second cell from whence it may again be shifted backwards until it reaches its appropriate position. This "space" operation is commonly utilized when it is necessary to correct errors made in filling an integrator section.

Suppose for example, that after an integrator section has been filled, it was discovered that by error signal $y_5$, for example, had been recorded as a "1" signal when it should properly have been recorded as a "0" signal. To remedy this error, switch 60 would be successively depressed to space the recorded signals until the incorrect signal $y_5$ appears in the last cell of the integrator section. Then switch 58 would be depressed once, this having its normal effect of shifting all signals back one cell and of recording a "0" signal in the second cell of the integrator. In this manner the incorrect "1" valued $y_5$ signal is replaced in the signal sequence by a correct "0" valued signal. Thereafter successive operations of switch 60 are again used to space the recorded signals until the signals have been returned to their proper cells in the integrator section.

It will be understood that switch 60 accomplishes the described "space" function only when fill-compute switch 56 is at its fill position. Switch 60 as described hereinbelow has a different "once" function when switch 56 is at its compute position.

After one integrator section (that integrator section containing the recorded fiducial mark) has been completely filled in the above-described manner, through operation of a "step" switch 62, the fiducial mark is shifted or "stepped" to the succeeding integrator section which may then be filled in the same manner. As illustrated in FIG. 3, switch 62 is a lever type switch normally spring-loaded to an up position. Each depression of switch 62 causes the fiducial mark to be transferred from the first cell of the integrator section in which it is recorded to the first cell of the succeeding integrator section thereby identifying this succeeding integrator section for purposes of filling the remaining cells of the section with desired "1" and "0" signals.

As shown in FIG. 3, immediately above switch 62, there is provided on switch panel 32, a window 63 through which may be seen a disk 64 (indicated in FIG. 3 by dotted lines) which has the numbers 1, 2, . . . 20 printed in order thereon corresponding to the designations of the twenty integrator sections. Step switch 62 is coupled to disk 64 and is effective at each depression thereof for rotating disk 64 so as to display the next successive number. Thus if disk 64 is initially positioned so as to display the number 1 while the first integrator section is being filled, depression of step switch 62 will advance disk 64 to display the number 2 at the same time the fiducial mark is shifted to the second integrator section. In this manner the number appearing at window 63 always identifies the integrator section presently containing the fiducial mark.

After all integrator sections have been filled in the described manner, a computation may be initiated. As a preliminary to initiating computation fill-compute switch 56 is placed at its compute position, this causing switches 58, 59 and 60 to become inactivated for the control of the "zero," "one" and "space" operations (associated with filling of integrator sections) and to become operable instead for the control of so-called "start" and "once" operations respectively (associated with the performance of computation by the DDA). Thereafter, an operator may initiate or "start" computation by depressing switch 58 and may suspend or "stop" computation at any time by depressing switch 59. During a complete computation, the long channel may "turn" hundreds or thousands of times.

During each turn of the long channel, each of the twenty integrator sections contained in the long channel will be processed, each pair of Y and R numbers being advanced in value in accordance with received $dz$ signals. The totality of those computational operations performed during a single turn of the long channel is defined as a "unit computation." An extended computation is made up of hundreds or thousands of such unit computations successively performed at very high speeds. If desired however, whenever computation is suspended (as by depressing switch 59), the performance of a single additional unit computation may be ordered by depressing switch 60, this performance of a single unit computation being known as the "once" operation. Each depression of switch 60 causes an additional unit computation to be performed.

The "once" operation is particularly useful for checking purposes and also for use in introducing abrupt changes in the value of a Y number when it reaches a predetermined value during the course of computation. To accomplish such an abrupt change, computation is stopped at a time when the Y number has slightly less than the predetermined value. Then the "once" operation may be successively ordered until exactly the predetermined value is attained. Then after raising switch 56 to its fill position, the Y number (and any other numbers if desired) may be altered or rewritten by means of the "zero" and "space" operation. Finally, after returning switch 56 to its compute position, computation may be again initiated.

It should be noted that an upper window 66 and a lower window 67 are provided on switch panel 32, through which may be seen upper and lower portions of the viewing face of a cathode ray tube 68 (shown in FIG. 3 in dotted outline). During fill operations signals representing the contents of the integrate and decode portions of the integrator section being filled (that section containing the fiducial mark) are displayed in upper window 66 and lower window 67 respectively. During compute operations signals representing the R and Y numbers respectively of the integrate section containing the fiducial mark are displayed in windows 66 and 67. By observing these signals an operator is enabled during fill to monitor the recording of signals into the cells of the long channel and during compute to observe the Y and R numbers stored in the integrator section containing the fiducial mark.

*General Description of "Compute" Operations*

Facilities are provided in the DDA to supply certain of the $dz$ signals to external output units and also to accept input signals provided by external input units and to utilize them as $dz$ signals. In a particular embodiment of the invention hereinbelow described, the DDA can accept two input signals (designated Input $^1$ and Input $^2$ as shown in FIG. 3) at each turn of the long channel or supply two output signals (designated Output $_1$ and Output $_2$ as shown in FIG. 3) or can accept one input signal and supply one output signal. When the DDA is supplying two $dz$ signals to external output units (such as graph plotters for example), these $dz$ signals are those arising from the two integrator sections immediately preceding the fiducial mark. When the DDA is accepting two input signals from external inputs (such as curve followers) such input signals are utilized as though they were $dz$ signals arising from the same two integrator sections, these input signals being immediately recorded in the corresponding cells of the short channel so that they can be received by other integrator sections.

When the DDA is supplying one output signal and receiving one input signal, either of the two integrator sections selectively may supply the output $dz$ signal, while the input signal will be utilized as though it were the $dz$ signal arising from the other integrator section. If desired, facilities may readily be provided, as will hereinafter appear, for expanding the operations of the DDA to receive additional input signals and supply additional output signals.

As stated before, after computation is initiated, during each turn of the long channel (during each unit computation) each of the twenty integrator sections contained in the long channel is processed, each pair of Y and R numbers being advanced in value in accordance with $dz$ signals received (via the short channel) from other integrator sections or from a graph follower or other input device. All operations relating to a particular integrator section are performed while that integrator section is traversing beneath read head 45 shown in FIG. 3.

During passage of the decode portion of an integrator section (such as integrator section 7 shown in FIG. 4) a decode or selection operation is performed which is controlled by the $dx$ and $dy$ decode marks which were filled into the integrator section. During this decode operation one $dz$ signal is selected from the short channel, by means of a corresponding $dx$ decode signal and is stored in flip-flop P for introduction to the integrator section as a $dx$ input signal. In addition either one or a plurality of $dz$ signals are selected from the short channel by means of a corresponding $dy$ decode mark or marks. If only a single $dy$ decode mark was filled into the integrator section, then a single corresponding $dz$ signal will be selected from the short channel and will be stored in flip-flop Q for introduction to the integrator section as the $dy$ input signal.

For example, if a $dy_5$ signal has been filled into the integrator section it will have the effect of selecting the $dz_5$ signal for introduction to the integrator section. However if a plurality of $dy$ decode marks are filled into the integrator section, each of them selects a corresponding $dz$ signal, all of the thus selected $dz$ signals are summed in succession to form the $\Sigma dy$ number. As each digit is formed, it is stored (in dinary form) in the $dx$ decode cell reserved for it while the carry resulting from the formation of that digit is stored in flip-flop Q to be utilized in forming the next digit of $\Sigma dy$. Thus as each successive digit of $\Sigma dy$ is formed and stored in its $dx$ decode cell, the corresponding carry digits are successively held in flip-flop Q. At the completion of the process the carry resulting from the formation of the last digit of $\Sigma dy$ (thus corresponding to the highest order digit of $\Sigma dy$) is in Q and serves as the $dy$ input signal. The remaining or lower order digits of the $\Sigma dy$ number are stored in the drum and are designated as the $\Sigma dy$ remainder number. Thus upon completion of passage of the decode portion of an integrator section, the $dx$ input signal is available in flip-flop P and the $dy$ input signal is available in flip-flop Q.

The "1" and "0" values of the $dx$ signal signify the mathematical values $+1$ and $-1$ respectively, while the "1" and "0" values of the $dy$ input signal represent the mathematical value $+1 \times 2^{-n}$ or $-1 \times 2^{-n}$. Thus the $dy$ input signal has the same weight as the $y_1$ signal.

During passage of the following integrate portion of the integrator section the presence of a sign reversal mark will have the effect of reversing the state of flip-flop P and therefore reversing the sign of the $dx$ signal. If an exchange mark is provided, it will have the effect in further operations of effectively exchanging the $dx$ signal and the $dy$ signal (thereby permitting the effective $dx$ signal to be formed by summation of a plurality of $dz$ signals). The appearance of the following integrate mark will have the effect of initiating the performance of mathematical operations upon the Y and R numbers stored in the integrator section.

Upon such appearance of the integrate mark (in flip-flop L) a correction signal K is formed in accordance with the $dx$ and $dy$ signals and is stored in flip-flop B. During the ensuing operations, the Y number stored in the integrator section (now called the "old" Y number) is increased by the value of the $dy$ input signal to form a "new" Y number whose digits are stored in the same cells formerly occupied by the digits of the "old" Y number. This operation is performed by selectively reversing the signals $y_1 \ldots y_{n+1}$ or leaving them unchanged as they are transferred from flip-flop L to flip-flop M in their normal recirculation.

Moreover during the same operations the value of the correction signal K is added to the R number stored in the integrator section (now called the old R number) and in addition the value of the old Y number is added to or subtracted from the old R number in accordance with the +1 or −1 value of the $dx$ signal to thereby form a "new" R number whose digits are rewritten in the same cells formerly occupied by the digits of the old R number. Writing of the new R number is accomplished by selective reversal or non-reversal of the signals $r_1 \ldots r_{n+1}$ as they are transferred from flip-flop L to flip-flop M in their normal recirculation through the long channel. The value of the new R number thus formed is defined by the following equation:

$$R_{new}=R_{old}+Y_{old}dx+K$$

The effect of adding K in forming the new R number is to incorporate so-called "round-off," "trapexoidal" and "subtraction" corrections in the newly formed R number. As a result of the incorporation of these corrections growth of error during the course of computation is greatly decreased.

As each successive $r$ signal of the new R number is formed in flip-flop M, a corresponding carry signal is formed which represents a carry digit arising from the formation of the new $r$ signal, each carry signal as it is formed being placed in flip-flop B and being replaced there by the next carry signal as successive $r$ signals are formed. The carry signal arising from the formation of signal $r_{n+1}$ (the last signal of the R number which is stored in the last cell of the integrator section) is the $dz$ signal arising from the integrator section. Since it is placed in the B flip-flop, this $dz$ signal will be available there when the succeeding integrator section begins its traverse and will be as hereinbefore described, transferred from the B flip-flop to the second cell of the short channel during the traverse of the succeeding integrator section. In this manner the $dz$ signal produced by the integrator section is unloaded via flip-flop B into the short channel where it may be "picked up" or selected by other integrator sections by means of the $dx$ and $dy$ decode marks filled into the integrator sections.

To briefly summarize: during a traverse of an integrator section one $dz$ signal may be selected from the short channel by the $dx$ decode mark to serve as a $dx$ input signal to the integrator section. One or a plurality of $dz$ signals may be selected from the short channel by the $dy$ decode marks for use in forming the $dy$ input signal. If only one $dz$ signal is selected, it serves as the $dy$ input signal. If a plurality of $dz$ signals are so selected they are summed to form a $\Sigma dy$ number whose lower order digits are stored in the long channel for use in modifying later summations while the highest order digit of the $\Sigma dy$ number is utilized as the $dy$ input signal.

The $dx$ and $dy$ input signals thus formed are utilized to control the formation of new R and Y numbers. The final carry resulting from the formation of the new R number is the new $dz$ signal arising from this integrator section and is unloaded into the short channel as the succeeding integrator section begins its passage, while shortly thereafter as hereinbefore explained, the old $dz$ signal is erased from the short channel.

*Automatic Stop*

Facilities are provided in the DDA for automatically stopping computation whenever a Y number in any of the integrator sections (exceeds +2 or is less than zero) and therefore cannot be represented in the machine. It will be recognized that after an overflow of a Y number that number will be in error and further computation based upon this erroneous value of the Y number would also be in error. Thus the provision of an automatic stop upon occurrence of overflow prevents the propagation of error into other Y and R numbers. The automatic stop feature may also be deliberately utilized by an operator to stop operation at a predetermined point in the course of a computation, all Y numbers involved in the computation being scaled so that one of the Y numbers will overflow at the predetermined point in the computation.

*Idle and Dawdle Conditions*

It should be understood that when computation is stopped, either automatically or through manual operations of switch 59, the DDA is forced into a phase of operation known as "idle" in which the signals stored in the long and short channels are merely continuously recirculated without any operations being performed upon the signals. In the "idle" phase of operation therefore, referring to the long channel each signal arriving in read flip-flop L is transferred unchanged to write flip-flop M. Referring to the short channel, during "idle" each signal arriving in read flip-flop A is transferred uniformly complemented in value to write flip-flop C. The "idle" condition exists and is in fact enforced upon the DDA whenever flip-flop Q is in its "1" state and flip-flop J is simultaneously in its "0" state. The "idle" condition is therefore indicated by the simultaneous appearance of signals Q and J' both at their "1" representing levels (QJ') while the absence of the "idle" condition is indicated whenever signal Q' or signal J is high $(Q'+J)$.

The DDA may also enter a temporary idle condition which is called "dawdle". The "dawdle" condition can only exist when fill-compute switch 56 is at its fill position and then is enforced upon the DDA whenever flip-flops Q and J are simultaneously in their "1" state as indicated by the simultaneous appearance of signals Q and J at their high levels $(Q \cdot J)$.

The output signals I and I' produced by flip-flop I are utilized very extensively in the operation of the DDA, primarily for identifying certain portions of each integrator section. It is therefore desirable for purposes of explaining the functioning of the DDA to provide some preliminary information concerning operation of the I flip-flop. It will be shown that during each passage of an integrator section flip-flop I is always sent to its "0" state immediately after passage of the second cell of the decode portion of the integrator section. If fill-compute switch 56 is at its fill position or if the DDA is in an "idle" condition, flip-flop I will be returned to its "1" state immediately after passage of the first cell of the integrator portion. However if this condition does not exist (if switch 56 is at its compute position and it is "not idle") then flip-flop I will be returned to its "1" state only upon the appearance of the integrate mark in flip-flop M. For purposes of illustration a waveform of output signal I is shown in FIG. 5 as it would appear during computation for passage of integrator section 7 shown in FIG. 4 (assuming that an integrate mark has been filled into the section). A dotted line 70 indicates the variation in this waveform which would be present when the DDA is in its "idle" condition or switch 56 is at its fill position.

*Detailed Description of Structure and Operation*

Virtually all of the operations of the DDA have now been described with varying particularly in the general description of operation provided in the preceding portions of this specification. All of the above-described operations of the DDA will now be reviewed in great detail both to further clarify the nature of the operations performed and to fully disclose the electrical circuits and apparatus which are utilized in a preferred embodiment of the invention to mechanize these operations. Basically in the preferred embodiment of the DDA all operational processes are carried on by successive changes in the states of the computer flip-flops.

At the end of each timing interval (as demarked by the appearance of a clock pulse $Cl$) each computer flip-flop is either "set" (sent to its "1" state by application of input signals to its "set" (S) input conductor) or "zeroed" (sent to its "0" state by application of input signals to its zero (Z) input conductor) or is "triggered" (reversed in state by simultaneous application of input signals to both its S and Z conductors). Flip-flops A and L are "set" or zeroed in accordance with the binary "1" or "0" value of the magnetic signals, then traversing past read heads 40 and 45 respectively. Flip-flop T is regularly "triggered" by application of clock pulses $Cl$ to both its ST and ZT input conductors. The remaining flip-flops B, C, Q, M, J, I and P are "set," "zeroed" or "triggered" in accordance with the states of other computer flip-flops and positions of the front panel switches during the preceding timing interval.

To accomplish the described operations, during each timing interval all of the output signals produced by the computer flip-flops are applied to gating matrix 31. These output signals as hereinbefore described represent the states of the flip-flops during the timing interval. In addition, switch signals arising from the switching provided on panel 32 are applied to gating matrix 31, and also input signals arising from external sources (such as curve followers for example) may be applied to gating matrix 31. Gating matrix 31 is responsive to the signals applied during a timing interval and to the application of a clock pulse $Cl$ for selectively applying electrical pulses to the "set" and "zero" input terminals of each of the flip-flops. For example, at the end of each timing interval, gating matrix 31 may apply an SC input pulse to the SC input conductor of flip-flop C or a ZC input pulse to the ZC input conductor of flip-flop C or may apply input pulses to both input conductors simultaneously.

It will be shown that gating matrix 31 comprises a plurality of gating networks, each gating network receiving some of the signals applied to the gating matrix and combining these signals to form one of the output signals produced by the gating matrix. Thus gating matrix 31 includes a gating network for producing the SC signal, another gating network for producing the ZC signal and so forth, there being one gating network respectively for each of the output signals produced by the gating matrix. Each of the gating networks will ordinarily include a plurality of logical "and" gates and "or" gates arranged to combine applied signals in accordance with an associated Boolean logical equation to produce a desired resultant output signal. As is well known in the art, the Boolean logical equation associated with a gating network fully defines the output signal produced by the network in terms of the input signals received by the network and in addition supplies a complete description of the structure of the gating network.

Figures 6A, 7E:
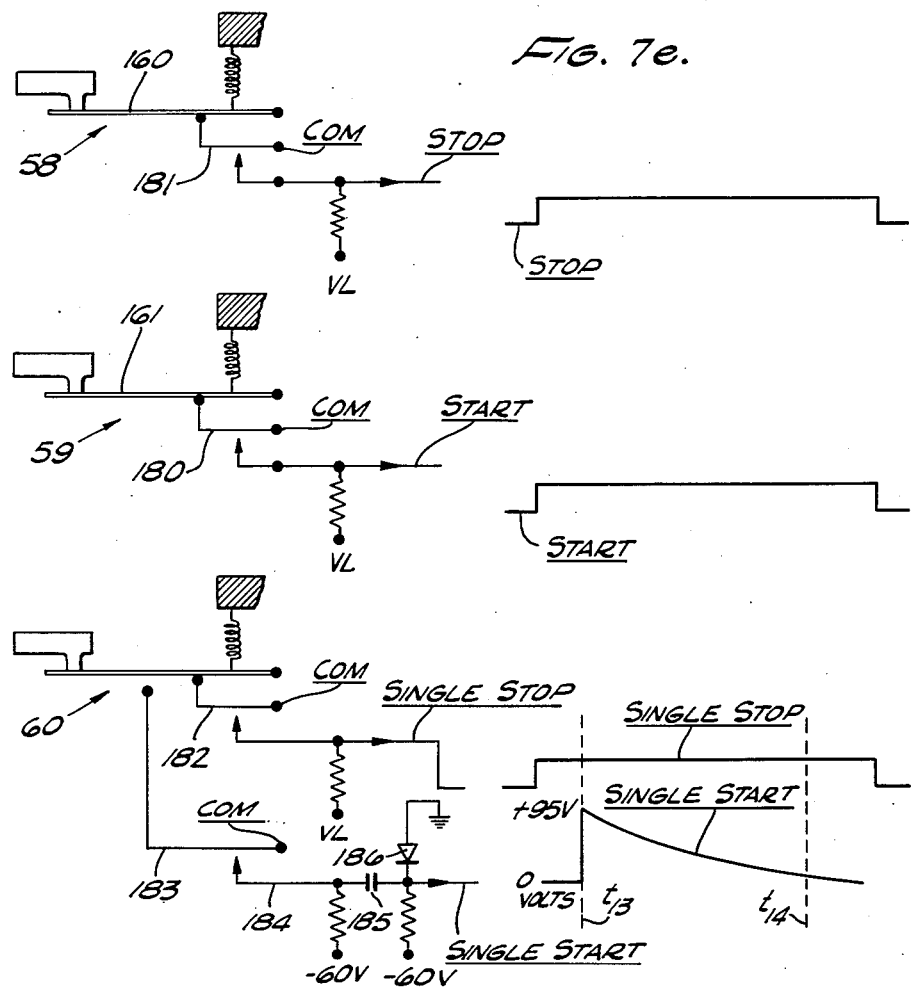

For example, referring now to FIG. 6a, there are illustrated two gating networks 101 and 102 which form output signals SC and ZC respectively, these signals, as illustrated in both FIGS. 3 and 6a, being applied to flip-flop C to respectively set and zero the flip-flop. In reference to their functions, gating network 101 will be referred to as the "Set C Gating Network" and gating network 102 will be sometimes referred to as the "Zero C Gating Network." Other gating networks will similarly be designated in terms of the output signals they produce.

As shown in FIG. 6a, set C gating network 101 includes a conventional diode "and" gate 83 which receives signal $A'$ and a signal $\underline{K1}_{up}$ (a high level signal generated by clear switch 57 in its up position) and combines these signals to produce a bilevel output signal $A'\underline{K1}_{up}$ which has a high level only when both signals $A'$ and $\underline{K1}_{up}$ are at their high levels. The expression $A'\underline{K1}_{up}$ thus symbolizes the performance of the logical "and" operation. The signals $A'\underline{K1}_{up}$ is applied to one input of a second "and" gate 84, symbolically represented as a semicircle containing a dot (.), which also receives clock pulse signal $Cl$, gate 84 being effective for producing an output signal $Cl[A'\underline{K1}_{up}]$ only when signal $A'\underline{K1}_{up}$ is at a high level and the clock pulse $Cl$ appears. As shown in FIG. 6a this output pulse signal is the output pulse SC.

A Boolean logical equation which defines output signal SC in terms of the received signals $A'$, $\underline{K1}_{up}$ and $Cl$ may be formed by setting SC equal to its equivalent form $Cl[A'\underline{K1}_{up}]$.

$$SC = Cl[A'\underline{K1}_{up}] \qquad (1)$$

Equation 1 states in a very concise form that an output pulse SC will be produced only when signals $A'$ and $\underline{K1}_{up}$ are both at their high levels and a clock pulse signal $Cl$ appears.

As a further illustration consider the zero C gating network 102 shown in FIG. 6a. Gating network 102 is seen to include a conventional diode "or" gate 85 which receives signals $Q'$ and $J$ and combines these signals to produce a bilevel signal $(Q'+J)$ which has a high level only when signal $Q'$ or signal $J$ is at a high level. In the expression $(Q'+J)$ the $(+)$ symbol indicates the performance of the logical "or" operation as shown in FIG. 6a. Signal $(Q'+J)$ is applied to one input of an "and" gate 86 which receives at its other inputs signals T, B and a signal $\underline{Com}$. Gate 86 combines these signals to produce an output signal $TB\underline{Com}(Q'+J)$ which has a high level only when all the input signals to gate 86 are at their high levels.

Another "and" gate 87 is provided which receives signal $A$ and a signal $\underline{Com}'$ and combines these signals to produce a resultant output signal $A\underline{Com}'$. It will be shown hereinbelow that signals $\underline{Com}$ and $\underline{Com}'$ are complementary bilevel signals derived from fill-compute switch 56, signal $\underline{Com}'$ having a high level when switch 56 is at its fill position and signal $\underline{Com}$ having a high level when switch 56 is at its compute position. (In the following specification, designations of signals arising from switches will be invariably underlined so as to clearly distinguish switch derived signals from other signals.)

Continuing with the description of gating network 102 shown in FIG. 6a, it is seen that an "and" gate 88 is provided for combining signals A and $T'$ to produce a resultant signal $AT'$ and another "and" gate 89 is provided for combining signals A, Q and $J'$ to produce a resultant signal $AQJ'$. The signals produced by "and" gates 86, 87, 88 and 89 respectively, are applied to an "or" gate 90, symbolically designated as a semicircle with a $(+)$ contained therein, gate 90 combining these applied signals to produce a resultant output $$TB\underline{Com}(Q'+J) + AQJ' + AT' + A\underline{Com}'$$

This signal produced by "or" gate 90 is applied to one input of an "and" gate 91 which also receives at another input clock pulse $Cl$, gate 91 combining these signals to form the output signal ZC where the signal ZC is defined by the Boolean equation:

$$ZC = Cl[TB\underline{Com}(Q'+J) + AQJ' + AT' + A\underline{Com}'] \qquad (2)$$

In logical Equation 2 each $(+)$ sign indicates the performance of a logical "or" operation of the signals combined thereby and the absence of a $(+)$ sign indicates the performance of a logical "and" operation upon the signals combined thereby.

It will be apparent to those skilled in the art that logical Equations 1 and 2 completely specify the specific mechanizations of gating networks 101 and 102 shown in FIG. 6a, that is, the equations specify both the number of logical "and" and "or" operations to be performed by the networks as well as the factors and terms involved in such operations. For example, the bracket in Equation 2 specifies an overall logical "and" operation involving two factors, namely, $Cl$ and the quantity within the bracket. This operation is performed by an "and" gate, gate 91, which includes two inputs, one for each factor, and two diode rectifiers, one for each input.

Similarly the quantity within the bracket represents a logical "or" operation involving four terms, namely, $TB\underline{Com}(Q'+J)$, $AQJ'$, $AT'$, and $A\underline{Com}'$. This operation is performed by an "or" gate, gate 90, which includes four inputs, one for each term, and four diode rectifiers, one for each input. The four terms specified in the logical "or" operation are, in turn, specified by further logical "and" operations. More particularly, term $AQJ'$ specifies a logical "and" operation performed by three-terminal "and" gate 89; and terms $AT'$ and $A\underline{Com}'$ logical "and" operations performed by two-terminal "and" gates 88 and 87, respectively. Term $TB\underline{Com}(Q'+J)$ specifies a logical "and" operation performed by four-terminal "and" gate 86 which, in turn, has one terminal connected to the output terminal of two-terminal "or" gate 85 as specified by the factor $(Q'+J)$.

It is thus seen that the logical equations specify exactly the mechanizations of the associated gating networks, including the number of gates, the number of input terminals for the gates, and the interconnections of the gates. In addition, it is apparent to those skilled in the art that the equations, such as Equations 1 and 2 may be varied in accordance with the well-known rules of Boolean algebra to yield equivalent mechanizations having different numbers of gates, terminals and interconnections. For example, the quantity within the bracket of Equation 2 may be factored to yield the following:

$$ZC = Cl[TB\underline{Com}(Q'+J) + A(QJ'+T'+\underline{Com}')] \quad (2a)$$

In accordance with the rules set forth above, this equation would be mechanized a two-terminal "and" gate, identical to gate 91 for the "and" operation between $Cl$ and the bracketed factor; a two-terminal "or" gate and a four-terminal "and" gate, identical to gates 85 and 86, respectively, for the term $TB\underline{Com}(Q'+J)$; a two-terminal "or" gate, similar to gate 90, for the "or" operation between the term $TB\underline{Com}(Q'+J)$ and the term $A(QJ'+T'+\underline{Com}')$; a two-terminal "and" gate for the "and" operation between factor $A$ and factor $$(QJ'+T'+\underline{Com}')$$

a three-terminal "or" gate for the "or" operation between terms $QJ'$, $T'$, and $\underline{Com}'$; and a two-terminal "and" gate for the "once" operation between factors $Q$ and $J'$.

It is, therefore, apparent that logical equations completely specify gating mechanizations. In addition techniques for mechanizing Boolean equations are well known in the art. See, for example, an article entitled "An Algebraic Theory for Use in Digital Computer Design," by E. C. Nelson, found in the Transactions of the IRE, September 1954 issue, pages 12 through 21. Accordingly, for purposes of clarity and more complete understanding of the present invention, the remainder of this specification, except for the description of FIG. 6b, will be devoted to a non-rigorous derivation of logical equations which satisfy the requirements of the general terms and conditions of operation set forth above in the general description.

The equations thus derived will be mechanized by gating matrix 31 which, as illustrated in FIG. 3, produces twenty-two output signals from twenty-two corresponding gating networks, as specified by the associated equations. For purposes of handy reference, all of the equations to be derived are set forth below in Table 1. In addition all of the terms of the equations are numbered in the order in which these terms are developed in the following portions of the specification.

TABLE 1

$$SC = Cl[\underset{5}{A'Kl_{up}}] \quad (1)$$

$$ZC = Cl[\underset{1}{B\underline{Com}T}(Q'+J)$$

$$+ \underset{2}{A\underline{Com}'} + \underset{3}{AT'} + \underset{4}{AQJ'}] \quad (2)$$

$$SM = Cl[\underset{6}{LX' + L'X}] \quad (3)$$

$$ZM = Cl[\underset{7}{L'X' + LX}] \quad (4)$$

$$X = \underset{32}{\underline{Com}TCMJ}(Q+B)(Q'+B') + \underset{44}{\underline{Com}I'AT'MJ}$$

$$+ \underset{45}{\underline{Com}IAT'Q'J} + \underset{49}{\underline{Com}(Q'+J)ITC'P}$$

$$+ \underset{11}{\underline{Insert}\ IA'TQ'J'}$$

$$+ \underset{18}{\underline{Fill}\ Q'(LB'+L'B)(I'+A+T)}$$

$$+ \underset{23}{\underline{Shift}\ IA'T'Q'(J'+L)} \quad (3a)$$

$$SI = Cl[\underset{8}{AT'\underline{Com}'} + \underset{9}{AT'QJ'} + \underset{28}{AT'M}] \quad (5)$$

$$ZI = Cl[\underset{10}{TC}] \quad (6)$$

$$SQ = Cl[\underset{12}{IA'T'\underline{Insert}} + \underset{21}{IA'T'\underline{Fill}}$$

$$+ \underset{24}{IA'T'L\underline{Com}'} + \underset{26}{IA'T'L(\underline{Stop}+\underline{Single\ Stop})}$$

$$+ \underset{30}{\underline{Com}I'TCJ'MB} + \underset{33}{\underline{Com}TCMJL'B}$$

$$+ \underset{42}{\underline{Com}I'TC'LMP} + \underset{46}{\underline{Com}ITMJ}] \quad (7)$$

$$ZQ = Cl[IA'T'LJ'(B\ \underline{One}_{down}$$

$$+ \underset{17}{B'\underline{Zero}_{down} + \underline{Space}}) + \underset{22}{IA'T'LJ'\underline{Shift}}$$

$$+ \underset{25}{IA'T'LJ'(\underline{Start} + \underline{Single\ Start})}$$

$$+ \underset{34}{\underline{Com}TCMJLB'} + \underset{43}{\underline{Com}I'TC'LMP'}$$

$$+ \underset{47}{\underline{Com}ITMJ}] \quad (8)$$

$$SB = Cl[\underset{15}{\underline{One}_{down}QJ'} + \underset{19}{\underline{Fill}\ Q'L} + \underset{38}{\underline{Com}I'TC'L'}$$

$$+ \underset{50}{\underline{Com}(Q'+J)ITC'PL} + \underset{57}{IA'T'L(Input\ 1^{+})}$$

$$+ \underset{59}{\underline{Com}ITCMQ'(Input\ 2^{+})}$$

$$+ \underset{61}{\underline{Com}(Q'+J)ATC(M'+I'+Input\ 2')}] \quad (9)$$

$$ZB = Cl[\underset{16}{\underline{Zero_{down}}}QJ' + \underset{20}{\underline{Fill}}(I'+A+T)Q'L$$

$$+ \underset{41}{\underline{ComI'TC'L}}(P+Q)(P'+Q')$$

$$+ \underset{51}{\underline{Com}}(Q'+J)ITC'PL' + \underset{58}{IA'T'L}(\text{Input } 1^-)$$

$$+ \underset{60}{\underline{ComITCMQ'}}(\text{Input } 2^-)$$

$$+ \underset{62}{\underline{Com}}(Q'+J)A'TC(M'+I'+\text{Input } 2')] \qquad (10)$$

$$SJ = Cl[\underset{13}{\underline{Com'IA'T'Q'}} + \underset{31}{\underline{ComI'TCQ'M}}] \qquad (11)$$

$$ZJ = Cl[IA'T\underset{14}{\underline{Fill_{up}\ Shift_{up}\ Insert_{up}}}$$

$$+ IA'T'\underset{27}{\underline{Com}} + \underset{48}{\underline{ComIAT'Q'}}] \qquad (12)$$

$$SP = Cl[\underset{29}{IA'T'} + \underset{36}{AT'L} + \underset{39}{\underline{ComI'TC'LM'Q}}] \qquad (13)$$

$$ZP = Cl[(Q'+J)TCLB'(M'+J')$$
$$\phantom{ZP = Cl[} 35$$

$$+ \underset{37}{AT'L} + \underset{40}{\underline{ComI'TC'LM'Q'}}$$

$$+ \underset{52}{\underline{Com}}(Q'+J)ITC'(LB'+L'B)] \qquad (14)$$

Output 1 $\begin{cases} \text{Output } 1^+ = \underset{53}{\underline{ComQ'ITCMB}} & (15) \\ \text{Output } 1^- = \underset{54}{\underline{ComQ'ITCMB'}} & (16) \end{cases}$ Output 2 $\begin{cases} \text{Output } 2^+ = \underset{55}{\underline{ComQ'ITCMA}} & (17) \\ \text{Output } 2^- = \underset{56}{\underline{ComQ'ITCMA'}} & (18) \end{cases}$ $$\text{Synch} = \underset{63}{IA'T'L} \qquad (19)$$

$$\text{Int} = \underset{64}{\underline{Com}(AT'+TC')} + \underset{65}{\underline{Com'}} \qquad (20)$$

$$\text{Vert}_U = \underset{66}{L} \qquad (21)$$

$$\text{Vert}_L = \underset{67}{\underline{Com'}(AT'+TC')} + \underset{68}{\underline{ComT}} \qquad (22)$$

*Operation of Flip-flop C*

Since there has already been described in great detail the set C gating network 101 and the zero C gating network 102, shown in FIG. 6a, it is believed advisable for purposes of clarity, to consider first all operations which affect flip-flop C and thereby develop all of the terms, terms 1 through 5, of logical Equations 1 and 2.

Remembering that flip-flop C is part of the normal recirculation loop of the short channel, in normal operation each signal arriving in flip-flop A is merely transferred, complemented in value, to flip-flop C. Expressed in terms of specific mechanization, this means that at the end of each timing interval (as indicated by appearance of a clock pulse Cl) flip-flop C is set (by an SC pulse) or zeroed (by a ZC pulse) to a "1" or "0" state which is opposite to the state of flip-flop A during the timing interval.

There are two exceptions to this general normal circulation of signals from flip-flop A to flip-flop C.

The first exception occurs when the DDA is being cleared (upon depression of clear switch 57) for then all computer flip-flops are intended to be held in their "0" states. Therefore facilities are provided for suppressing production of SC pulses whenever clear switch 57 is depressed (as indicated by signal $\underline{K1_{up}}$ at its low level) and allowing renewed production of SC pulses when clear switch 57 returns to its up or undepressed position (as indicated by signal $\underline{K1_{up}}$ at its high level).

The second exception occurs only during decode phases of "compute" ($\underline{Com} = 1$)—that is during passage of a decode portion of an integrator section when it is "not idle" ($Q'+J$), and is related to the required precession of $dz$ signals hereinbefore described. It will be remembered as illustrated in FIG. 4 that during a decode phase of operation, each $dz$ signal appearing in read flip-flop A (at time T) is rewritten reversed in value and shifted backwards two cells with respect to its previous position in the short channel. Phase control marks appearing in flip-flop A (at time T') are rewritten, reversed in value of course, in their old positions. In this manner, the $dz$ signals recorded in the short channel are regularly precessed with respect to the decode portions of the integrator sections.

To accomplish this required precession of $dz$ signals, during a decode phase of computation flip-flop B is included in the recirculation loop of the short channel. Phase control marks arriving in flip-flop A are transferred in normal fashion reversed in value to flip-flop C, but $dz$ signals arriving in flip-flop A are not circulated directly from A to C but are instead transferred unchanged from A to B and thence after a delay of two timing intervals, are transferred reversed in value to flip-flop C. In this manner each $dz$ signal is delayed two timing intervals by storage in flip-flop B before being rewritten and is thereby shifted backwards two cell positions in the short channel.

From the above provided description of the operations which affect flip-flop C it is possible to develop all of the terms of logical Equations 1 and 2.

The effect of the $dz$ precession operation upon the C flip-flop can be very simply summarized. The $dz$ precession operation can only affect the C flip-flop under the following conditions:

Condition 1: Fill-compute switch 56 is at its compute position. This condition, as hereinbefore stated, is indicated by signal $\underline{Com}$ at its high ("1" representing) level.

Condition 2: The DDA is not in an "idle" condition. This "not idle" condition as hereinbefore explained, is indicated whenever signal $Q'$ or signal $J$ ($Q'+J$) is at a high level.

Condition 3: The DDA is in a "decode" phase of operation. This "decode" condition, as hereinbefore explained, is indicated by signals T and C(TC) both at their high levels.

The $dz$ precession operation can only affect the C flip-flop when all of the above-described conditions, conditions 1 and 2 and 3 are simultaneously satisfied. The Boolean expression or signal function $\underline{Com}TC(Q'+J)$ conveniently summarizes these conditions and thus it can be stated that the $dz$ precession operation can affect the C flip-flop only when $\underline{Com}TC(Q'+J) = 1$—that is when signals T and C and $\underline{Com}$ and $Q'$ or $J$ are at their high "1" levels. Whenever these conditions are satisfied, in accordance with the described precession of $dz$ signals, the signal stored in flip-flop B will be transferred reversed in value to flip-flop C.

Thus when these conditions $\underline{Com}TC(Q'+J)$ are satisfied, if flip-flop B is in its "0" state then flip-flop C should be set to its "1" state. However it will be noted that if the condition $\underline{\text{ComTC}}(Q'+J)$ is satisfied, flip-flop C must already be in its "1" state, as indicated by signal C at its high level. Therefore it is never necessary to set flip-flop C at this time. Stated in another way, at the time that a $dz$ signal is to be transferred from flip-flop B to flip-flop C, flip-flop C will always contain a "1" valued phase control signal which was transferred to it in the previous time interval, and therefore it is not necessary to set flip-flop C at this time.

However if at this time (when the condition $$\underline{\text{ComTC}}(Q'+J)$$

is satisfied) flip-flop B is in its "1" state, then flip-flop C must be zeroed—that is sent to its "0" state by application of a ZC pulse. The following partial or fragmentary logical Equation 2b sets forth a term which defines this operation:

$$Z_pC = B\underline{\text{ComTC}}(Q'+J) \qquad (2b)$$

where the subscript $p$ indicates that this is a partial equation defining a term which is only a portion of the complete equation for the ZC signal.

Inclusion of signal C in Equation 2b is obviously redundant. Inclusion of signal C in Equation 2b prevents flip-flop C from being zeroed when it is in its "0" state. However since no harm would be caused by such an occurrence, signal C may be safely deleted. Equation 2b is thereby reduced to the following form:

$$Z_pC = B\underline{\text{ComT}}(Q'+J) \qquad (2c)$$
$$\phantom{Z_pC = B\underline{\text{ComT}}(Q'+J)}\;1$$

The numeral 1 set forth below the term $$B\underline{\text{ComT}}(Q'+J)$$

identifies this term as being the same term which is found correspondingly numbered in logical Equation 2.

Developing now the remaining terms of the ZC equation, it is clear that whenever the condition $$\underline{\text{ComT}}(Q'+J)$$

is not satisfied, normal circulation of signals from A to C must reoccur—that is whenever signals $\underline{\text{Com}}'$ or $T'$ or $Q$ and $J'$ are at their high levels $(\underline{\text{Com}}'+T'+QJ')$. Equation 2d provided below defines this operation insofar as it affects the ZC signal $$Z_pC = A(\underline{\text{Com}}'+T'+QJ') \qquad (2d)$$

By multiplying all of the terms within parenthesis by the common factor A, Equation 2d is altered to the following equivalent Equation 2e:

$$Z_pC = A\underline{\text{Com}}' + AT' + AQJ' \qquad (2e)$$
$$\phantom{Z_pC = A}\;2 \quad\;\; 3 \quad\; 4$$

At this point all of the terms, terms 1, 2, 3 and 4, of the ZC equation have been developed and may be logically summed and multiplied by $Cl$ to form the complete ZC equation:

$$ZC = Cl[B\underline{\text{ComT}}(Q'+J)$$
$$\phantom{ZC = Cl[}1$$
$$+ A\underline{\text{Com}}' + AT' + AQJ'] \qquad (2)$$
$$\phantom{+ A}2 \quad\; 3 \quad\; 4$$

Considering now the SC signal, as has been explained hereinbefore, the $dz$ precession operation does not impose any requirements upon the setting of the C flip-flop. It is thus clear that at all times, in accordance with the normal circulation of signals in the short channel flip-flop C may be set to its "1" state whenever flip-flop A is in its "0" state, with the single exception that such setting of flip-flop C must be suppressed when clear switch 57 is depressed. This operation is enforced by the gating structure defined by the following Equation 1a:

$$S_pC = A'K1_{up} \qquad (1a)$$
$$\phantom{S_pC = A'K1_{up}}\;5$$

and by multiplying term 5 by $Cl$, there is obtained the complete SC equation:

$$SC = Cl[A'K1_{up}] \qquad (1)$$
$$\phantom{SC = Cl[A'K1_{up}]}5$$

In developing the terms of the SC and ZC Equations 1 and 2, we have been largely concerned with the normal recirculation of signals in the short channel. Of equal importance to the operation of the DDA is the normal recirculation of signals in the long channel, and therefore we will consider next the SM and ZM equations, Equations 3 and 4 which define the structure of gating networks 103 and 104 respectively.

*Operation of Flip-flop M*

Figure 6B:
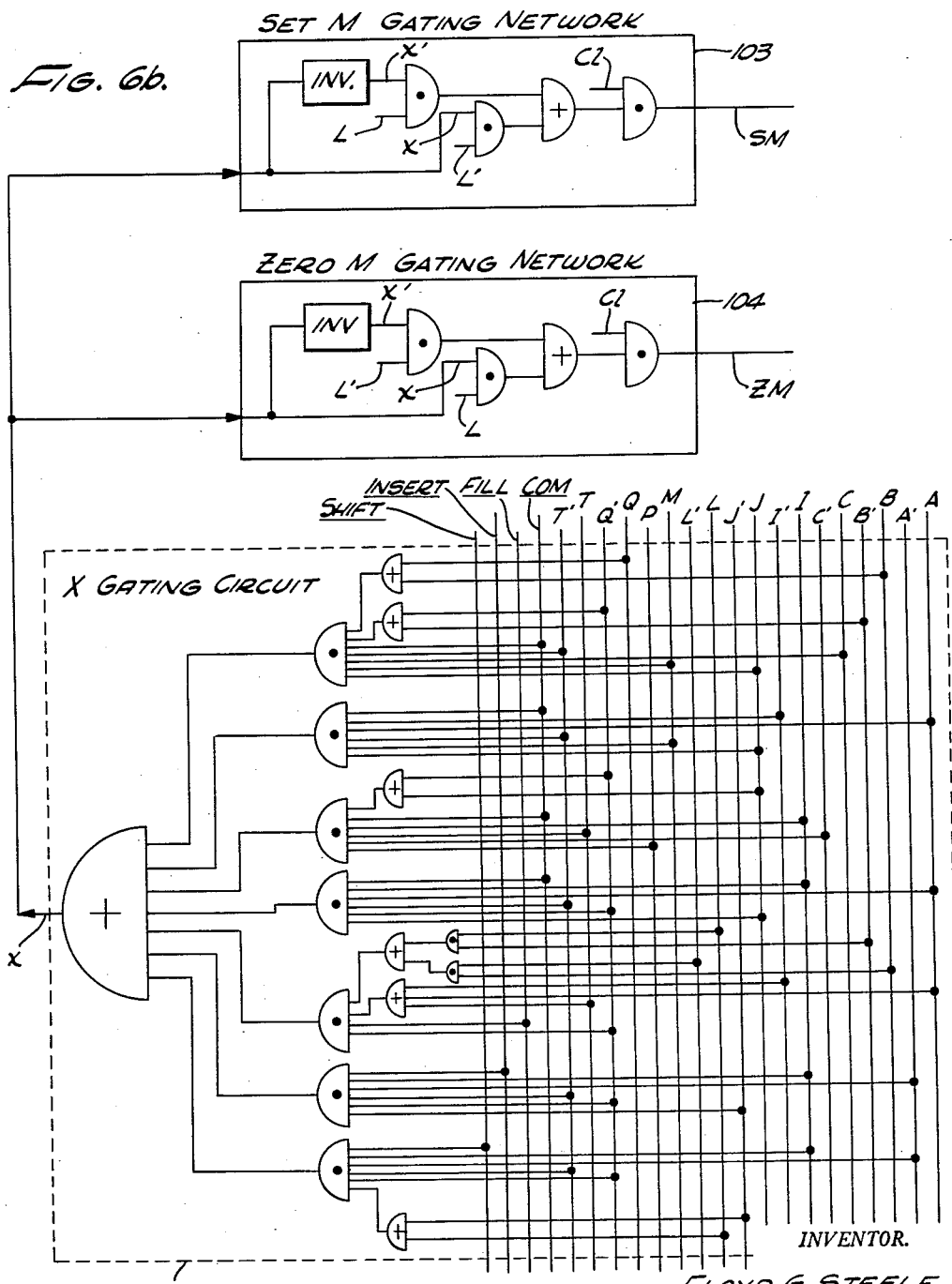

It will be remembered that in the long channel, signals circulate from flip-flop L to flip-flop M—that is each signal read into flip-flop L is transferred at the beginning of the next timing interval to flip-flop M, which again rewrites the signal. As stated hereinbefore, each signal as it is transferred from L to M is either left unchanged or is reversed in value. A signal designated signal X is generated to control this reversal or non-reversal of signals as they are transferred from L to M, this signal being generated, as shown in FIG. 6b, by a separate gating circuit 103a. Whenever signal X is at its high ("1") level, signals are reversed while when X is at its low ("0") level, signals are not reversed in transferring from L to M. Stating this in another manner, when $X=1$, flip-flop M will be set or zeroed at the end of each timing interval to the complement of the state of L during the interval, while when $X=0$, flip-flop M will be set or zeroed to the same state as the state of L. The SM and ZM Equations 3 and 4 rewritten hereinbelow define this operation, it is clear.

$$SM = Cl[LX' + L'X] \qquad (3)$$
$$\phantom{SM = Cl[LX' + L'X]}6$$

$$ZM = Cl[L'X' + LX] \qquad (4)$$
$$\phantom{ZM = Cl[L'X' + LX]}7$$

Since Equations 3 and 4 call for the complementary signal X' as well as signal X, inverting amplifiers (abbreviated INV) are provided within networks 103 and 104 to derive complementary signal X' from signal X. However the use of inverting amplifiers is not necessarily required in networks 103 and 104 since an alternative type of gating network may be substituted for networks 103 and 104 which does not require the complementary signal X'. This alternative type of gating network is shown and described in copending U.S. patent application Serial No. 485,241, entitled "Logical Gating Network," by the present inventor, filed January 31, 1955, now U.S. Patent No. 2,914,681, issued November 24, 1959.

Because of the importance of the X signal in controlling the transfer of signals from L to M, the logical equation which defines the X signal (and hence the structure of gating circuit 103a) is set forth in full immediately below Equations 3 and 4 in the equation list provided hereinbefore. This equation for the X signal is numbered as Equation 3a in accordance with the numbering of the X gating circuit as circuit 103a.

The terms of Equation 3a will be considered in detail at later points in the specification. At this time, it is sufficient to note that the value of the X signal is determined by a large number and variety of terms, this being a clear result of the fact that the only way in which information in the long channel is affected is through control of the X signal which in turn controls the reversal or non-reversal of signals being transferred from flip-flop L to flip-flop M. Thus all operations which modify information in the long channel, must accomplish such modification by means of the X signal.

The procedure which will be employed for developing the terms of Equation 3a and the remaining equations, Equations 5–22, will be somewhat different from that which has been utilized for developing the terms (terms 1–7) of logical Equations 1, 2, 3 and 4. Considering flip-flop C for a moment, it must be recognized that only a few closely related operations of the DDA affected flip-flop C and therefore it was possible to consider all of these operations simultaneously and thereby develop at one stroke all of the terms of the SC and ZC equations.

However most of the flip-flops in the DDA are affected by a far greater number of operations and moreover by operations which are much less closely related. For example flip-flop B is affected by virtually all of the operations performed by the DDA, as is evidenced by the great number and variety of terms in the SB and ZB equations. It would be very difficult to treat all of these operations simultaneously without detrimentally affecting clarity of presentation.

In view of these considerations therefore, another procedure will be employed hereinafter for developing the terms of logical Equations 5 through 22, a procedure which it is believed provides an orderly and clear development both of the detailed operations of the DDA and of the terms of the logical equations. In this procedure, the operations of the DDA will be considered in the order in which these operations occur, as hereinbefore described, when an operator puts the DDA into operation by means of the switches provided on switch panel 32, shown in FIG. 3. As each operation is explained in detail, all of the terms, wherever they appear, of Equations 1–22 and 3a which are associated with that operation will be developed (and numbered in the order of their appearance). In this manner, after a complete detailed description of operation has been completed, all of the terms of the logical equations will have been developed.

Beginning now this detailed description of operation it will be remembered that, in placing the DDA into operation, an operator utilizes switches 57 to 60 and switch 62, provided on switch panel 32 shown in FIG. 3. A diagram illustrating the structure and associated circuit arrangement of fill-compute switch 56 is shown in FIG. 7a. In similar manner clear switch 57 and step switch 62 are illustrated in FIGS. 7b and 7c respectively.

Figure 7D:
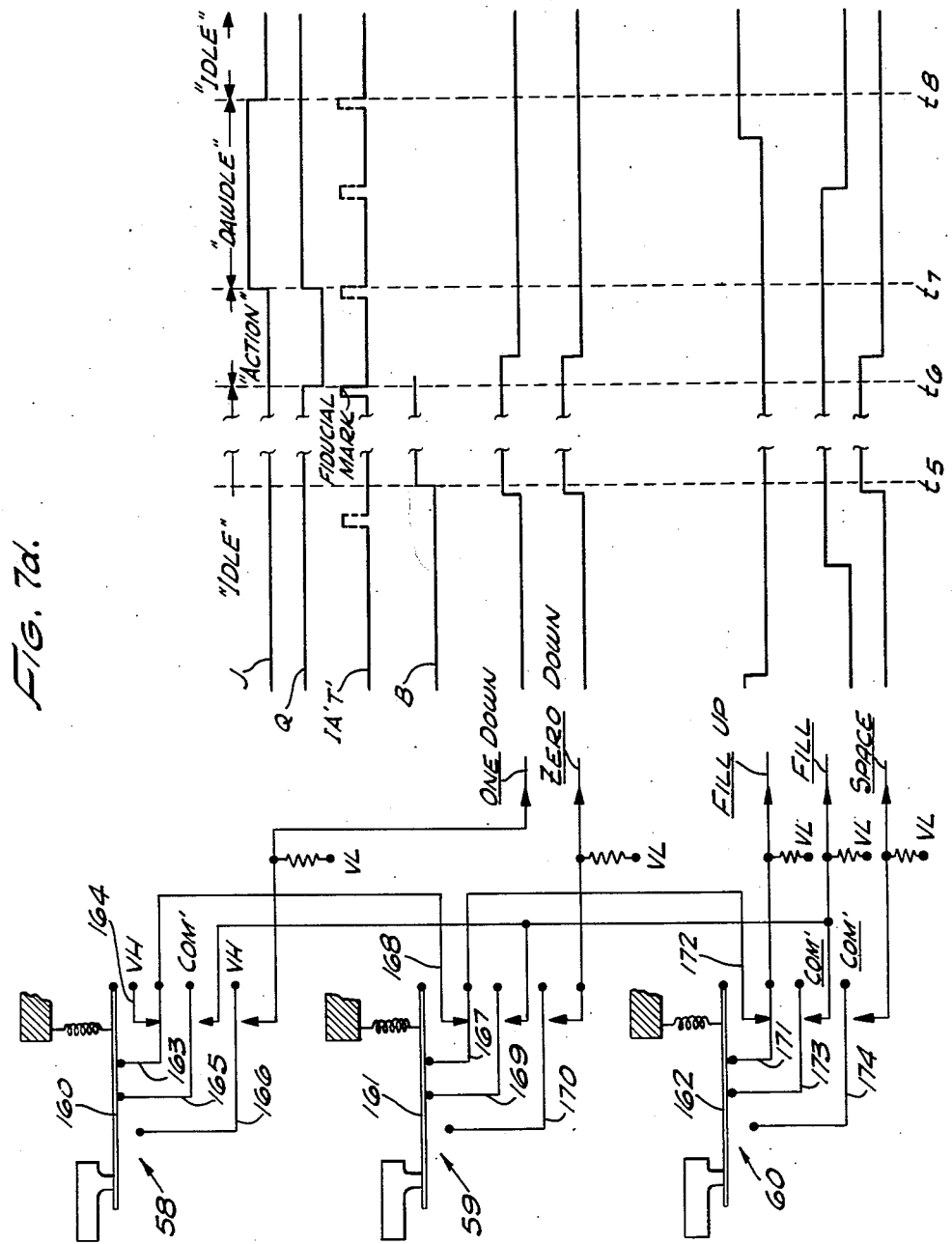

Switches 58, 59 and 60 have numerous interconnections therebetween and are therefore illustrated grouped together in FIG. 7d. However for purposes of clarity, only those contacts of switches 58, 59 and 60 which are related to their "fill" operations ("zero," "one" and "space") are shown in FIG. 7d. Switches 58, 59 and 60 are again illustrated in FIG. 7d, this diagram showing only those contacts of switches 58, 59 and 60 which are related to their "compute" functions ("start," "stop" and "once").

As illustrated in FIGS. 7a to 7d each switch is operable for generating one or more output signals, signals $\underline{Com}$, $\underline{Com'}$, $\underline{Ins_{up}}$, etc., it being understood that these signals comprise the switch signals which, as shown in FIG. 3, are applied to gating matrix 31. For purposes of clarity, as has been done hereinbefore, the same designation will be utilized for a signal and for the conductor over which it is applied. For example referring to FIG. 7a, the output conductors over which signals $\underline{Com}$ and $\underline{Com'}$ are applied will be designated hereinafter as conductors $\underline{Com}$ and $\underline{Com'}$ respectively.

It will be remembered that in placing the DDA in operation, the first step taken by an operator (assuming power has already been applied to the DDA) is to place fill-compute switch 56, at its fill position, as shown in FIG. 7a. As illustrated in FIG. 7a conductors $\underline{Com}$ and $\underline{Com'}$ are permanently connected through resistors to one terminal of a source of relatively low voltage $V_L$ while a swinger or pole 150 of switch 56 is directly connected to one terminal of a source of relatively high voltage $V_H$. It is therefore clear that when switch 56 is placed at its fill position (at which the swinger makes contact with conductor $\underline{Com'}$) signal $\underline{Com'}$ will be at a high level while signal $\underline{Com}$ will be at a low level. It will be noted referring to FIGS. 7d and 7e that signals $\underline{Com}$ and $\underline{Com'}$ are supplied to certain contacts of switches 58, 59 and 60 as well as to gating matrix 31.

"Clear" and "Mark" Operations

The next step performed by an operator is to depress and release clear switch 57 which as shown in FIG. 7b comprises four contacts operable in predetermined sequence under the control of a key 151 which is normally spring loaded to an up position. The following table, Table 2, summarizes these contacts and their action during a down and up stroke of key 151.

TABLE 2

[Clear Switch 57]

| Row | Contacts | | Contact action | |
|---|---|---|---|---|
| | Type | Between | Down stroke (read down) | Up stroke (read up) |
| 1 | Normal make | a pole 152 and conductor $Ins_{up}$. | Break | Make. |
| | do | a pole 153 and conductor $Ins$. | do | Do. |
| 2 | do | a pole 154 and conductor $Kl_{up}$. | do | Do. |
| 3 | do | A pole 155 and a conductor 156. | do | Do. |

It will be understood, in connection with Table 2 that the time sequence of contact action is indicated by row numbers, contacts which act simultaneously being placed together in a single row.

As indicated in the third column of Table 2, during a down stroke of key 151, the contacts made by poles 152 and 153 break simultaneously and then the contacts made by poles 154 and 155 break sequentially. During the succeeding up stroke of key 151, these contacts make in reverse order as shown in the fourth column of Table 2. Referring again to FIG. 7b, it is seen that the relatively high voltage $V_H$ is applied to poles 152 and 154 and through a resistor to conductor $Ins$ while the relatively low voltage $V_L$ is applied to pole 153 and through resistors to conductors $Ins_{up}$ and $Kl_{up}$.

Pole 155 is connected to one terminal of a source of −100 volts (this being the negative supply voltage of the flip-flops of the DDA). When the contact between pole 155 and conductor 156 is made the negative supply voltage is applied over conductor 156 to a predetermined "side" of every flip-flop in the DDA, the other "side" of each flip-flop being connected directly to the source of −100 volts. When the contact between pole 155 and conductor 156 is broken, the flip-flops no longer have balanced supply voltages and are thereby all held in their "0" states the flip-flops then being insensitive to applied input signals. When the contact between pole 155 and conductor 156 is made again, the flip-flops again have balanced supply voltages and can then again be set and zeroed by applied input signals.

For the purposes of illustrating "clear" and "mark" operations which are controlled by clear switch 57, there is provided in FIG. 7b waveforms of the switch output signals $Insert_{up}$, $Insert$, $Kl_{up}$ and −100 v. (the negative supply voltage) these signals being shown on a common time scale as they would appear during a single operation (depression and release) of clear switch 57. In addition there are shown on the same time scale illustrative waveforms of signals C, A, I, X, Q and J. Vertical dotted lines, provided in FIG. 7b, mark certain times $t_0$, $t_1$, $t_2$, $t_3$ and $t_4$ at which significant events occur in the "clear" and "mark" operations.

As illustrated in the waveforms of FIG. 7b as key 151 of switch 57 is depressed, first signal $\overline{Insert}_{up}$ falls to its low level ($V_L$) and simultaneously signal $\underline{Insert}$ rises to its high level ($V_H$). Next signal $\overline{K1}_{up}$ falls to its low level and then as key 151 is fully depressed the negative supply voltage $-100$ is removed from conductor 156 allowing the voltage on conductor 156 to rise to a fairly high level. During the return or up stroke of key 151 (assumed to begin at time $t_0$) these signals return to their initial values in reverse order. For example shortly before time $t_1$, the $-100$ volt negative supply voltage is reconnected to conductor 156; next, signal $\overline{K1}_{up}$ rises to its high level immediately before time $t_2$; and finally, immediately before time $t_4$ signal $\underline{Insert}$ returns to its low level and $\overline{Insert}_{up}$ rises to its high level.

At time $t_0$, it may be stated that the "clear" operation has been accomplished for at this time, all computer flip-flops including write flip-flops L and M are held in their "0" states thereby effectively removing all information from the flip-flops and moreover effectively erasing all information from the long and short channels by uniformly recording "0" valued signals in all the cells of these channels.

The "mark" operation is accomplished during the up or return stroke of key 151. At time $t_1$ the negative supply voltage has returned to its normal value of $-100$ volts, and as a result all computer flip-flops are again free to be set or zeroed in accordance with applied pulses. At this time therefore normal circulation of signals is renewed in the long channel, the "0" valued signals which have been recorded in the long channel circulating from L to M unchanged (as indicated by signal X at its low level). However normal circulation of signals in the short channel (from A to C reversed in value) is not renewed until immediately after $\overline{K1}_{up}$ rises to its high level (at time $t_2$). Thus at time $t_2$, flip-flop C is set to its "1" state for the first time. The term which is involved is:

$$S_pC = A'\overline{K1}_{up} \atop 5$$

which has been developed from other considerations hereinbefore.

Flip-flop C then remains in its "1" state for forty timing intervals until the first of the "1" valued signals which it is writing into the short channel reaches flip-flop A and is transferred to C reversed in value, whereupon C is sent to its "0" state. The term involved is:

$$Z_pC = A\underline{Com'} \atop 2$$

Thus flip-flop C thereafter has its state reversed every forty timing intervals, while A maintains a complementary state displaced by one timing interval from the state of C, as shown in FIG. 7b. In this manner forty "0" valued signals and forty "1" valued signals are alternately written into the short channel. The "0" valued signals as they appear in A demark the decode portion of each integrator section while the "1" valued signals as they appear in A demark the integrate portions of each integrator section. In this manner, the reversal of signals in the A to C transfer is utilized to record or "mark" the phase control marks (and initial "0" values of the $dz$ signals) into the short channel and thereby define the decode and integrate portions of each integrator section of the long channel.

With the integrator section thus defined it is possible to complete the "mark" operation by recording the fiducial mark in the long channel. As shown in FIG. 7b, flip-flop I is set to its "1" state, after the first T' time interval following the rise of signal A to its high level and is returned to its "0" state forty timing intervals later immediately after the first T time interval following the rise of signal C to its high level. Flip-flop I thereafter continues this sequence, being alternately in a "1" and "0" state every forty timing intervals throughout all "fill" operations (indicated by $\underline{Com}'$) and at any time that the DDA is in an "idle" condition (defined by QJ'). The terms defining operation of flip-flop I are:

$$S_pI = AT'\underline{Com}' + AT'QJ' \atop 8 \qquad 9$$

and $$Z_pI = TC \atop 10$$

Insertion or recording of the fiducial mark is accomplished upon the first T' timing interval in which flip-flop I is in its "1" state and flip-flop A is simultaneously in its "0" state (assuming, as shown in FIG. 7b, that $\underline{Insert}$ is high). At this time, as shown in FIG. 7b, signal X is raised to its high level for one timing interval to thereby reverse one of the "0" valued signals being transferred from L to M and thereby record a single "1" valued signal in the long channel as the fiducial mark. The term which defines this operation is:

$$X = \underline{Insert}\,IA'T'Q'J' \atop 11$$

Note that term 11 includes signals Q' and J'. Since flip-flops Q and J are initially zeroed by the "clear" operation, it is certain that term 11 will always be satisfied for the insertion of the fiducial mark. However to prevent recording of more than one fiducial mark, we must make certain that term 11 is no longer satisfied after the fiducial mark is recorded. To accomplish this, flip-flops Q and J are set to their "1" states at the same time that the fiducial mark is written into the long channel (at the completion of the single timing interval in which X is at a high level). In this manner the gating structure defined by term 11 for recording the fiducial mark is inactivated after it has accomplished its purpose. The terms involved in the described setting of Q and J are:

$$S_pQ = IA'T'\underline{Insert} \atop 12$$

$$S_pJ = \underline{Com}'IA'T'Q' \atop 13$$

Upon the setting of the Q and J flip-flops, the DDA is in its so-called "dawdle" condition in which the only operation that occurs is normal recirculation of signals in the long and short channels (and also the described operation of the I flip-flop). The "clear" and "mark" operations have now been entirely completed and all that remains to be done is to accomplish a transition from "dawdle" (QJ) to "idle" (QJ') for "idle" is the starting condition required for initiation of other operations by an operator. This transition from "dawdle" to "idle" is accomplished at time $t_4$ at the beginning of the integrator section following the rise of signal $\overline{Insert}_{up}$ to its high level. The term involved is:

$$Z_pJ = IA'T'\underline{Fill}_{up}\ \underline{Shift}_{up}\ \overline{Insert}_{up} \atop 14$$

where the factors $\underline{Fill}_{up}$ and $\underline{Shift}_{up}$ will be explained in greater detail below. During "idle" normal recirculation of signals continues without change.

*The "Fill" Operations ("One," "Zero" and "Space")*

After the "clear" and "mark" operations have been completed, the next step performed by an operator is to fill "1" and "0" valued signals by means of switches 58 and 59 respectively into the seventy-nine vacant cells of that integrator section in which the fiducial mark has been recorded in the preceding "mark" operation. As explained hereinbefore each signal being filled is recorded initially in the cell following the fiducial mark, all previously recorded signals being shifted back one cell. In this manner the integrator section is completely filled after seventy-nine signals have been serially entered therein, the first recorded signal then occupying the last cell of the integrator section while the last recorded signal occupies the second cell (the cell following the fiducial mark).

For purposes of explanation we will consider the insertion of just one of the seventy-nine signals, since the same process will merely be repeated for the insertion of the remaining signals. To accomplish the filling of a signal into the second cell of the integrator section, that signal is placed in flip-flop B. Upon the appearance of the fiducial mark, the signal in B is "effectively" transferred to M to thereby be recorded in the second cell of the integrator section. The word "effectively" is an important qualification in the above statement, for it must be understood that flip-flop B does not actually transfer its signal to M but instead controls (by controlling the X signal) the reversal or non-reversal of signals transferring from L to M in such manner that each signal arriving at M corresponds in value to the signal held in B.

This control of the L to M transfer by flip-flop B continues throughout the passage of the integrator section containing the fiducial mark. It will be remembered that each signal (with the exception of the last signal) previously stored in the integrator section is to be recorded one cell behind its previous position. To accomplish this, these signals, as they arrive in flip-flop L are transferred to B and (through the control of the L to M transfer by B) are "effectively" placed in M one timing interval later to be thereby recorded in the integrator section one cell behind their previous positions. The control of signal X by B ends when the last signal is in B and before it can effect M. Thus the last previously recorded signal is not recorded in the integrator section but is retained in B.

The retention of this last signal in B serves no purpose if another "1" or "0" signal is to be filled by an operator, for in this event the new "1" or "0" signal will be written into B and this old last signal will be lost. However the retention of this last signal is important in the space operation, for then this last signal is not replaced by an entering signal but is instead maintained in B and is thereby entered in the second cell of the integrator section in the same way that a signal is entered there in the "one" and "zero" operations. Thus the only difference between the "space," "zero" and "one" operations is in the initial condition of the flip-flop B. In the "zero" and "one" operations flip-flop B is initially set or zeroed to its "1" or "0" state in accordance with signals entered by an operator. In the "space" operation, the initial state of B is determined by the value of the previous last signal of the integrator section.

That circuit structure of switches 58, 59 and 60 which is associated with the "one," "zero" and "space" operations is shown in FIG. 7d. As illustrated in FIG. 7d, switch 58 is utilized to generate signal $One_{down}$, switch 59 generates signal $Zero_{down}$, and switch 60 generates signal Space. These three switches are connected together and through their mutual operation generate signals $Fill_{up}$ and Fill. Switches 58, 59 and 60 are seen to include keys 160, 161 and 162 respectively, which are normally spring loaded to an up position, each of these keys controlling the sequenced action of three contacts of their associated switches. The following table, Table 3, summarizes the contacts of each switch and their action during a down and up stroke of their associated keys.

TABLE 3

[Switches 58, 59 and 60]

| Switch | Contacts | | Contact action | |
|---|---|---|---|---|
| | Type | Between | Down stroke (read down) | Up stroke (read up) |
| 58 | Normal make | A pole 163 and a conductor 164 | Break | Make. |
| | Normal break | A pole 165 and conductor Fill | Make | Break. |
| | ----do---- | A pole 166 and conductor $One_{down}$ | ----do---- | Do. |
| 59 | Normal make | A pole 167 and a conductor 168 | Break | Make. |
| | Normal break | A pole 169 and conductor Fill | Make | Break. |
| | ----do---- | A pole 170 and conductor $Zero_{down}$ | ----do---- | Do. |
| 60 | Normal make | A pole 171 and a conductor 172 | Break | Make. |
| | Normal break | A pole 173 and conductor Fill | Make | Break. |
| | ----do---- | A pole 174 and conductor Space | ----do---- | Do. |

As shown in FIG. 7d conductor 168 is connected to pole 163 and conductor 172 is connected to pole 167. Signal $Com'$ is applied to poles 165, 169, 170, 173 and 174. The voltage $V_H$ is applied to conductor 164 and pole 166. Conductors $One_{down}$, $Zero_{down}$, $Fill_{up}$, Fill and Space are connected through resistors to the source of voltage $V_L$.

Upon depression of the key of any one of the switches, first signal $Fill_{up}$ drops from a normally high level to its low level ($V_L$). Next signal "Fill" rises from a normally low level to a high level (the high level of signal $Com'$). Finally upon the completion of the down stroke of the switch that signal ($One_{down}$, $Zero_{down}$ or Space) which is associated with the switch will rise to its high level.

For example if switch 58 is operated, signal $One_{down}$ will rise to its high level, while if switch 59 or 60 is operated signal $Zero_{down}$ or Space respectively will be generated. During the return stroke of a switch, these signals return to their normal levels in reverse order. For purposes of explanation, the waveforms of these signals are shown on a common time scale in FIG. 7d, each of these waveforms being set forth opposite the conductor on which it appears. In addition for purposes of illustration of operation there are provided on the same time scale, additional waveforms of signals J, Q, B and a signal $IA'T'$ (a signal which is high whenever I and A' and T' are simultaneously high). From a consideration of the waveforms shown in FIG. 7a it is clear that signal IA'T' uniquely defines the appearance in A of the first phase control mark of each integrator section, and thereby defines the appearance of the first cell of each integrator section (designated the "fiducial cell" since the fiducial mark may be filled into any one of these cells).

For purposes of clarity of explanation, each excursion of signal IA'T' which marks an empty fiducial cell is drawn with dotted lines while that excursion which marks a fiducial cell containing a fiducial mark is drawn with solid lines. Vertical dotted lines mark times $t_5$, $t_6$, $t_7$ and $t_8$ at which significant events occur in the "one," "zero" and "space" operations. All waveforms are broken between $t_5$ and $t_6$ to indicate passage of a considerable length of time (sufficient to allow the fiducial mark to appear).

In the "one," "zero" and "space" operations, the DDA is initially in its "idle" condition (QJ'). During this "idle" condition flip-flop B may be set, zeroed or left in its previous state in accordance with the rise to its high level of one of the signals $\underline{One}_{down}$, $\underline{Zero}_{down}$ or $\underline{Space}$ respectively. The terms involved in the setting or zeroing of B are:

$$S_pB = \underline{One}_{down}QJ' \quad 15$$

$$Z_pB = \underline{Zero}_{down}QJ' \quad 16$$

Signal B is shown in FIG. 7d as it would appear during the "One" operation and is therefore shown as rising to its high level at time $t_5$. Later when the fiducial mark appears in flip-flop L (IA'T'L), flip-flop Q is zeroed and the computer is sent into an "Action" condition (Q'J'). This "action" condition continues throughout the passage of the integrator section containing the fiducial mark and it is during this "action" condition that flip-flop B assumes control of signal X to thereby control the L to M transfer in the described manner. The term which is involved in the zeroing of Q to initiate the "action" condition is:

$$Z_pQ = IA'T'LJ'[B\underline{One}_{down} + B'\underline{Zero}_{down} + \underline{Space}] \quad 17$$

The term which defines the control of signal X by flip-flop B is the following:

$$X_p = \underline{Fill}\,Q'(LB' + L'B)(I' + A + T) \quad 18$$

In term 18 the signal function $(I' + A + T)$ defines those times at which signal IA'T' is not at its high level and therefore defines the omission of the fiducial mark position from the action state.

In term 18 the Boolean function $(LB' + L'B)$ indicates that signal X will be high, causing a reversal of the L to M transfer, only when L and B are different. Thus whenever flip-flops L and B contain different valued signals, the signal in L is reversed in value as it is transferred to M and is thereby made to agree with the signal in B. However if the signal in L has the same value as in B, signal X will be low and therefore the signal in L will be transferred unchanged to M. In this manner so long as term 18 is satisfied, flip-flop B controls the X signal in such manner that signals transferred from L to M are reversed or non-reversed to agree with the signal initially placed in B and the signals which are successively transferred to B from flip-flop L.

Terms 15 and 16 which define the initial setting or zeroing of flip-flop B have been developed hereinbefore. The terms which define the transfer of signals from L to B during the passage of the integrator section (while B controls signal X) are the following terms:

$$S_pB = \underline{Fill}\,Q'L \quad 19$$

$$Z_pB = \underline{Fill}(I' + A + T)Q'L \quad 20$$

At the end of the integrator section containing the fiducial mark (upon the next IA'T') flip-flops Q and J are simultaneously set to their "one" states (at time $t_7$) thus sending the computer in its "dawdle" condition. Since Q' is then no longer high, term 18 is no longer satisfied and therefore flip-flop B loses control of the X signal thus suspending the "fill" operation. The terms which accomplish the setting of Q and J at time $t_7$ are the following:

$$S_pQ = IA'T'\underline{Fill} \quad 21$$

$$S_pJ = \underline{Com}\,IA'T'Q' \quad 13$$

The "dawdle" condition is ended upon the next appearance of a fiducial cell (IA'T') following the rise of signal $\underline{Fill}_{up}$ to its high level. At this time flip-flop J is zeroed returning the computer to its "idle" condition QJ'. The term involved is:

$$Z_pJ = IA'T'(\underline{Fill}_{up} \cdot \underline{Shift}_{up} \cdot \underline{Insert}_{up}) \quad 14$$

*Step Operation*

After the integrator section containing the fiducial mark is completely filled in the manner described hereinabove, in order to fill the next integrator section it is necessary to step the fiducial mark to the first cell (the fiducial cell) of the next integrator section.

To accomplish this, after the fiducial mark appears a second or new fiducial mark is recorded in the first cell of the next integrator section. Then nothing is done until the original fiducial mark reappears (after one turn of the long channel). Upon reappearance of the original fiducial mark it is reversed in value thus effectively erasing it. Action is then suspended to avoid erasing the new fiducial mark. Thereafter the DDA is returned to an idle condition.

The "step" operation, it will be remembered is accomplished by actuation of switch 62 whose structure is shown in FIG. 7c. Switch 62 is seen to comprise a pole 175 which is normally spring loaded to an up position at which it makes contact with conductor $\underline{Shift}_{up}$ and is depressible to a lower position at which it makes contact with conductor $\underline{Shift}$. Conductors $\underline{Shift}$ and $\underline{Shift}_{up}$ are connected through resistors to the source $V_L$, while as shown in FIG. 7c voltage $V_H$ is applied to pole 175. Upon a down stroke of pole 175, first signal $\underline{Shift}_{up}$ drops to its low level and next in sequence signal $\underline{Shift}$ rises to its high level. During the return stroke of pole 175, signals $\underline{Shift}$ and $\underline{Shift}_{up}$ return in reverse sequence to their normal voltage levels as shown in the waveforms of these signals presented in FIG. 7c opposite the corresponding conductors.

In addition, on the same time scale there are provided waveforms of signals J, Q, X and IA'T', signal IA'T' again being drawn so that voltage excursions drawn with dotted lines indicate empty fiducial cells and voltage excursions drawn with solid lines indicates those fiducial cells in which fiducial marks appear. The time constants and inertia of switch 62 are such that the high level of signal "Shift" will always have a duration extending considerably over one turn of the long channel. Vertical dotted lines indicate times $t_9$, $t_{10}$, $t_{11}$ and $t_{12}$ at which significant events occur during the "step" operation. The waveforms shown are broken before $t_9$, $t_{11}$ and $t_{12}$ to indicate the passage of time.

Considering now in detail the events occurring during the "step" operation, at time $t_9$ upon the first appearance of the fiducial mark following the rise of signal "Shift" to its high level, flip-flop Q is zeroed to take the computer out of its "idle" condition QJ' and place it in an "action" condition Q'J'. The term which defines this zeroing of Q at the fiducial mark is:

$$Z_pQ = IA'T'LJ'\underline{Shift}$$
22

Thereafter at time $t_{10}$ upon the appearance of the following fiducial cell, a signal is filled into that cell so as to record a second fiducial mark. The original fiducial mark is of course still recorded in the preceding integrator section. Insertion of this second or new fiducial mark in the integrator section is accomplished by raising signal X to its high level for one timing interval so as to reverse the "0" valued signal in the fiducial cell as it is transferred from L to M thereby recording the new fiducial mark in the fiducial cell of the integrator section. The term in the X equation which defines this operation is the following:

$$Z_p = \underline{Shift}IA'T'Q'(J'+L)$$
23

At the same time (time $t_{10}$) that this new fiducial mark is recorded in the long channel, flip-flop J is set so as to send the DDA into a second action state Q'J. During this Q'J action state, term 22 will not be satisfied, for the reason that signal J', which it requires, is no longer at its high level. Setting of J in the described manner at time $t_{10}$ is defined by term 13 which has been developed hereinbefore.

The situation at this time is that there are two fiducial marks recorded in the fiducial cell of two successive integrator sections in the long channel. The first fiducial mark which will reappear in L will be the old or original fiducial mark which will then be erased by reversing it in value, while the second fiducial mark to appear will be the new fiducial mark which must be left unchanged. Consider therefore what occurs at time $t_{11}$. At this time the original fiducial mark reappears in flip-flop L and since signal L will then be at a high level, term 23 for the X signal is again satisfied so that X rises to its high level for another timing interval at time $t_{11}$ and thereby reverses this original fiducial mark as it is transferred to M. To prevent reversal of the succeeding (new) fiducial mark flip-flop Q is simultaneously set to its "1" state, thereby preventing term 23 from again being satisfied. The term which defines this setting of flip-flop Q at time $t_{11}$ is:

$$S_pQ = IA'T'L\underline{Com'}$$
24

The DDA is then in its "dawdle" condition QJ and thereafter returns to its "idle" condition at time $t_{12}$ upon the appearance of the fiducial cell following the return of signal $\underline{Shift}_{up}$ to its high level. Once again the term which defines this transition from "dawdle" to "idle" is term 14 developed hereinbefore.

*Start Operation*

After all integrator sections have been filled in the described manner and the fiducial mark has been returned to the first integrator section (or any desired integrator section) a computation may be initiated. To initiate the computation an operator first places fill-compute switch 56 in its lower "Compute" position, whereupon signal $\underline{Com}'$ falls to its low level and signal $\underline{Com}$ rises to its high level. As a result of these changes in the level of $\underline{Com}$ and $\underline{Com}'$ switches 58, 59 and 60 are no longer effective for the performance of the "one," "zero," and "space" operations but instead become operable for the performance of the "stop," "start" and "once" operations. Those contacts of switches 59 and 60 which are associated with "once," "start" and "stop" operations are shown in FIG. 7e.

As shown in FIG. 7e a single normal break contact of switch 59 is associated with the generation of signal $\underline{Start}$. Upon depression of key 161 of switch 59 a pole 180 to which signal $\underline{Com}$ is applied makes contact with conductor $\underline{Start}$ which is connected through a resistor to the source of voltage $V_L$. Thus upon depression of key 161, $\underline{Start}$ rises to its high level and upon release of key 161 signal $\underline{Start}$ falls to its low level as shown in the illustrative waveform provided in FIG. 7e.

At the time the $\underline{Start}$ operation is to be performed, the DDA will be in its "idle" condition QJ'. To start computation all that is required is to go out of "idle" to an action condition Q'J'. To accomplish this transition flip-flop Q is zeroed upon the first appearance of a fiducial mark following the rise of signal $\underline{Start}$ to its high level. The term which defines this zeroing of flip-flop Q is:

$$Z_pQ = IA'T'LJ'(\underline{Start} + \underline{Single-Start})$$
25

Computation is then immediately initiated as soon as the action condition Q'J' is established.

*"Stop" Operation*

At any time after computation has been started, it may be stopped by actuation of switch 58. To "stop" computation the computer is set into its "idle" state QJ' at the appearance of a fiducial mark. As shown in FIG. 7e switch 50 includes a single normal break contact which is associated with the stop operation, this contact being between a pole 181 to which signal $\underline{Com}$ is applied and conductor $\underline{Stop}$ which is connected through a resistor to the source of voltage $V_L$. Upon depression of key 160 of switch 58 pole 181 makes contact with conductor $\underline{Stop}$ whereupon signal $\underline{Stop}$ rises to its high level, dropping to its low level again when key 160 is released. After signal $\underline{Stop}$ goes to its high level flip-flop Q is set at the next appearance of the fiducial mark and simultaneously flip-flop J is zeroed. In this manner the DDA is set to its "idle" condition QJ'. The term defining the setting of flip-flop Q at the fiducial mark is:

$$S_pQ = IA'T'L(\underline{Stop} + \underline{Single-Stop})$$
26

The term which defines the zeroing of flip-flop J is:

$$Z_pJ = IA'T'\underline{Com}$$
27

Note that term 27 does not include signal L. It will be remembered that IA'T'L identifies that fiducial cell in which the fiducial mark appears. Thus it is clear that flip-flop J will be zeroed upon appearance of each fiducial cell, therefore being uniformly placed in its zero state at the beginning of each integrator section.

*Once Operation*

It is advisable to consider the "once" operation at this time since it is so closely related to the "start" and "stop" operations. The "once" operation is utilized after the computer has been stopped and causes the performance of an additional "unit computation," that is a computation extending over one turn of the long channel, from one appearance of the fiducial mark to the following reappearance of the fiducial mark. The DDA since it has been previously stopped is in an "idle" condition and is placed in its action condition Q'J' upon an appearance of the fiducial mark. Computation is then performed until the fiducial mark reappears and at this time the DDA is returned to its "idle" condition QJ'. The following table, Table 4, summarizes the nature and action of those contacts of switch 60 which are associated with the performance of the "once" operation.

TABLE 4

[Switch 60]

| Contact | | Contact action | |
| --- | --- | --- | --- |
| Type | Between | Down stroke (read down) | Up stroke (read up) |
| Normal break.. | Pole 182 and conductor Single-Stop. | Make | Break |
| Do......... | Pole 183 and conductor 184...... | .....do... | .....Do. |

As shown in FIG. 7e signal Com is applied to poles 182 and 183 and voltage $V_L$ is applied through a resistor to conductor Single-Stop. Conductor 184 is coupled through a capacitor 185 to conductor Single-Start and through a resistor to a source of negative voltage which may be of the order of —60 volts. Conductor Single-Start is connected through a resistor to a source of negative voltage which may be of the same order (—60 volts) and is also connected to a cathode of a diode 186 whose anode is connected to ground.

Upon actuation of switch 60 signal Single-Stop first rises to its high level and then at a later time returns to its low level. Signal Single-Start is initially at a zero voltage level (ground level), due to the clamping action of diode 186. If it be assumed that signal Com at its high level has a voltage level of about +35 volts, then upon pole 183 making contact with conductor 184, the voltage on this conductor is raised from its former level of —60 volts to a level of +35 volts, there being a total change in voltage of +95 volts. This sudden change in voltage is communicated through capacitor 185 to conductor Single-Start thereby raising the voltage level of signal Single-Start from 0 volts to +95 volts (at time $t_{13}$). This voltage level (which is stored on capacitor 185) slowly decays until at time $t_{14}$ it has dropped so low that it no longer serves as a high level signal for the gating network to which it is applied but instead has the effect of a low level signal. Thus the time interval during which signal Single-Start may be considered to have a high level voltage, extends from time $t_{13}$ to time $t_{14}$.

The time constants of the capacitor charging circuit are adjusted so that this interval is long enough to encompass at least one turn of the long channel, thereby assuring that the fiducial mark will appear at least once or twice during this time interval. Upon the first appearance of the fiducial mark flip-flop Q is zeroed thereby sending the computer into its action condition Q'J'.

The terms defining the zeroing of Q are terms 25 and 26 set forth hereinabove. Since initially signals Single-Stop and Single-Start are both at their high levels when the fiducial mark appears, both SQ and ZQ pulses are simultaneously produced thereby triggering Q to reverse its state from the "one" state to the "zero" state. When the fiducial mark reappears flip-flop Q will be returned to its "1" state. If the reappearance of the fiducial mark is within the time interval $t_{13}$ to $t_{14}$ flip-flop Q will be triggered to its "1" state, while if the fiducial mark reappears after time $t_{14}$ (but while Single-Stop is at its high level) flip-flop Q will be set to its "one" state. In either event flip-flop Q will return to its "one" state at the same time that flip-flop J is zeroed in the normal manner thereby returning the DDA to its "idle" condition.

*The Compute Operations*

Once computation has been initiated by means of the "start" operation the DDA begins to perform its normal "compute" operations. Several important routine operations are begun. The phasing of signal I is changed, as described hereinbefore in connection with FIG. 5, so that it rises to its high level only after the appearance of the integrate mark rather than at the beginning of each integrate portion. As indicated by FIGS. 4 and 5, during computation I is raised to its high level, immediately after appearance of the integrate mark in flip-flop M. The term which defines the setting of flip-flop I at that time is:

$$S_p I = AT'M \qquad 28$$

The terms which formerly controlled the setting of I, terms 8 and 9, are no longer effective at this time since signal Com' is no longer at its high level and the DDA is not in its "idle" condition QJ'.

Other routine operations that are uniformly performed during compute are that flip-flop P is set and flip-flop J is simultaneously zeroed after the first timing interval of each integrator section. The terms involved are:

$$S_p P = IA'T' \qquad 29$$

$$Z_p J = IA'T'\overline{Com} \qquad 27$$

It will be shown hereinbelow that normally flip-flop Q is at its "0" level at the completion of passage of an integrator section and will be in its "1" state only if the Y number of that integrator section has overflowed. Since flip-flop J is uniformly zeroed at the beginning of each integrator section, if Q is then in its "1" state (indicating overflow of the Y number of the preceding integrator section) the DDA is sent into its "idle" condition QJ'. This is the manner in which automatic stop upon overflow is accomplished.

However in normal computation as stated hereinbefore, flip-flop Q will always be in its "0" state as an integrator section begins its passage. Thereafter during passage of the integrator section (such as integrator section 7 shown in FIG. 4) the operations pertaining to the decode and integrate portions of the integrator section are performed.

*Decode Operations*

During passage of the decode portion of an integrator section, the $dx$ and $dy$ input signals are formed. We will consider first the formation of the $dy$ input signal.

It will be remembered that each $dy$ decode mark filled into the decode portion of an integrator section has the effect of selecting a corresponding $dz$ signal from the short channel for use in forming the $dy$ input signal. The first $dy$ decode mark to appear (assume referring to FIG. 4 that it is a mark in cell $dy_5$) has the effect of selecting the corresponding $dz$ signal ($dz_5$) as it appears in flip-flop B and placing it in flip-flop Q. The term defining this transfer of a $dz$ signal from B to Q in response to the appearance (in flip-flop M) of the first *dy* decode mark is:

$$S_pQ = \underline{ComI'TCJ'M}B \qquad 30$$

A $Z_pQ$ term for this operation is not required since it can be assumed that Q was initially in its "0" state (no overflow in the preceding integrator section). The signal J' found in term 30 will always be satisfied for the first appearing *dy* decode mark, since explained before flip-flop J is initially zeroed (see discussion in connection with term 27).

As the first *dy* decode mark appears in flip-flop M, flip-flop J is set to its "1" state and remains in this state until the completion of the decode. Thus during passage of a decode portion signal J at its high level uniquely signifies that at least one *dy* decode mark has already appeared. The term defining this setting of flip-flop J in response to the appearance of the first *dy* decode mark is:

$$S_pJ = \underline{ComI'TCQ'M} \qquad 31$$

If the first appearing *dy* decode mark is also the only *dy* decode mark in the decode portion, no further operations are needed to form the *dy* input signal since in this event flip-flop Q is left unchanged until the completion of the decode portion, whereby the *dz* signal which has been transferred to Q serves as the *dy* input signal.

However if additional *dy* decode marks (for example marks in cells $dy_4$, $dy_2$ and $dy_1$) have been filled in the decode portion, the initial transfer, hereinabove described, of a *dz* signal ($dz_5$) to flip-flop Q becomes merely the first step in the operations (the summation *dy* operations) by which the *dy* input signal is formed in flip-flop Q as the highest order digit of a new $\Sigma dy$ number, the remaining digits (in dinary notation) of the new $\Sigma dy$ number being, it will be remembered, found in the *dx* decode cells ($dx_4$, $dx_2$ and $dx_1$) which immediately follow such additional *dy* decode marks.

As the summation *dy* operations begin the signals stored in these cells represent lower order digits of the old value of $\Sigma dy$ (produced in the preceding turn of the long channel). The new $\Sigma dy$ number is formed by adding to these lower order digits of the old $\Sigma dy$ number those *dz* signals ($dz_5$, $dz_4$, $dz_2$ and $dz_1$) which are selected from the short channel by the *dy* decode marks.

The formation of the new $\Sigma dy$ number is best illustrated by a specific example which will be carried out with reference to FIG. 4. Assume that *dy* decode marks have been filled into cells $dy_1$, $dy_2$, $dy_4$ and $dy_5$. The *dz* signals selected by these marks are then in reverse order of appearance:

$$dz_1, dz_2, dz_4, dz_5$$

It will be assumed that these signals represent respectively corresponding values of:

$$+1, +1, -1, -1$$

Signals representing the lower order digits of the old $\Sigma dy$ number are found in reverse order of appearance, in cells:

$$dx_1, dx_2, dx_4$$

and will be assumed to have values respectively of:

$$+1, +1, +1$$

These signals (in $dx_1$, $dx_2$ and $dx_4$) represent successively lower order digits of the remainder of the old $\Sigma dy$ number in dinary notation. According to the dinary notation each successive digit is a $+1$ or $-1$ coefficient of successive powers of 2 (contrast this with the binary number notation in which each digit is a $+1$ or $0$ coefficient of successive powers of 2). As utilized in the DDA, the last appearing signal (the $+1$ signal in $dx_1$) is considered to have one-half the numerical weight of the lowest order digit $y_1$ of the Y number and therefore represents:

$$+1 \times 2^{-(n+1)}$$

where $2^{-n}$ is the weight of the lowest order digit $y_1$ of the Y number. Stated in another way this digit may be considered to represent the quantity:

$$+\tfrac{1}{2} \times 2^{-n}$$

In the same manner the next lower order digit (the $+1$ digit in $dx_2$) represents $+\tfrac{1}{4} \times 2^{-n}$ and the lowest order digit (the $+1$ digit in $dx_4$) represents $\tfrac{1}{8} \times 2^{-n}$. The value of the number made up of these digits is therefore $(+\tfrac{1}{2}+\tfrac{1}{4}+\tfrac{1}{8}) \times 2^{-n}$ or $+\tfrac{7}{8} \times 2^{-n}$. To summarize, the dinary number $+1+1+1$, with the described scaling represents $(+\tfrac{1}{2}+\tfrac{1}{4}+\tfrac{1}{8}) \times 2^{-n}$ or $\tfrac{7}{8} \times 2^{-n}$. This is the value of the remainder of the old $\Sigma dy$ number.

Moreover, as utilized in the DDA, the *dz* signals $dz_1$, $dz_2$ and $dz_4$ which have been selected by the *dy* decode marks are considered to be scaled in the same manner and in the same order. Thus the $+1$ value of $dz_1$ represents $+\tfrac{1}{2} \times 2^{-n}$, the $+1$ value of $dz_2$ represents $+\tfrac{1}{4} \times 2^{-n}$ and the $-1$ value of $dz_4$ represents $-\tfrac{1}{8} \times 2^{-n}$. These signals $dz_1$, $dz_2$ and $dz_4$ may thus be considered to represent digits of a second dinary number $(+1+1-1)$ having a value of $(\tfrac{1}{2}+\tfrac{1}{4}-\tfrac{1}{8}) \times 2^{-n}$ or $\tfrac{5}{8} \times 2^{-n}$.

The first appearing *dz* signal, signal $dz_5$, is treated as will be shown below as a digit which is carried into the lowest order place of this second dinary number and therefore having the same weight ($\tfrac{1}{8} \times 2^{-n}$) as the next appearing *dz* signal ($dz_4$). The quantity represented by the $-1$ value of $dz_5$ is therefore $-\tfrac{1}{8} \times 2^{-n}$. The total quantity represented by these selected *dz* digits is therefore $+\tfrac{5}{8} \times 2^{-n} - \tfrac{1}{8} \times 2^{-n}$ which is equal to $\tfrac{4}{8} \times 2^{-n}$.

As stated hereinbefore the new $\Sigma dy$ number is obtained by adding the selected *dz* digits to the remainder of the old $\Sigma dy$ number. Thus the new *dy* number should equal $(\tfrac{4}{8} \times 2^{-n}) + (\tfrac{7}{8} \times 2^{-n})$, the value of the new $\Sigma dy$ number therefore being $+1\tfrac{3}{8} \times 2^{-n}$.

The manner in which this addition may be carried out to obtain the required result is shown by Example 1 set forth hereinbelow:

EXAMPLE 1

| | Scale | $1 \times 2^{-n}$ | $1/2 \times 2^{-n}$ | $1/4 \times 2^{-n}$ | $1/8 \times 2^{-n}$ | $1/8 \times 2^{-n}$ | |
|---|---|---|---|---|---|---|---|
| | Carry digit | ⊕ | ⊕ | ⊖ | ⊕ | | |
| | Selected dz digits | | +1 | +1 | -1 | -1 | = +4/8 |
| | Remainder of old $\Sigma dy$ | | +1 | +1 | +1 | | = +7/8 |
| | New $\Sigma dy$ | +1 | +1 | -1 | +1 | | = $1\tfrac{3}{8}$ |
| | | Highest order digit of new $\Sigma dy$ | Remainder of new $\Sigma dy$ | | | | |

Example 1 illustrates the addition of the second dinary number (comprising all but the first appearing signal of the selected $dz$ signals) to the first dinary number which represents the remainder of old $\Sigma dy$. The first appearing $dz$ signal, as indicated by an arrow, is utilized as a carry digit into the lowest order place of the dinary numbers. Carry digits are encircled to distinguish them and to indicate that they appear only in flip-flop Q.

It is seen referring to Example 1, that the total sum of the digits in the lowest order ($\frac{1}{8} \times 2^{-n}$) column is $-1$ (representing $-\frac{1}{8}$). In the dinary notation as shown in FIG. 1 this value of $-\frac{1}{8}$ is made up of a ⊖ carry digit (representing $-\frac{1}{4}$) and a $+1$ sum digit (representing $+\frac{1}{8}$) in the new $\Sigma dy$.

Referring to the next order ($\frac{1}{4} \times 2^{-n}$) column, the total sum of the digits in this column is $+1$, signifying $+\frac{1}{4}$ and is made up, as shown, of a ⊕ carry digit (representing $+\frac{1}{2}$) and a $-1$ sum digit (representing $-\frac{1}{4}$) in new $\Sigma dy$.

Referring to the next order ($\frac{1}{2} \times 2^{-n}$) column, the total sum of the three digits in this column is $+3$ signifying $+1\frac{1}{2} \times 2^{-n}$ and is made up, as shown, of a ⊕ carry digit (representing $+1$) and $+1$ sum digit (representing $\frac{1}{2}$). The ⊕ carry digit produced here may be considered to represent the highest order digit of the new $\Sigma dy$ number and accordingly is not stored on the drum but is carried over in the Q flip-flop as the $dy$ input signal to the succeeding integrate portion while the sum digits $+1$ $-1$ $+1$ are recorded in the $dx_1$, $dx_2$ and $dx_4$ decode cells as the remainder of the new $\Sigma dy$. The new $\Sigma dy$ number therefore comprises:

$$\underset{\substack{\text{Highest order} \\ \text{digit of new} \\ \Sigma dy}}{⊕} \quad \underbrace{+1 \quad -1 \quad +1}_{\text{Reminder of new } \Sigma dy}$$

which is equivalent to the required value of:

$$⊕ \quad +\tfrac{1}{2} \quad -\tfrac{1}{4} \quad +\tfrac{1}{8} \quad \text{or} \ +1\tfrac{3}{8}$$

It is appropriate now to present the general rules which govern the addition of the digits of the first and second binary numbers. We present in Table 5 below all of the eight possible ways in which a $dz$ digit and a corresponding digit of old $\Sigma dy$ can be added with a carry digit to produce resultant sum and carry digits:

TABLE 5

| $dz$ digit | Old $\Sigma dy$ digit | Carry digit | Sum digit new $\Sigma dy$ | Carry digit new $\Sigma dy$ |
|---|---|---|---|---|
| $-1$ | $-1$ | $+1$ | $+1$ | $-1$ |
| $-1$ | $-1$ | $-1$ | $-1$ | $-1$ |
| $-1$ | $+1$ | $+1$ | $-1$ | $+1$ |
| $-1$ | $+1$ | $-1$ | $+1$ | $-1$ |
| $+1$ | $-1$ | $+1$ | $-1$ | $+1$ |
| $+1$ | $-1$ | $-1$ | $+1$ | $-1$ |
| $+1$ | $+1$ | $+1$ | $+1$ | $+1$ |
| $+1$ | $+1$ | $-1$ | $-1$ | $+1$ |

The manner in which Table 5 is formed may be summarized as follows: Whenever three digits (a $dz$ digit, summation $dy$ digit and carry digit) are to be added, it will be recognized that at least two of the digits must be identical, while the third digit may have either the same or opposite values as the like digits. The sum of the two like digits is represented by a like valued carry digit, while the third digit is represented by a like valued sum digit. Since the carry digit has twice the weight of the digits being added, it clearly represents the sum of the two identical digits.

In the actual operation of the DDA one of the operations generally defined by Table 5 above is carried out each time a $dy$ decode mark (excepting the first such mark) appears in flip-flop M. At this time, the $dz$ digit which is selected by the $dy$ decode mark is in flip-flop B, the old $\Sigma dy$ digit appears in flip-flop L, and the carry digit it will be remembered is held in flip-flop Q. The resultant sum digit is then written into its proper cell in the long channel by placing it in flip-flop M (through reversal or non-reversal of the L to M transfer by means of the X signal) while at the same time the new carry digit is placed in flip-flop Q.

The $+1$ and $-1$ values of the $dz$ digits are represented by "1" and "0" valued signals respectively in flip-flop B and the $+1$ and $-1$ values of carry digits are similarly represented by "1" and "0" valued signals in flip-flop Q. Although the $\Sigma dy$ digits could be represented in the same manner, the present DDA reverses this representation, $+1$ and $-1$ being represented by "0" and "1" valued signals respectively, in order to simplify the gating structure. Table 5 is rewritten herebelow as Table 6, with the appropriate signal values substituted for the $+1$ and $-1$ values of the digits, thus providing a truth table from which proper $Z_pQ$, $S_pQ$ and $X_p$ terms can be developed.

TABLE 6

| $dz$ signal in B | Old $\Sigma dy$ in L | Carry in Q | Sum of new $\Sigma dy$ in M | Carry of new $\Sigma dy$ in Q | Signal X |
|---|---|---|---|---|---|
| 0 | 1 | 1 | 0 | 0 | 1 |
| 0 | 1 | 0 | 1 | 0 | 0 |
| 0 | 0 | 1 | 1 | 1 | 1 |
| 0 | 0 | 0 | 0 | 0 | 0 |
| 1 | 1 | 1 | 1 | 1 | 0 |
| 1 | 1 | 0 | 0 | 0 | 1 |
| 1 | 0 | 1 | 0 | 1 | 0 |
| 1 | 0 | 0 | 1 | 1 | 1 |

Referring to Table 6, since the sum in M is to be obtained by reversing or not reversing the signal in L as it is transferred from L to M, it is clear that to effect this, signal X should be at its high 1 level whenever such a reversal is to be accomplished and should otherwise be at a low 0 level. A column defining the required levels of signal X is provided, a "1" being entered in this column for each disagreement between the signal in L and the signal which is to be entered in M.

To obtain the term which defines signal X at this time, it is necessary to define signal X in terms of the presently occurring signals in L, B and Q. It is clear, upon examination, that signal X has a 1 value only when the signals in B and Q are different. This condition is defined by the logical algebraic expression $(B+Q)(B'+Q')$ which is only satisfied (has a 1 value) when B and Q have different values. The complete term which defines X at this time is:

$$X_p = \underline{\text{ComTCMJ}}(Q+B)(Q'+B')$$
$$32$$

In term 32 $\underline{\text{ComTC}}$ defines time T in "compute-decode," signal $\overline{M}$ defines the appearance at this time of a $dy$ decode mark in M, and signal T indicates that there has been at least one previous $dy$ decode mark, as defined by term 31 set forth above.

In a similar manner, appropriate $S_pQ$ and $Z_pQ$ terms can be developed from Table 6. It is seen on examination that the new value of Q can be obtained if Q is set each time the condition $L'B$ is satisfied and zeroed each time the condition $LB'$ is satisfied. The complete $S_pQ$ and $Z_pQ$ terms are therefore:

$$S_pQ = \underline{\text{ComTCMJ}}L'B$$
$$33$$

$$Z_pQ = \underline{\text{ComTCMJ}}LB'$$
$$34$$

We have now derived all of the terms which are associated with the formation of the $dy$ input signal and have laid particular stress on explanation of the $\Sigma dy$ operations in which the *dy* input signal is formed (in Q) as the last carry resulting from the formation of the $\Sigma dy$ number, a number whose lower order digits are stored in those *dx* decode cells which immediately follow all but the first appearing mark of the *dy* decode marks which have been filled into the decode portion.

It is appropriate now to consider the formation of the *dx* input signal. Upon appearance of a *dx* decode mark in L at time T in decode (TCL), the corresponding *dz* signal in flip-flop B is transferred to flip-flop P to remain stored there until the completion of the decode portion. Since P is initially set (see discussion in connection with term 29) we need only consider the zeroing of P which will occur if a "0" valued *dz* signal is in B. Moreover it is necessary that the DDA does not perform this zeroing operation in response to signals which are actually digits of $\Sigma dy$ rather than true *dx* decode marks, and therefore the operation is only performed if the condition $(M'+J')$ is satisfied—that is if the immediately preceding signal, now in M, has a "0" value indicating that it is not a *dy* decode mark or if flip-flop J is in a "0" state indicating that the *dy* decode mark, if present, is the first appearing *dy* decode mark. The term which defines this operation is:

$$Z_pP = (Q'+J)\,TCLB'(M'+J')$$
35

In term 35 the signal functions $(Q'+J)$ signifies "not idle" and determines that the described operation will not be performed if the DDA enters its "idle" condition.

*"Integrate" Operations*

We have now completed, for the most part, description of those operations which occur during passage of a decode portion of an integrator section (such as integrator section 7 shown in FIG. 4), and we are now in a position to consider those operations which are performed during passage of the succeeding integrate portion (this passage being indicated at time T' by AT' and at time T by TC').

At the time that the decode portion is completed the following conditions prevail:

The *dx* input signal is in flip-flop P
The *dy* input signal is in flip-flop Q
The "old" *dz* signal which is to be erased, is in flip-flop B As shown in FIG. 4 this old *dz* signal is $dz_6$ which was in the last cell of the short channel and now appears in flip-flop B at the completion of precession of the *dz* signals. The new $dz_6$ signal has already been written into the short channel and the old $dz_6$ must be removed.

*Initial Integrate Operations—Sign Reversal, Exchange and Settings of P, Q and B*

During passage of the integrate portion, if a sign reversal mark has been filled into the integrate portion it has the effect as it appears in L of triggering or reversing the state of flip-flop P so as to at this time reverse the sign of the *dx* input signal. The terms defining this triggering operation are:

$$S_pP = AT'L$$
36

$$Z_pP = AT'L$$
37

It is clear from a consideration of terms 36 and 37 that these terms will be effective throughout the passage of the integrate portion for triggering flip-flop P. Thus during such passage any "1" valued signal appearing in flip-flop L at time T' will have the effect of triggering P. Flip-flop P will therefore be again triggered if there is an exchange mark and will also be triggered for each appearance in L of any of the signals $y_1, y_2 \ldots y_n$ or $y_{n+1}$ at its high level. The significance of these later triggerings of flip-flop P will be explained in connection with the exchange operation and with the operations associated with the addition of the Y number to the R number (the $Y+R$ addition).

After passage of the first cell of the integrate portion (that cell in which a sign reversal mark may be filled), the appearance in L at time T of the first "0" mark of the integrate portion has the effect of uniformly causing flip-flop B to be set to its "1" state, regardless of the previous state of flip-flop B. In this manner the old *dz* signal contained in flip-flop B is effectively erased. The term defining this uniform setting of flip-flop B is the following:

$$S_pB = \underline{ComI'TC'L'}$$
38

Following the first "0" mark of the integrate portion there may be additional "0" marks which are placed there to shorten the length of the succeeding Y and R numbers. As shown in FIG. 4, there is only a single "0" mark and the following cell is reversed for an exchange mark which may be filled into that position, while the succeeding cell contains the integrate mark. It will be remembered that the presence of an exchange mark indicates that the *dx* and *dy* inputs in P and Q are to be treated as though they were exchanged with respect to further operations of the DDA. In other words the signal in Q is to be treated as though it were the *dx* signal and the signal in P is to be treated as though it were *dy*.

Now in the normal operation of the DDA, assuming that there is not an exchange mark, as the integrate mark appears in L the *dy* input signal is held in Q and the *dx* input signal is held in P. At the beginning of the next timing interval, flip-flop B which has been previously set to its 1 state, is zeroed if *dx* and *dy* have different values and at the same time the *dy* input signal held in Q is transferred to P so that *dy* appears in both P and Q. Flip-flop B is thereafter used as a carry flip-flop in the $Y+R$ addition and flip-flop P is utilized as a so-called "$y+$carry" flip-flop in the $Y+dy$ addition. Flip-flop Q is utilized as a carry flip-flop in the $Y+dy$ addition.

The terms defining the transfer of the *dy* signal from Q to P are the following:

$$S_pP = \underline{Com'TC'LM'Q}$$
39

$$Z_pP = \underline{ComI'TC'LM'Q'}$$
40 where the signal L indicates the presence of the integrate mark in L and the signal M' indicates the absence of a preceding exchange mark.

The term defining the zeroing at this time of flip-flop B if *dx* (in P) and *dy* (in Q) have different values is:

$$Z_pB = \underline{ComITC'L}(P+Q)(P+Q')$$
41

Next we consider the special case which occurs if an exchange mark is present indicating that the signal initially in Q is to be viewed as the *dx* signal and that the signal initially in P is to be viewed as the *dy* signal. The zeroing of flip-flop B cannot be affected since this depends only upon *dx* and *dy* having different values and cannot be varied by the position of these signals. The end result desired is that *dy* appears in both P and Q and therefore to accomplish this P (which is now viewed as holding *dy*) transfers to Q so that thereafter *dy* appears in both P and Q.

Following now such an exchange operation, as the exchange mark appears in L it has the same effect as a sign reversal mark, as determined by terms 36 and 37 and therefore at this time flip-flop P is triggered to reverse the sign of what is now considered to be the $dy$ signal. If sign reversal is not desired a preceding sign reversal mark may be provided (the two sign reversals cancelling).

As the exchange mark passes into M, $dy$ (considered to be in P) transfers to Q so that thereafter $dy$ appears in both P and Q. The terms defining the transfer of the $dy$ signal from P to Q in response to the appearance of the exchange mark in M are:

$$S_pQ = \frac{ComI'TC'LMP}{42}$$

$$Z_pQ = \frac{ComI'TC'LMP'}{43}$$

From the preceding discussion, the general nature of the exchange operation may be understood. However for a true understanding of the reasons for the described initial settings of flip-flops B, P and Q it is necessary to consider in detail the nature of the $Y+dy$ addition and the $Y+R$ addition.

The $Y+dy$ Operations

It will be remembered that during passage of the integrate portion, the $+1$ or $-1$ $dy$ input (which is held in Q) is added to the Y number stored therein (the old Y number) and the resultant new Y number is rewritten. This is accomplished by selectively reversing or not reversing the digits of $(y_1, y_2, y_3 \ldots y_n, y_{n+1})$ of the old Y number as they are transferred from L to M.

It will also be remembered that the Y number is not written in normal binary form but is written in what has been called difference form and which is closely related to the binary form. The following rules define the relationship between the digits of a number in difference form (a difference number) and the digits of an equivalent binary number. The first or lowest order digit of a difference number is the same as the lowest order digit of the equivalent binary number. The second digit of the difference number is a 1 if the corresponding (second) digit of the binary number is different from the preceding (first) digit of the binary number, and is a 0 if these two digits of the binary number are alike. In the same manner each succeeding digit of the difference number is a 1 only if the corresponding digit of the binary number is different from the preceding digit of the binary number and is a 0 if these two digits of the binary number are alike.

Table 7, provided below for purposes of illustration, shows equivalent binary and difference forms for the numbers three through eight. The five lowest order digits of these numbers are shown.

TABLE 7

| Number | Binary form | Difference form |
|---|---|---|
| 3 | ..00011 | ..00101 |
| 4 | ..00100 | ..01100 |
| 5 | ..00101 | ..01111 |
| 6 | ..00110 | ..01010 |
| 7 | ..00111 | ..01001 |
| 8 | ..01000 | ..11000 |

We are of course, particularly interested in the process of adding one or subtracting one from a number in difference form. The process of adding one can be considered by examining the digit changes occurring as the difference numbers increase by one (from 3 to 4, 4 to 5 . . . etc.) and the process of subtracting one can be considered by examining the digit changes occurring as the difference numbers decrease by one (from 8 to 7, 7 to 6, etc.). Such an examination quickly reveals that two successive difference numbers differ in only two digits. The least significant digits are always different. The other digit pair to differ will always immediately follow the least significant 1 digit in the higher valued difference number.

Although the particular process for achieving the $Y+dy$ addition set forth above may be accomplished in a number of different ways, the process utilized in the present DDA was selected so as to minimize the gating circuitry required. In particular, in the $Y+dy$ addition, the DDA utilizes the previously established X circuit for controlling the L to M transfer and thereby control the reversal or non-reversal of the $y$ digits. In addition, the process utilizes a carry signal which is held in flip-flop Q for controlling the X circuit. The following tabulation is illustrative of this process.

TABULATION 1

| $y_{n+1}$ | $y_n$ | ... | $y_5$ | $y_4$ | $y_3$ | $y_2$ | $y_1$ | Old Y difference number |
| $Q_{n+1}$ | $Q_n$ | ... | $Q_5$ | $Q_4$ | $Q_3$ | $Q_2$ | $Q_1$ | Carry digits in Q, $Q_1=dy$ |
| $y_{n+1}^{new}$ | $y_n^{new}$ | ... | $y_5^{new}$ | $y_4^{new}$ | $y_3^{new}$ | $y_2^{new}$ | $y_1^{new}$ | New Y difference number |

It is assumed, referring to Tabulation 1, that $y_1$, $y_2 \ldots y_n$, $y_{n+1}$ are successive digits of the old Y difference number (as they appear in flip-flop L) and that $y_1^{new}, y_2^{new} \ldots y_n^{new}, y_{n+1}^{new}$ are the corresponding digits which will be formed (in M) of the new Y difference number. $Q_1, Q_2 \ldots Q_n, Q_{n+1}$ are the successive carry signals which are held in flip-flop Q. The initial value it will be remembered, which is held in Q at the start of the addition is $dy$ which is 0 for subtraction and 1 for addition.

The first step in performing the $Y+dy$ addition is that $y_1$ is uniformly reversed in value (as it is transferred from L to M) to form the corresponding digit $y_1^{new}$ of the new Y number. The term defining this operation is:

$$X_p = \frac{ComI'AT'MJ}{44}$$

The remaining step to be performed is the location of the least significant 1 in the higher valued difference number and the reversal of the immediately following digit. As set forth above, this reversal is to be controlled by flip-flop Q. In particular, the reversal is accomplished by setting Q to 0 whenever the least significant 1 is found, and controlling X by the term:

$$X = \frac{ComIAT'Q'J}{45}$$

Accordingly, all that remains is to establish in flip-flop Q the proper values for performing the operation defined above. The following truth table, Table 8, defines all of the possibilities for $y_1^{old}$, $y_1^{new}$, $Q_1$ and $Q_2$ at the end of the first step.

TABLE 8

| $Q_1$ | $y_1^{old}$ | $y_1^{new}$ | $Q_2$ |
|---|---|---|---|
| 1 | 0 | 1 | 0 |
| 1 | 1 | 0 | 1 |
| 0 | 0 | 1 | 1 |
| 0 | 1 | 0 | 0 |

It can be seen from Table 8, that whether the $y+dy$ addition is add 1 ($Q_1=1$) or subtract 1 ($Q_1=0$), $y_1^{new}$ is reverse or complement of $y_1^{old}$. The state of $Q_2$, on the other hand is dependent upon $Q_1$. More particularly, if $Q_1=1$ then the digit of the higher valued difference number is $y_1^{new}$, and Q must be set to 1 when $y_1^{new}$ is 0 and set to 0 when $y_1^{new}$ is 1. On the other hand, when $Q_1=0$, the digit of the higher-valued difference number is $y_1^{old}$ and Q must be set to 1 and 0 when $y_1^{old}$ is 0 and 1, respectively.

From Table 8, therefore, it is readily seen that Q must be reversed only when $y_1^{new}$ (which is in M) is 1, and should remain the same under all other conditions. The terms defining this reversing or triggering operation are:

$$S_pQ = \frac{ComITMJ}{46}$$

$$Z_pQ = \frac{ComITMJ}{47}$$

Once $Q_2$ has been formed, the next step in the $Y+dy$ addition is to form $y_2^{new}$. The rule that is followed is that set forth above, namely, if $Q_2$ is 0 then $y_2$ will be reversed (in transferring from L to M) to form $y_2^{new}$, while if $Q_2$ is a 1 then $y_2$ will not be reversed in forming $y_2^{new}$. Succeeding carries are formed in the same way that $Q_2$ was formed—that is flip-flop Q is triggered whenever the preceding $y^{new}$ is a 1. Terms 46 and 47 therefore account for the formation of succeeding carries. Also succeeding $y^{new}$ signals are formed in the same way that $y_2^{new}$ was formed—by reversal of the y digit if the corresponding carry in Q is a 0. Therefore term 45 continues to govern the formation of succeeding $y^{new}$ digits.

Whenever any of the carries $Q_2$, $Q_3$, $Q_4$ ... etc. is formed as a 0, the next reversal of y to $y^{new}$ is performed in the usual manner (this being the described second digit reversal in the $Y+dy$ addition) and thereafter all of the described operations associated with the $Y+dy$ addition are suspended, normal (unreversed) L to M transfers taking place thereafter so that the remaining digits of the Y number are rewritten unchanged and Q stays in its 0 state for the remainder of the integrate operation.

To accomplish such suspension of operation, flip-flop J is zeroed whenever Q goes to its "0" state. The term defining this operation is:

$$Z_pJ = \frac{ComIAT'Q'}{48}$$

It will be noted that terms 45, 46 and 47 all require signal J at its high level and therefore it is clear that after J is zeroed the operations defined by these terms will no longer be performed.

Understanding of the described processes for performing the $Y+dy$ addition will be assisted by consideration of a specific example which is illustrated herebelow in Tabulation 2.

In Tabulation 2 there is illustrated the addition of one ($dy=1$) to an old Y difference number having a value of $7\times2^{-n}$, to thereby form a new Y difference number having a value of $8\times2^{-n}$. The format of Tabulation 2 is essentially the same as that of Tabulation 1. Following now through this example, first $y_1$ is uniformly reversed to form $y_1^{new}$. Since $y_1^{new}$ is a 0, Q is not changed and therefore retains its 1 value ($Q_2$). Because $Q_2=1$, $y_2$ is not reversed in forming $y_2^{new}=0$. These operations continue in the same manner until $Q_5=0$ is formed. The second reversal $y_5=0$ to $y_5^{new}=1$ is then performed and at that time, flip-flop J is zeroed to thereby suspend the described operations. Flip-flop Q then remains in its "0" state for the remainder of the Y number and succeeding y digits are transferred unchanged from L to M to form corresponding $y^{new}$ digits. Referring to Table 7 one can verify that the difference number 8 has indeed been obtained from the difference number 7.

It can be seen from a consideration of a few examples that the carry digits which are held in Q during the course of the $Y+dy$ addition actually correspond exactly to the binary carries or borrows which would be respectively produced by the addition ($dy=+1$) or subtraction ($dy=-1$) of one from the Y number, if the Y number were in binary form rather than in difference form. From this, it is clear that Q remaining in its 1 state at the completion of the passage of the Y number indicates that a carry or borrow has been produced (by the addition or subtraction of one from the Y number) which has propagated the length of the Y number and has finally resulted in overflow of the Y number. Thus as explained before Q in its 1 state at the completion of the Y number indicates overflow while Q in its 0 state at that time indicates no overflow. Any overflow indication in Q is utilized as herebefore explained to initiate an automatic stop of the DDA.

The $Y+R$ Addition Process

As explained hereinbefore, during passage of the integrate portion of an integrate section the binary digits of the new R number are formed and are written into the long channel in the same cells formerly occupied by the binary digits of the old R number. The carry resulting from the formation of each digit is placed in flip-flop B, the final carry in B (resulting from the formation of the sign digit of the new R number) therefore serving as the $dz$ output signal originating from this integrator section.

It will be remembered that the new R number is related to the old R number and the old Y number, in the manner defined by the following equation:

$$R_{new} = R_{old} + Y_{old} \cdot dx + K$$

As indicated by the above equation, in forming the new R number ($R_{new}$), the old Y number ($Y_{old}$) is added to or subtracted from the old R number ($R_{old}$) in accordance with the $+1$ or $-1$ value of the $dx$ input and in addition a correction term K is added which, as stated before, has the effect of incorporating so-called "round-off," "trapezoidal" and "subtraction" corrections in the newly formed R number.

The value of the correction term K is related to the value of $dx$ and $dy$ as summarized by the following table, Table 9.

TABULATION 2

| | $Q_{n+1}$ | $Q_n$ | ... | $Q_5$ | $Q_4$ | $Q_3$ | $Q_2$ | $Q_1$ | |
|---|---|---|---|---|---|---|---|---|---|
| | $y_{n+1}$ | $y_n$ | ... | $y_5$ | $y_4$ | $y_3$ | $y_2$ | $y_1$ | |
| | 0 | 0 | | 0 | 1 | 0 | 0 | 1 | Old Y difference number $= 7\times2^{-n}$ |
| 0 | 0 | 0 | | 0 | 1 | 1 | 1 | 1 | |
| 0 | 0 | 0 | | 1 | 1 | 0 | 0 | 0 | $1dy$ Carry digits in Q, $Q_1=1$; New Y difference number $= 8\times2^{-n}$ |
| | $y_{n+1}^{new}$ | $y_n^{new}$ | ... | $y_5^{new}$ | $y_4^{new}$ | $y_3^{new}$ | $y_2^{new}$ | $y_1^{new}$ | |

TABLE 9

|  | Addition | | Subtraction | |
| --- | --- | --- | --- | --- |
| dx | +1 | +1 | −1 | −1 |
| dy | +1 | −1 | +1 | −1 |
| Trapezoidal correction=½ dy·dx | +½ | −½ | −½ | +½ |
| Round-off correction—add ½ in addition, subtract ½ in subtraction | +½ | +½ | −½ | −½ |
| Subtraction correction—add 1 in subtraction |  |  | +1 | +1 |
| K=total correction | 1 | 0 | 0 | 1 |
| dy in flip-flop P | 1 | 0 | 1 | 0 |

The nature of the various corrections shown in Table 9 will be briefly described. Considering first the "trapezoidal correction," let us imagine a smooth curve plotting the growth of the Y number. As the Y number changes (over an interval $dx$) in value from $Y_{old}$ to $Y_{new}$, the curve during this interval ($dx$) may be considered to be a substantially straight line passing between $Y_{old}$ and $Y_{new}$. The incremental area lying beneath the curve over this interval ($dx$) is trapezoidal in shape and therefore has the following value:

$$\text{incremental area} = \frac{Y_{old} + Y_{new}}{2} \cdot dx$$

The value of this incremental area in the amount by which $R_{old}$ must be increased to form $R_{new}$. In evaluating this incremental area, it will be remembered that $Y_{new} = Y_{old} + dy$. Substituting this value of $Y_{new}$ in the above equation, there is obtained:

$$\text{incremental area} = \frac{2Y_{old} + dy}{2} \cdot dx$$

$$= Y_{old} \cdot dx + \frac{1}{2} dy \cdot dx$$

trapezoidal correction

The quantity $Y_{old} \cdot dx$ is already included in the equation $R_{new} = R_{old} + Y_{old} \cdot dx + K$. To include the additional trapezoidal correction $\frac{1}{2} dy \cdot dx$, it must be treated as a component of the correction term K, as shown in Table 9. Thus referring to Table 9, when $dx = +1$ and $dy = +1$, then the trapezoidal correction $= \frac{1}{2} dy \cdot dx = \frac{1}{2}(+1)(+1) = +\frac{1}{2}$ The remaining trapezoidal correction entries in Table 9 may be similarly obtained.

Considering next the "round-off correction," it will be understood that the accuracy of representation of quantities by the Y number is limited by the fact that the Y number is not of infinite length. In using a limited number of digits in the Y number, lower order digits are effectively discarded. However much of the loss in accuracy caused by the effective discarding of lower order digits can be regained by following a round-off procedure. The value of the sum of such lower order digits could lie between 1 and 0, and is assumed therefore to be equal on the average to ½. Round-off may therefore be accomplished by considering $Y_{old}$ to be larger by ½ in its least significant place. Thus when $Y_{old}$ is added to $R_{old}$ ($dx = +1$), $R_{new}$ must be additionally increased by ½ and when $Y_{old}$ is subtracted from $R_{old}$ ($dx = -1$), $R_{new}$ must be additionally decreased by ½, as shown by the corresponding "round-off correction" entries in Table 9.

Considering next the "subtraction correction," it will be known by those skilled in the art that one of the most common ways in which one binary number is subtracted from another binary number is to reverse or complement all the digits of the subtrahend, then proceed as in normal addition and finally add one to the lowest order digit of the sum thereby produced. In the DDA of the present invention an operation very similar to this process is performed whenever the Y number is subtracted from the R number. Although the Y number is not present in normal binary form but is available only as a difference number, in adding or subtracting the Y number to the R number it is effectively converted to binary form, the digits of the binary number being reversed in value when Y is subtracted from R. Therefore whenever Y is subtracted from R it is necessary to additionally add one to the lowest order digit of the new R number thereby formed, as shown by the corresponding entries for the subtraction correction in Table 9.

The total correction K which is to be added in forming the new R number is equal to the sum of the corresponding "trapezoidal," "round-off" and "subtraction" corrections. Thus as shown in Table 9 when $dx$ and $dy$ both have +1 values the total correction K is equal to 1 ($\frac{1}{2} + \frac{1}{2} = 1$). When $dx = +1$ and $dy = -1$, the total correction $K = -\frac{1}{2} + \frac{1}{2} = 0$. When $dx = -1$ and $dy = +1$, the total correction $K = -\frac{1}{2} - \frac{1}{2} + 1 = 0$ and finally when $dx$ and $dy$ are both −1, the total correction K is equal to one ($\frac{1}{2} - \frac{1}{2} + 1 = 1$).

The last row in Table 9 is entitled "$dy$ in flip-flop P." It will be remembered that at the time the $Y + R$ addition is to be begun, $dy$ is held in flip-flop P, a +1 value of $dy$ being represented by a "1" valued signal in flip-flop P and a −1 value of $dy$ being represented by a "0" valued signal in flip-flop P. Thus each of the entries in this last row of Table 9 corresponds to such representation in P of the $dy$ values shown in the second row of Table 9.

It will be noted that for addition ($dx = +1$) the total correction K is equal to $dy$ in flip-flop P, while for subtraction ($dx = -1$), the total correction K is equal to the reverse of $dy$ in flip-flop P. Another way of stating this is that $K = 0$ only when $dx$ and $dy$ are different and is otherwise equal to 1.

In discussing the performance of the $Y + R$ addition, it is useful to set up a correspondence between the digits of the Y number in difference form and the corresponding digits of the Y number in normal binary form. As defined hereinabove, the successively higher order digits of the old Y difference numbers (reading from right to left) are:

$y_{n+1} y_n \ldots y_4 y_3 y_2 y_1 \}$old Y difference number and the corresponding digits of this number in binary form will be designated respectively as:

$y_{n+1}{}^b y_n{}^b \ldots y_4{}^b y_3{}^b y_2{}^b y_1{}^b \}$Y binary number where corresponding digits of the equivalent binary and difference numbers, have like subscripts.

If the Y binary number is complemented, each of its digits is reversed in value, these reversed digits being designated respectively as:

$y_{n+1}{}^{b'} y_n{}^{b'} \ldots y_4{}^{b'} y_3{}^{b'} y_2{}^{b'} y_2{}^{b'} y_1{}^{b'} \}$complemented Y binary number It is of considerable interest to note that each digit (excluding the first digit) of the Y difference number indicates changes between corresponding digits of the complemented Y binary number as well as between the corresponding digits of the normal Y binary number. For example if $y_2 = 0$ this indicates that $y_2{}^{b'}$ is the same as $y_1{}^{b'}$ as well as that $y_2{}^b$ is the same as $y_1{}^b$. If $y_2 = 1$, then it is indicated that $y_2{}^{b'}$ is the reverse of $y_1{}^{b'}$ as well as that $y_2{}^b$ is the reverse of $y_1{}^b$. The fact that the digits of the Y difference number represent the changes in both the complemented and normal Y binary numbers is of great importance and makes it possible to effectively complement the Y number by operations that affect only the first digit of the Y difference number.

Keeping the described nomenclature in mind, we can now develop the manner in which the $Y + R$ addition operations are performed. Let us assume for the moment for purposes of illustration that the digits of the Y binary number were available. If this were true, then addition of $Y_{old}$, $R_{old}$ and K to form $R_{new}$ could be readily accomplished as illustrated by the following tabulation, Tabulation 3, which shows the formation of $R_{new}$ when $dx=+1$. Under this condition $$R_{new}=R_{old}+Y_{old}+K$$

TABULATION 3

| $r_{n+1}$ | $r_n$ ........ $r_5$ | $r_4$ | $r_3$ | $r_2$ | $r_1$ | Old R number ($R_{old}$) |
|---|---|---|---|---|---|---|
| $(y_{n+1}^b+c_{n+1})$ | $(y_n^b+c_n)$....$(y_5^b+c_5)$ | $(y_4^b+c_4)$ | $(y_3^b+c_3)$ | $(y_2^b+c_2)$ | $(y_1^b+K)$ | $y^b+c$, $c_1=K$ |
| $r_{n+1}^{new}$ | $r_n^{new}$........$r_5^{new}$ | $r_4^{new}$ | $r_3^{new}$ | $r_2^{new}$ | $r_1^{new}$ | New R number ($R_{new}$) |
| $dz$ | $c_{n+1}$........$c_6$ | $c_5$ | $c_4$ | $c_3$ | $c_2$ | $c_1=K$ Binary carries $c$ |

According to the ordinary rules of binary addition, the first digit of $R_{new}$, digit $r_1^{new}$ is equal to $r_1+y_1^b+K$. As illustrated in Tabulation 3, $r_1^{new}$ is obtained by first summing $y_1^b$ and $K$ to form the quantity $(y_1^b+K)$ which is then added to $r_1$ to form $r_1^{new}$ and a resultant binary carry $c_2$. The binary carry $c_2$ resulting from the formation of $r_1^{new}$ is recorded for later utilization in forming $r_2^{new}$. The digit $r_2^{new}$ is of course equal to the binary sum $r_2+y_2^b+c_2$ and is obtained by summing $y_2^b$ and $c_2$ to form the quantity $(y_2^b+c_2)$ which is then added to $r_2$ to form $r_2^{new}$ and a new carry $c_3$. The same process is repeated for the formation of each of the successive digits of $R_{new}$. The resultant number $R_{new}$ thereby produced is equal to $R_{old}+Y_{old}+K$ and therefore corresponds to the result desired when $dx=+1$. It is seen that in this process, the addition of the quantity $K$ is obtained by treating $K$ as though it were an initial carry $c_1$ affecting the lowest order digit position.

When $dx=-1$, it is necessary to subtract $Y_{old}$ from $R_{old}$ in forming $R_{new}$. $R_{new}$ is then to be equal to $R_{old}-Y_{old}+K$. To accomplish this subtraction it is customary to reverse the binary digits of $Y_{old}$ (assuming still for purposes of example that the digits of the Y binary number are available), add one to the lowest order digit and then proceed as in normal addition. In the example of such a subtraction provided herebelow, in Tabulation 4, it is assumed that the $+1$ subtraction correction which is to be added to the lowest order digit position is included, as hereinbefore explained, in the quantity $K$ which serves as the initial carry $c_1$.

TABULATION 4

| $r_{n+1}$ | $r_n$.........$r_4$ | $r_3$ | $r_2$ | $r_1$ | $R_{old}$ |
|---|---|---|---|---|---|
| $(y_{n+1}^{b'}+c_{n+1})$ | $(y_n^{b'}+c_m)$...$(y_4^{b'}+c_4)$ | $(y_3^{b'}+c_3)$ | $(y_2^{b'}+c_2)$ | $(y_1^{b'}+K)$ | $y^{b'}+c$, $c_1=K$ |
| $r_{n+1}^{new}$ | $r_n^{new}$........$r_4^{new}$ | $r_3^{new}$ | $r_2^{new}$ | $r_1^{new}$ | $R_{new}$ |
| $dz$ | $c_{n+1}$........$c_5$ | $c_4$ | $c_3$ | $c_2$ | $c_1=K$ binary carries $c$ |

In this hypothetical subtraction, $r_1^{new}=r_1+y_1^{b'}+K$ (where $y_1^{b'}$ is the reverse of $y_1^b$ and the required $+1$ subtraction correction is included in $K$). To obtain $r_1^{new}$, $y_1^{b'}$ and $K$ are summed to form the quantity $(y_1^{b'}+K)$ which is then added to $r_1$ to form $r_1^{new}$ and a carry $c_2$. The digit $r_2^{new}$ is obtained in similar manner by adding the quantity $(y_2^{b'}+c_2)$ to $r$, to form $r_2^{new}$ and a carry $c_3$. Succeeding digits of $R_{new}$ are similarly obtained.

The hypothetical addition and subtraction processes described above in connection with Tabulations 3 and 4 could readily be followed through if the Y number were available in binary form (so that the digits $y_1^b$, $y_2^b$ ... etc. would be available). The principal disadvantage of such a mode of operation, is as hereinbefore explained that it is necessary to remember in some fashion throughout the operation whether an addition ($dx=+1$) or a subtraction ($dx=-1$) is being performed so that it can be determined whether the digits $y_1^b$, $y_2^b$ etc. are to be added in normal fashion or are to be reversed or complemented in value before being added. In prior art DDA's, an extra flip-flop is utilized which is devoted to storing $dx$ throughout the operation so as to distinguish whether an addition or subtraction is performed.

However in the DDA of the present invention, because of the fact that the Y number is stored in difference notation (the digits $y_1$, $y_2$ ... etc. being available) it is possible to develop a process for performing the above-described operations which does not require any storage or knowledge of $dx$ except at the time that the initial carry $K$ is formed. Thereafter in a perfectly uniform operation, the successive $y^b+c$ quantities (in addition) or $y^{b'}+c$ quantities (in subtraction) are developed and added to the corresponding digits of $R_{old}$ to form the resultant digits of $R_{new}$. All operations performed in this process are invariant in both addition and subtraction.

The nature of these processes, are illustrated by the following tabulation, Tabulation 5.

TABULATION 5

| T | T' | T.............T | T' | T | T' | T | T' | Contents of flip-flop T |
|---|---|---|---|---|---|---|---|---|
| $r_{n+1}$ | $y_{n+1}$ | $r_n$.............$r_3$ | $y_3$ | $r_2$ | $y_2$ | $r_1$ | $y_1$ | Interplexed digits of Y and R numbers (in L) |
| $P_{n+1}$ | $P_{n+1}^i$ | $P_n$.............$P_3$ | $P_3^i$ | $P_2$ | $P_2^i$ | $P_1$ | $P_1^i$ | Addition: $y^b+c$ as $P_1$, $P_2$......$P_1^i=dy$ subtraction: $y^{b'}+c$ as $P_1$, $P_2$.. |
| $r_{n+1}^{new}$ | | $r_n^{new}$............$r_3^{new}$ | | $r_2^{new}$ | | $r_1^{new}$ | | Digits of $R_{new}$ (in M) |
| $dz$ | $c_{n+1}$ | $c_{n+1}$............$c_3$ | $c_3$ | $c_2$ | $c_2$ | $c_1$ | $c_1$ | Binary carries $c$ (in B) $c_1=K$ |

It will be remembered, as shown in Tabulation 5, that the successive digits of $Y_{old}$ and $R_{old}$ are stored in interplexed order and appear in that order in flip-flop L, digits of $Y_{old}$ appearing in L at time T' and digits of $R_{old}$ appearing in L at times T. Each $(y^b+c)$ quantity or $(y^{b'}+c)$ quantity as it is formed is placed in flip-flop P, these successive signals $(y_1^b+c_1, y_2^b+c_2 \ldots$ etc. in addition and $y_1^{b'}+c_1, y_2^{b'}+c_2 \ldots$ etc. in subtraction) being designated in Tabulation 5 as signals $P_1$, $P_2 \ldots$ etc. respectively which are placed in flip-flop P at times T. Intermediate values appearing successively in flip-flop P on T' time intervals are designated $P_1^i$, $P_2^i \ldots$ etc. It will be remembered that $dy$ is initially placed in P and therefore $P_1^i=dy$. The binary carries $c_1, c_2 \ldots$ etc. are placed in flip-flop B.

It will be remembered, from Tabulations 3 and 4, that in both addition and subtraction, the initial carry $c_1$ (which is to be placed in B) is equal to the correction term $K$. As defined by Table 9, the correction term $K=0$ only when $dx$ and $dy$ are different and is otherwise equal to 1. Thus the placing of $K$ in flip-flop B should be done at that earlier time at which $dx$ and $dy$ are both available (when $dx$ is in flip-flop P and $dy$ is flip-flop Q). The term which defines such placement of K in flip-flop B has already been presented hereinbefore without full explanation and is:

$$Z_pB = \underline{ComI'TC'L}(P+Q)(P'+Q')$$
$$41$$

It is now clear that term 41 defines the placement of the correction term K in flip-flop B to serve there as the initial carry $c_1$.

The next operation which must be explained is the formation and placement in P of the quantity $P_1$, it being remembered from Tabulations 3 and 4 that in addition (when $dx=+1$) $P_1=y_1^b+K$ and in subtraction (when $dx=-1$) $P_1=y_1^{b'}+K$. Essentially this operation reduces to the problem of determining $P_1$, given $y_1$ and $P_1^i$ where $P_1^i$ has been arbitrarily made equal to $dy$. The terms which define this operation may be readily developed from the following truth table, Table 10, in which are listed all possible combinations of $P_1^i$ and $y_1$ for both addition and subtraction.

TABLE 10

|  | $P_1^i=dy$ (in P) | $y_1=y_1^b$ (in L) | $y_1^{b'}$ | K | $P_1$ (in P) |
|---|---|---|---|---|---|
| addition $(dx=+1)$ $P_1=y_1^b+K$ | 1 | 1 |  | 1 | 0 |
|  | 1 | 0 |  | 1 | 1 |
|  | 0 | 1 |  | 0 | 1 |
|  | 0 | 0 |  | 0 | 0 |
| subtraction $(dx=-1)$ $P_1=y_1^{b'}+K$ | 1 | 1 | 0 | 0 | 0 |
|  | 1 | 0 | 1 | 0 | 1 |
|  | 0 | 1 | 0 | 1 | 1 |
|  | 0 | 0 | 1 | 1 | 0 |

As noted in Table 10, $y_1=y_1^b$ since the first digit of a difference number is the same as the first digit of the corresponding binary number. The values of $y_1^{b'}$ are found by reversing the corresponding $y_1^b$ digits. The values of K are readily found since, as hereinbefore explained, they are the same as $dy$ in addition and the reverse of $dy$ in subtraction. The values of $P_1$ are found for addition by adding $y_1^b$ and K to form $y_1^b+K$, and are found for subtraction by adding $y_1^{b'}$ and K to form $y_1^{b'}+K$.

From inspection of Table 10, it is clear that $P_1$ is identical to $P_1^i$ whenever $y_1=0$ and is the reverse of $P_1^i$ whenever $y_1=1$, this rule applying both in addition and subtraction. Therefore it is evident that $P_1$ can be placed in P by triggering (reversing) P whenever $y_1$ (in L) equals 1. The terms defining this triggering operation are:

$$S_pP = AT'L$$
$$36$$

$$Z_pP = AT'L$$
$$37$$

which have been developed hereinbefore from entirely different considerations in connection with the sign reversal operation. Thus, in the present instance, extremely simple and in fact already existent gating circuitry, serves to place $P_1$ in flip-flop P, a result which is largely occasioned by the fact that $dy$, which is initially placed in P as $P_1^i$, is so closely related to the correction quantity K. The initial placement of $dy$ in P therefore has allowed considerable reduction in gating complexity.

Now that we have established how $P_1$ and $c_1$ are formed, we can examine next how $r_1^{new}$, $c_2$ and $P_2$ are formed.

Considering first the formation of $r_1^{new}$, it is evident that this digit is obtained by adding $r_1$ and $P_1$ to obtain their binary sum $r_1^{new}$. According to the rules of binary addition $r_1^{new}$ will be the same as $r_1$ whenever $P_1=0$, and will be the reverse of $r_1$ whenever $P_1=1$. Since $r_1$ appears in L and $r_1^{new}$ is to be placed in M, the required result is readily obtained by reversing the L to M transfer (through control of X) if flip-flop P is in its "1" state. The same considerations apply in adding each of the $P_1$, $P_2$ . . . etc. quantities to the corresponding $r_1$, $r_2$ . . . quantities to form the corresponding $r_1^{new}$, $r_2^{new}$ . . . quantities. The term defining this operation is:

$$X_p = \underline{Com}(Q'+J)ITC'P$$
$$49$$

Considering next the formation of $c_2$, it will be remembered that $c_2$ is to be the binary carry resulting from the formation of $r_1^{new}$. The discoverey of $c_2$ is greatly simplified by the fact that the previous carry $c_1$ is available in B. Essentially the problem is to find $c_2$ and place it in B, given $r_1$ (in L) and $P_1$ (in P) and $c_1$ (in B). The terms defining this operation may be developed from the following truth table in which all possible combinations of $r_1$, $P_1$ and $c_1$ are listed:

TABLE 11

| $P_1=y_1^b+c$ or $y_1^{b'}+c$ (in P) | $r_1$ (in L) | $c_1$ (in B) | $y_1^b$ or $y_1^{b'}$ | $c_2$ (in B) |
|---|---|---|---|---|
| 0 | 0 | 0 | 0 | 0 |
| 0 | 0 | 1 | 1 | 1 |
| 0 | 1 | 0 | 0 | 0 |
| 0 | 1 | 1 | 1 | 1 |
| 1 | 0 | 0 | 1 | 0 |
| 1 | 0 | 1 | 0 | 0 |
| 1 | 1 | 0 | 1 | 1 |
| 1 | 1 | 1 | 0 | 1 |

The quantities $y_1^b$ or $y_1^{b'}$ are obtained by subtracting $c_1$ from $P_1$ (remembering that $P_1=y_1^b+c_1$ or $y_1^{b'}+c$). The $c_2$ quantities are obtained by considering the binary carries which would result from the binary addition of $r_1$ and $y_1^b$ (or $y_1^{b'}$) and $c_1$ to form $r_2^{new}$. According to the ordinary rules of binary addition, a binary 1 carry results when any two of these three quantities have "1" values.

From examination of Table 11 it can be seen that to form $c_2$ in B, B may be set or zeroed to agree with $L(r_1)$ whenever $P(P_1)$ is in its "1" state. The same considerations obviously apply in forming all of the carries $c_1$, $c_2$, $c_3$ . . . $c_5$, $dz$. The terms defining these operations are:

$$S_pB = \underline{Com}(Q'+J)ITC'PL$$
$$50$$

$$Z_pB = \underline{Com}(Q'+J)ITC'PL'$$
$$51$$

Considering next the formation of $P_2$, it should be understood that $P_2$ is formed from $P_1$ through consideration of $r_1$, $c_1$ and $y_2$. However at the time that $r_1$ and $c_1$ are available (in L and P respectively), $y_2$ has not yet appeared. Because of this, $P_2$ must be formed by a two step operation. At the time that $r_1$ and $c_1$ are available an intermediate value of $P_2$, namely $P_2^i$, is formed and placed in P on the assumption that $y_2=0$. In the next time interval when $y_2$ appears (in L), if it indeed equals 0 then P is left unchanged so that $P_2=P_2^i$. However if $y_2=1$, then P is triggered, this having the effect it will be shown of modifying $P_2^i$ so as to form $P_2$ in P. The terms defining this two-step operation may be developed from a consideration of the following truth table, Table 12, in which all possible combinations of $P_1$, $r_1$ and $c_1$ are listed. Truth Table 12 is invariant in both addition and subtraction. The column headings which apply to Table 12 for addition are placed at the top of the table and the column headings which apply to the table for subtraction are placed at the bottom of the table.

to "zero" P in the two instances noted above, as defined by the term:

$$Z_p P = \underline{\text{Com}}(Q' + J) \text{ITC}'(LB' + L'B)$$
$$52$$

If $y_2 = 0$ as assumed, then $P_2 = P_2^i$ and flip-flop P need not be changed to place $P_2$ therein. However if $y_2$ (in L) equals 1, then as shown in Table 12, $P_2$ will be the re-

TABLE 12

| $P_1 = y_1^b + c_1$ (in P) | $r_1$ (in L) | $c_1$ (in B) | $y_1^b$ | $c_2$ | ←——If $y_2=0$——→ $P_2 = P_2^i = y_2^b + c_2$ | | ←——If $y_2=1$——→ $P_2 = y_2^b + c_2$ | |
|---|---|---|---|---|---|---|---|---|
| | | | | | $y_2^b$ (in P) | | $y_2^b$ (in P) | |
| 0 | 0 | 0 | 0 | 0 | 0 | 0 | 1 | 1 |
| 0 | 0 | 1 | 1 | 1 | 1 | 0 | 0 | 1 |
| 0 | 1 | 0 | 0 | 0 | 0 | 0 | 1 | 1 |
| 0 | 1 | 1 | 1 | 1 | 1 | 0 | 0 | 1 |
| 1 | 0 | 0 | 1 | 0 | 1 | 1 | 1 | 0 |
| 1 | 0 | 1 | 0 | 0 | 0 | 0 | 1 | 1 |
| 1 | 1 | 0 | 1 | 1 | 1 | 0 | 0 | 1 |
| 1 | 1 | 1 | 0 | 1 | 0 | 1 | 0 | 0 |
| $P_1 = y_1^{b'} + c_1$ (in P) | $r_1$ (in L) | $c_1$ (in B) | $y_1^{b'}$ | $c_2$ | $y_2^{b'}$ $P_2 = P_2^i = y_2^{b'} + c$ ←——If $y_2=0$——→ | | $y_2^{b'}$ $P_2 = y_2^{b'} + c_2$ ←——If $y_2=1$——→ | |

We shall first explain Table 12 from the point of view of the addition operation. The $y_1^b$ quantities are obtained by subtracting $c_1$ from $P_1$ (as in Table 11). The $c_2$ quantities are obtained in the same manner as in Table 11.

To obtain the $P_2^i$ quantities, we assume first that $y_2 = 0$. Under this assumption (that $y_2 = 0$) $y_2^b$ must be equal to $y_1^b$ (as shown in Table 12) since the $y_2$ digit indicates the changes between $y_1^b$ and $y_2^b$, $y_2 = 0$ indicating no change and $y_2 = 1$ indicating that $y_2^b$ is the reverse of $y_1^b$. The $P_2^i$ quantities are obtained by adding $y_2^b$ and $c_2$ to obtain the quantity $y_2^b + c$ (for the assumption that $y_2 = 0$).

If however it is found that $y_2 = 1$ then under this condition $y_2^b$ is the reverse or complement of $y_1^b$ (as shown in Table 12) and $P_2 = y_2^b + c_2$ is obtained by adding these values of $y_2^b$ and the corresponding values of $c_2$.

We have now completed explanation of Table 12 from the point of view of the addition operation and may now consider it from the point of view of the subtraction operation. In subtraction $P_1$ must be considered as representing the quantity $y_1^{b'} + c_1$ and therefore by subtracting $c_1$ from $P_1$ the quantity $y_1^{b'}$ is obtained. The $c_2$ quantities are of course obtained by noting the carries produced in the binary addition of $r_1$, $c_1$ and $y_1^{b'}$. To obtain $P_2^i$ it is assumed that $y_2 = 0$ and that therefore $y_2^{b'}$ is the same as $y_1^{b'}$ (since the $y_2$ digit represents changes in the complemented binary Y number as well as in the normal Y binary number). The corresponding $P_2^i$ values are then obtained by adding $c_2$ and these $y_2^{b'}$ values.

However if $y_2 = 1$ then it is clear that $y_2^{b'}$ is the reverse of $y_1^{b'}$ and therefore $P_2 = y_2^{b'} + c_2$ is found by adding such values of $y_2^{b'}$ to the corresponding values of $c_2$.

It is evident that Table 12 is invariant for the addition and subtraction operations—that is that $P_2^i$ and $P_2$ are found by the same calculation whether an addition or subtraction operation is being performed. From an examination of Table 12, it can be seen that only two of the $P_2^i$ values (as indicated by arrows) differ from the corresponding $P_1$ values. In each case a "1" value of $P_1$ is changed to a "0" value of $P_2^i$, this occurring only when $r_1$ (in L) and $c_1$ (in B) are different. Accordingly, in order to produce $P_2^i$ in P it is merely necessary verse of $P_2^i$ and therefore flip-flop P must be triggered to set $P_2$ therein. The terms defining this triggering operation have already been developed hereinbefore from other considerations and remain:

$$S_p P = A T' L$$
$$36$$

$$Z_p P = A T' L$$
$$37$$

It is obvious that the above-described considerations apply equally well in forming each of the quantities $P_2^i$, $P_3^i$, $P_4^i$ ... etc. and the quantities $P_2$, $P_3$, $P_4$ ... etc. and therefore it is evident that term 52 and terms 36 and 37 define the successive formation of each of these quantities.

It will be further noted in connection with Tabulation 5, that as herebefore explained the last binary carry which is formed and placed in B (that carry resulting from the formation of $r_{n+1}^{\text{new}}$ is the $dz$ output signal originating from this integrator section. This $dz$ output is thus held in B at the time the next integrator section begins its passage, and is available there for possible selection by the first $dx$ decode mark and for introduction into the short channel during the precession of the $dz$ signals in the short channel.

*Input and Output*

The fact that the $dz$ output from each integrator section is held in flip-flop B as the next integrator section begins its traverse should be held in mind in considering how facilities are provided for applying inputs (Input 1 and Input 2) to the DDA and for obtaining outputs (Output 1 and Output 2) from the DDA.

Considering first the formation of the outputs, Output 1 and Output 2, it must be understood that Output 1 represents the $dz$ signal originated by the integrator section immediately preceding the section containing the fiducial mark and that Output 2 represents the $dz$ signal originated by the next preceding section. The manner in which Output 1 and Output 2 are obtained may be readily explained by assuming for the moment, for purposes of example, that a fiducial mark has been filled into the fiducial cell of the seventh integrator section which is illustrated in FIG. 4.

Referring now to FIG. 4, at the time that the (assumed) fiducial mark appears in M, it is clear that the $dz$ signal ($dz_6$) originating from the preceding (6th) integrator section is held in flip-flop B. If $dz_6$ is a +1 then signal B will be high at this time while if $dz_6$ is a −1 signal B' will be high at this time. Signals B and B' are selected at this time (ITCM) and supplied as output signals Output 1+ and Output 1− which serve as two components of Output 1. The terms defining this selection are:

$$\text{Output 1} \begin{cases} \text{Output 1}^+ = \underline{\text{Com}}Q'\text{ITCMB} \quad 53 \\ \text{Output 1}^- = \underline{\text{Com}}Q'\text{ITCMB}' \quad 54 \end{cases}$$

At the same time (when the fiducial mark is in M) the $dz$ signal ($dz_5$) originating from the next preceding (5th) integrator section appears in flip-flop A, signal A at its high level then representing a +1 value of $dz_5$ and signal A' at its high level representing a −1 value of $dz_5$. Signals A and A' are selected at this time (ITCM) and supplied as output signals Output 2+ and Output 2− which serve as the two components of Output 2. The terms defining this selection are:

$$\text{Output 2} \begin{cases} \text{Output 2}^+ = \underline{\text{Com}}Q'\text{ITCMA} \quad 55 \\ \text{Output 2}^- = \underline{\text{Com}}Q'\text{ITCMA}' \quad 56 \end{cases}$$

Referring next to the introduction of the inputs, Input 1 and Input 2, it should be understood that each of these inputs is made up of two components. A +1 value of Input 1 is represented by a high level of a signal Input 1+ and a −1 value of Input 1 is represented by a high level of signal Input 1−. Similarly a +1 value of Input 2 is represented by a high level of a signal Input 2+ and a −1 value of Input 2 is represented by a high level of a signal Input 2−. In addition, for reasons which will appear herebelow, a signal Input 2' is supplied which normally has a low level and has a high level only when Input 2 is not being applied to the DDA.

Input 1, when it is applied, is intended to supplant or replace the $dz$ signal ($dz_6$) originating from the integrator section (6th section) immediately preceding the fiducial mark and Input 2 is intended to supplant the $dz$ signal ($dz_5$) originating from the next preceding (5th) integrator section.

Considering first the introduction of Input 1, this is accomplished at the time when the fiducial mark appears in L. It will be appreciated that at this time flip-flop B holds $dz_6$ and therefore to supplant $dz_6$ with Input 1 it is necessary to place it in B by setting B if Input 1+ is high or zeroing B if Input 1− is high. The terms defining these operations are:

$$S_pB = IA'T'L(\text{Input } 1^+) \quad 57$$

$$Z_pB = IA'T'L(\text{Input } 1^-) \quad 58$$

The introduction of Input 2 to supplant $dz_5$ is accomplished at this time T at which the fiducial mark is in M(ITCM). At this time $dz_5$ is in flip-flop A and is in normal operation to be transferred to flip-flop B at the end of the time interval as part of the normal precession through B of the $dz$ signals in the short channel. To supplant $dz_5$ with Input 2 it is necessary at this time to place Input 2 in B and at the same time to prevent the normal A to B transfer. The terms defining the placement of Input 2 in B at this time (fiducial mark in M) are:

$$S_pB = \underline{\text{Com}}\text{ITCMQ}'(\text{Input } 2^+) \quad 59$$

$$Z_pB = \underline{\text{Com}}\text{ITCMQ}'(\text{Input } 2^-) \quad 60$$

In developing a term which defines the A to B transfer, it will be recalled that for the accomplishment of the hereinbefore described $dz$ precession operation, flip-flop A must transfer to B at each T time during decode (TC). However it is also clear, from the point of view of the requirement made by the introduction of Input 2, that this A to B transfer should not be made at the time when the fiducial mark appears in M unless Input 2 is not being applied (as indicated by Input 2' at its high level). The terms defining the described A to B transfer are:

$$S_pB = \underline{\text{Com}}(Q'+J)\text{ATC}(M'+I'+\text{Input } 2') \quad 61$$

$$Z_pB = \text{Com}(Q'+J)\text{A'TC}(M'+I'+\text{Input } 2') \quad 62$$

*Scope Display*

As described in connection with FIG. 3, during fill operations (when $\underline{\text{Com}}'$ is high) signals representing the contents of the integrate portion of the integrator section containing the fiducial mark are displayed on the viewing face of cathode ray tube 68 through the upper window 66, while signals representing the contents of the decode portion of the same integrator section are displayed through lower window 67. During compute operations (when $\underline{\text{Com}}$ is high) signals representing the R number are displayed through upper window 66, and signals representing the Y number are displayed through lower window 67.

Associated with cathode ray tube 68 are conventional controls for horizontally sweeping the electron beam of tube 68 across its face in response to a synchronizing signal Synch, for blanking (blocking) and deblanking (passing) the electron beam in accordance with a beam intensity control signal Int which is applied to the cathode ray tube control grid, and for vertically deflecting the beam during its sweep in accordance with a signal $\text{Vert}_U$ (which is applied to the upper deflection plate of the cathode ray tube) and a signal $\text{Vert}_L$ (which is applied to the lower deflection plate of the cathode ray tube). The signals Synch, Int, $\text{Vert}_U$ and $\text{Vert}_L$ are, as shown in FIG. 3, generated within gating matrix 31 and from there applied to the cathode ray tube controls.

The sweep controls are adjusted so that the duration of the sweep of the electron beam corresponds to the time required for the passage of a single integrator section. Since only the contents of the integrator section containing the fiducial mark are to be displayed, the sweep must be triggered by signal Synch each time the fiducial mark appears (in flip-flop L). The term defining this operation is:

$$\text{Synch} = IA'T'L \quad 63$$

During compute operations (when $\underline{\text{Com}}$ is high) only the contents of the integrate portion are to be displayed and therefore the electron beam must be deblanked (passed) by signal Int only during the passage of this portion. This operation is defined by the term:

$$\text{Int}_p = \frac{\underline{\text{Com}}(AT' + TC')}{64}$$

However it will be further remembered that during fill operations (when $\underline{\text{Com}}'$ is high) the contents of both the decode and integrate portions are to be displayed, the beam therefore being continuously deblanked. The term defining this operation is simply:

$$\text{Int}_p = \frac{\underline{\text{Com}}'}{65}$$

Considering next the vertical deflection signals $\text{Vert}_U$ and $\text{Vert}_L$, it should be understood that signal $\text{Vert}_L$ is used to selectively raise or lower the electron beam so that its trace may be viewed either through upper window 66 or lower window 67 while signal $\text{Vert}_U$ is used to further displace the beam so as to trace waveforms representing the successive signals of the integrator section (appearing in flip-flop L). The term defining the signal $\text{Vert}_U$ is therefore:

$$\text{Vert}_U = \frac{L}{66}$$

In developing the terms defining the signal $\text{Vert}_L$, it will be remembered that during fill operations ($\underline{\text{Com}}'$) the signals of the integrate portion of the integrator section are to appear at upper window 66 and the signals of the decode portion of the section are to appear at lower window 67. The term defining this operation is:

$$\text{Vert}_{L_p} = \underline{\text{Com}}'(AT' + TC') \\ 67$$

During the compute ($\underline{\text{Com}}$) operation however (appearing in L at time T) the signals representing the digits of the R number are to be displayed at upper window 66, while the signals representing the digits of the Y number (appearing in L at time T') are to be displayed at lower window 67. The term defining this operation is:

$$\text{Vert}_L = \frac{\underline{\text{Com}}T}{68}$$

What is claimed as new is:

1. An electrical information signal storage mechanism comprising: a cyclically operable memory device including a circulating channel, write means for writing bivalued information signals applied thereto upon said channel, and read means for reading the bivalued information signals written upon said channel; transfer means, coupled between said read and write means and responsive to an applied bivalued control signal having either a first value or a second value, for transferring information signals appearing at said read means to said write means, said transfer means being operable to transfer said information signals unchanged and complemented in value when said applied control signal is at said first and second values, respectively; information signal storage means for storing bivalued information signals to be written upon said channel; and gating means for comparing each signal appearing at said read means with the signal simultaneously stored in said storage means to generate and apply to said transfer means a corresponding control signal of such value as to cause said signal appearing at said read means to be transferred identical in value to said simultaneously stored signal, said gating means including apparatus, coupled to said read means and said storage means, for applying to said transfer means a control signal having said first and second values when the signal stored in said storage means and the signal appearing at said read means have the same and different values, respectively.

2. An electrical information signal storage mechanism comprising: a memory device including write means, read means, and means for producing at said read means after a predetermined time delay bivalued information signals applied to said write means; information signal storage means for storing a bivalued information signal to be applied to said write means; and a gating network for applying bivalued information signals to said write means, said gating network including first gating means, coupled between said read means and said storage means for comparing each signal produced at said read means with the signal simultaneously stored in said storage means to produce a bivalued control signal having first and second values when the signal stored in said storage means and the signal produced at said read means have the same and different values, respectively, and second gating means, responsive to said first and second values of said control signal for respectively applying to said write means the signals produced at said read means unchanged and complemented in value whereby each signal produced at said read means is transferred identical in value to the signal simultaneously stored in said storage means.

3. An electrical information signal storage mechanism comprising: a memory device including write means, read means, and means for producing at said read means after a predetermined time delay bivalued information signals applied to said write means; information signal storage means for storing a bivalued information signal to be applied to said write means; and a gating network, coupled between said read and write means and to said storage means, for comparing each signal produced at said read means with the signal simultaneously stored in said storage means to said write means an information signal having the same and complementary values as the information signal produced at said read means when the signal stored in said storage means and the signal produced at said read means have the same and complementary values, respectively.

4. In an electronic computer including a first cyclically operable memory device having a read point and at least one bivalued information signal storage section of a predetermined length circulating past said read point, said section circulating past said read point in a predetermined time period corresponding to said predetermined length of said section said section being divided into first and second portions of substantially equal length, a marking mechanism for continuously indicating the portion of said storage section passing said read point, said mechanism comprising: a second cyclically operable memory device operable in synchronism with said first memory device, said second memory device including a second information signal storage section having a length substantially equal to one-half of said predeterminel length, write means for writing bivalued information signals applied thereto upon said second storage section, and read means for reading information signals written upon said second storage section after a time delay corresponding to the length of said second storage section and substantially equal to one half the predetermined time period; and transfer means for applying to said write means an information signal complementary to the signal being read by said read means to continually produce information signals appearing at said read means which during the passage of said first portion past said read point are complementary to the information signals appearing at said read means during the passage of said second portion past said read point.

5. In an electronic computer including a first cyclically operable memory device having a read point and at least one bivalued information signal storage section of a predetermined length circulating past said read point said section circulating past said read point in a predetermined time priod corresponding to the predetermined length of said section, said section being divided into first and second portions of substantially equal length, a marking mechanism for continuously indicating the portion of said storage section passing said read point, said mechanism comprising: a second cyclically operable memory device operable in synchronism with said first memory device, said second memory device including a second information signal storage section having a length substantially equal to one-half of said predetermined length, write means for writing bivalued information signals applied thereto upon said second storage section, and read means for reading information signals written upon said second storage section after a time delay corresponding to the length of said second storage section and substantially equal; means for initially storing information signals of a predetermined value over the entire length of the storage section of said second memory device; and transfer means for applying to said write means an information signal complementary to each signal being read by said read means, to continually produce information signals appearing at said read means which during the passage of said first portion past said read point are complementary to the information signals appearing at said read means during the passage of said second portion past said read point.

6. In an electronic computer including a first cyclically operable memory device having a read point and a bivalued information signal storage channel circulating past said read point, said channel being divided into a plurality of equal-lengthed storage sections, each of said sections having a predetermined length and being divided into first and second portions of substantially equal length, each of said portions circulating past said read point in a predetermined time interval corresponding to one half said predetermined length, a marking mechanism for continuously indicating the portion of each storage section passing said read point, said mechanism comprising: a second cyclically operable memory device operable in synchronism with said first memory device, said second memory device including a second information signal storage channel having a length substantially equal to one-half of said predetermined length, write means for writing bivalued information signals applied thereto upon said second channel, and read means for reading information signals written upon said channel after a time delay corresponding to the length of said second channel and substantially equal to said predetermined time interval; and transfer means for applying to said write means an information signal complementary to the signal being read by said read means, to continually produce information signals appearing at said read means which during the passage of each first portion past said read point are complementary to the information signals appearing at said read means during the passage of each second portion past said read point.

7. In an electronic computer for cyclically performing a mathematical operation upon each of a plurality of pairs of numbers, represented as a corresponding plurality of pairs of bivalued information signal trains, respectively, to produce a bivalued information signal representing the result of the mathematical operation, the combination comprising: a first cyclically operable memory device including a read point and a relatively long bivalued information signal storage channel circulating past said read point, said long channel having a plurality of equal-lengthed sections corresponding to the plurality of pairs of information signal trains, respectively, each of said sections having two portions of substantially equal predetermined length, one of said portions storing the corresponding pair of said information signal trains; a second cyclically operable memory device operable in synchronism with said first device, said second device including a relatively short channel having a length substantially equal to said predetermined length, write means for writing information signals applied thereto upon said short channel, and read means for reading information signals written upon said short channel after a time delay corresponding to the length of said short channel; transfer means normally operable to apply to said write means an information signal complementary to the information signal being read by said read means whereby the information signals appearing at said read means during the passage of each of said one portions past said read point is complementary to the information signals appearing at said read means during the passage of the corresponding other portion; logical gating means for combining each pair of information signal trains to produce the corresponding bivalued result signal representing the result of the mathematical operation; and means operable, during the passage of each section of said long channel past said read point, for inhibiting the operation of said transfer means for one information signal and for applying to said write means an information signal complementary to the corresponding bivalued result signal.

8. In an electronic digital differential analyzer including a relatively long circulating channel having a plurality of integrator sections each divided into first and second equal lengthed portions for storing information to be operated upon during the integrate operation to produce bivalued overflow digit signals and a relatively short circulating channel for storing the bivalued overflow digit signals from the integrator sections, the length of the short channel being substantially equal to one-half the length of each integrator section and to a multiple of the length occupied by one digit signal, a recirculating system for the short channel, said system comprising: write means for writing bivalued signals applied thereto upon the short channel; read means for reading each signal written upon the short channel after a time delay corresponding to the length of the short channel; logical gating means, coupled between said read and write means and normally responsive to each bivalued signal read by said read means for applying to said write means a bivalued signal complementary to the read signal; and means operable during the integrate operation of the analyzer for inhibiting the response of said logical gating means to alternate signals read by said read means during alternate circulations of the short channel and for applying to said write means, after a time delay corresponding to the length occupied by one digit signal, a bivalued signal corresponding to each of said alternate signals.

9. The recirculating system defined in claim 8, wherein the last-named means includes carry means for applying to said write means once during each of said alternate circulations of said short channel a bivalued signal corresponding to the overflow digit signal.

10. The recirculating system defined in claim 9, wherein said last-named means further includes means operable once per circulation of said long channel, for inhibiting the operation of said carry means and for applying to said write means a bivalued signal representative of a signal from an external source.

11. An electrical adder for cyclically producing a bivalued output signal representative of the sum of a plurality of bivalued input signals serially applied thereto during each cycle of operation thereof, said plurality of input signals comprising in each cycle of operation a first applied input signal and a fixed number of subsequently applied input signals, said adder comprising: electrical switching means actuable to produce a bivalued output signal; means, responsive to the first applied input signal of said plurality of input signals during each cycle of operation, for actuating said switching means to produce an output signal corresponding to said first applied input signal; and logical gating means, responsive to each subsequent applied input signal of said plurality which is different from the output signal from said switching means, for actuating said switching means to produce a bivalued output signal complementary to the output signal produced by said switching means in the immediately preceding cycle of operation in which said subsequent applied input signal was different from the output signal from said switching means.

12. An electrical adder for cyclically producing in each of a plurality of cycles of operation thereof a bivalued sum signal representative of the sum of at least first and second bivalued input signals which are serially applied thereto during each cycle of operation thereof, said adder comprising: electrical switching means actuable to produce a bivalued output signal T having either a first value or a second value; means, responsive to the first applied input signal during each cycle of operation, for actuating said switching means to produce a first result signal corresponding to said first applied signal; and logical gating means, responsive to said first result signal and the associated second applied input signal in each cycle of operation, for actuating said switching means to produce a second result signal having alternate first and second values each time said first result signal has a value different from said associated second applied signal, the result signal produced by said switching means at the end of each cycle of operation constituting the sum signal.

13. An electrical adder for cyclically producing in each of a plurality of cycles of operation thereof a bivalued sum signal representative of the sum of $n$ bivalued input signals $I_j$ which are serially applied thereto during each cycle of operation thereof, where $j=1, 2 \ldots n$, said adder comprising: electrical switching means actuable to produce a series of $n$ bivalued output signals $O_j$ corresponding respectively to signals $I_j$, each signal $O_j$ having either a first value or a second value; means, responsive to signal $I_1$ during each cycle of operation, for actuating said switching means to produce output signal $O_1$ corresponding in value to signal $I_1$, and means, responsive during the plurality of cycles of operation to each signal $O_{j-1}$ and each signal $I_j$, for actuating said switching means to produce output signals $O_j$ having alternate first and second values during each successive cycle of operation in which signal $O_{j-1}$ has a value different from signal $I_j$, the output signal produced by said switching means at the end of each cycle of operation constituting the sum signal.

14. An electrical circuit for cyclically producing in each of a plurality of cycles of operation thereof a bivalued result signal representative of the result of one of the mathematical operations of addition and subtraction upon at least first and second bivalued signals serially applied thereto during each cycle of operation thereof, said circuit comprising: electrical switching means actuable to produce a bivalued output signal having either a first value or a second value; first means, responsive to the first applied signal during each cycle of operation, for actuating said switching means to produce a first result signal whose value has a predetermined relationship to the value of the first applied signal; and second means, responsive to said first result signal and the associated second applied input signal during each cycle of operation, for further actuating said switching means to produce a second result signal having alternate first and second values each time the relationship between the values of the first result signal and the associated second applied signal is different from said predetermined relationship, the result signal produced by said switching means at the end of each cycle of operation representing the result of the mathematical operation.

15. In an electronic digital integrator including a cyclically operable memory device having a decode portion for storing decode signals for the integrator input information and an integrate portion for storing paired number signals to be integrated, the combination comprising: electrical switching means, responsive to the decode signals for producing a first bivalued output signal representing the value of the input information; and means, responsive to a predetermined signal in the integrate portion, for triggering said switching means to produce a second bivalued output signal complementary to said first output signal.

16. In an electronic digital integrator, the combination comprising: a circulating channel including a decode portion for storing decode signals for the integrator input information, and an integrate portion for storing integrate information signals and a bivalued sign reversal signal having either a first value or a second value; electronic switching means actuable to produce a bivalued output signal having either a first value or a second value; first means, responsive to the decode signals during one circulation of said channel for actuating said switching means to produce a first output signal representing the value of the input information; and second means, responsive during said one circulation of said channel to the bivalued sign reversal signal, for further actuating said switching means to produce a second output signal complementary to said first output signal when said sign reversal signal has the first value.

17. In an electronic digital integrator, the combination comprising: a circulating channel including a decode portion for storing $dx$ and $dy$ decode signals for the $dx$ and $dy$ inputs, respectively, to the integrator, and an integrate portion for storing $r$ and $y$ signals and a bivalued sign reversal signal; write means for writing signals upon said channel; read means for reading the signals written upon said channel after a predetermined time delay; electronic switching means actuable to produce a bivalued output signal having either a first value or a second value; first means, operable during one circulation of said channel when the $dx$ decode signals are being read by said read means, for actuating said switching means to produce a first output signal representing the value of the $dx$ input; and second means, operable during said one circulation of said channel when the sign reversal signal is being read by said read means, for further actuating said switching means to produce a second output signal complementary to said first output signal whenever the sign reversal signal has a predetermined value.

18. In an electronic digital integrator in which the $dx$ and $dy$ inputs are respectively determined by $dx$ and $dy$ decode signals stored in the decode portion of the storage section of a cyclically operable memory device, the storage section also including an integrate portion for storing $r$ and $y$ number signals and an integrate exchange signal, the combination comprising: first means, actuable in response to the $dx$ decode signals, for producing a first bivalued output signal representing the value of the $dx$ input; second means, actuable in response to the $dy$ decode signals, for producing a second bivalued signal representative of the value of the $dy$ input; and third means, coupled between said first and second means and responsive to the integrate exchange signal, for further actuating said second means to produce a third bivalued output signal having a value equal to the value of said first output signal and fourth means receiving said third output signal, for additively combining said $r$ and $y$ number signals in response to said third bivalued signal at one value and for subtractively combining said $y$ and $r$ number signals in response to said third bivalued signal at the other value.

19. In an electronic digital integrator in which the $dx$ and $dy$ inputs are respectively determined by $dx$ and $dy$ decode signals stored in the decode portion of the storage section of a cyclically operable memory device, the storage section also including an integrate portion for storing $r$ and $y$ number signals and a bivalued integrate exchange signal having either a first value or a second value, the combination comprising: first means, actuable in response to the $dx$ decode signals, for producing a first bivalued output signal representing the value of the $dx$ input; second means, actuable in response to the $dy$ decode signals, for producing a second bivalued signal representative of the value of the $dy$ input; third means, responsive to the integrate exchange signal, for further actuating said first means to produce a third output signal complementary to said first output signal when the integrate exchange signal has the first value; fourth means, responsive to the integrate exchange signal, for further actuating said second means to produce a fourth output signal having a value equal to the value of said third output signal when the integrate exchange signal has the first value, and fifth means, responsive to the integrate exchange signal, for further actuating said first means to produce a fifth output signal having a value equal to the value of said second output signal when the integrate exchange signal has the second value.

20. In a cyclically operable electronic digital integrator for performing an integration in response to applied $dx$ and $dy$ inputs, the combination comprising: signal generating means for generating in a predetermined time sequence during each cycle of the integrator a bivalued sign reversal control signal for reversing the sign of the $dx$ input and a bivalued integrate exchange control signal for interchanging the $dx$ and $dy$ inputs, each of said signals having either a first value or a second value; first signal storage means for storing a first bivalued output signal representative of the value of the $dx$ input; second signal storage means for storing a second bivalued output signal representative of the value of the $dy$ input; first gating means, responsive to said sign reversal control signal, for storing in said first storage means a bivalued output signal complementary to said first output signal when said sign reversal control signal has one of said first and second values; second gating means, responsive to said integrate exchange signal, for storing in said second storage means a bivalued output signal corresponding to the output signal stored in said first storage means when said integrate exchange control signal has one of said first and second values; and third gating means, responsive to said integrate exchange signal, for storing in said second storage means a bivalued output signal corresponding to the output signal stored in said second storage means when said integrate exchange control signal has the other of said first and second values.

21. The combination defined in claim 20, wherein said first gating means also includes means, responsive to said integrate exchange control signal, for complementing the signal stored in said first storage means when said integrate exchange signal has said one value.

22. In an electronic digital integrator having an integrator section stored on a cyclically operable memory device, the integrator being operable for selecting predetermined $dz$ signals stored in the memory device and including an integrate exchange signal and signals representing a Y number and an R number, the combination comprising: first means responsive to at least one of the selected $dz$ signals for producing a first bivalued output signal representing the value of the $dx$ input to the integrator section; second means responsive to the remaining selected $dz$ signals for producing a second bivalued signal representing the $dy$ input to the integrator section; third means responsive to application of an applied bivalued signal for operating upon the signals representing the Y number in accordance with the value of the applied signal; fourth means responsive to application of a bivalued signal for operating upon the signals representing the R number in accordance with the value of the applied signal; and exchange means responsive to the exchange signal for applying said first bivalued signal to said fourth means and said second bivalued signal to said third means when said exchange signal has one value and for applying said first bivalued signal to said third means and said second bivalued signal to said fourth means when said exchange signal has its other value.

23. The combination defined by claim 22 wherein said first means includes selectively operable apparatus for reversing the value of said first bivalued output signal after it is produced, whereby whenever said exchange signal has its other value said third means operates upon the signals representing the Y number in accordance with the reversed value of said first output signal.

24. The combination defined by claim 23 wherein said second means includes apparatus for summing said remaining selected $dz$ signals, said second bivalued signal representing the sum of said remaining $dz$ signals, whereby whenever said exchange signal has its other value, said fourth means operates upon the signal representing the R number in accordance with the value of the sum of said plurality of $dz$ signals.

25. In a multiple-integrator electronic digital differential analyzer in which the integrate operation is controlled by a predetermined set of operation control signals and includes a decode routine and an integrate routine, a phase control system for controlling the performance of the decode and integrate routines, said system comprising: a cyclically operable storage device including write means for writing bivalued information signals applied thereto, read means for reading bivalued information signals, and means for applying to said read means after a predetermined time delay each information signal written by said write means; first means for initially applying to said write means a predetermined plurality of bivalued phase control signals having a first value; and second means for thereafter applying to said write means a bivalued information signal complementary to each phase control signal read by said read means to continually produce phase control signals at said read means which during alternate cycles of said storage device are complementary.

26. The phase control system defined in claim 25, wherein said first means also initially applies to said write means a predetermined plurality of bivalued overflow digit signals interplexed with phase control signals; and said second means further includes logical gating means normally operable to apply to said write means a bivalued signal corresponding to each overflow digit signal read by said read means, and switching means, responsive to the predetermined set of operation control signals and phase control signals having a predetermined value, for rendering said logical gating means inoperable.

27. The phase control system defined in claim 26, wherein said switching means includes an electronic storage device for storing bivalued signals representative of input information to the integrators, and means for applying to said write means bivalued signals corresponding to the signals stored in said storage device.

28. In a multiple-integrator electronic digital differential analyzer in which the integrate operation performed in each integrator includes a decode routine for establishing the input information in accordance with previously established decode information, and an integrate routine for integrating integrate information in accordance with the established input information, the combination comprising: a cyclically operable memory device including write means for writing bivalued signals applied thereto, read means for reading bivalued signals applied thereto, and means for applying to said read means after a predetermined time delay each bivalued signal written by said write means; first means for applying to said write means in a predetermined order bivalued signals representative of the decode information and the initial integrate information; second means, responsive to first and second control signals, for applying to said write means bivalued signals representative of first and second predetermined logical functions, respectively, of each signal read by said read means; and third means including a second cyclically operable recirculating memory device for applying said first and second control signals to said second means in said predetermined order, wherein said second cyclically operable recirculating device is operable in synchronism with the first-named memory device and includes write means for recording applied bivalued signals and read means for reading recorded bivalued signals after a predetermined time delay and further includes apparatus for applying to said second means the bivalued signals read by said read means and the bivalued signals applied to said write means.

29. In a multiple-integrator electronic digital differential analyzer in which the integrate operation performed in each integrator includes a decode routine for establishing the input information in accordance with previously established decode information, and an integrate routine for integrating integrate information in accordance with the established input information, the combination comprising: a cyclically operable memory device including write means for writing bivalued signals applied thereto, read means for reading bivalued signals applied thereto, and means for applying to said read means after a predetermined time delay each bivalued signal written by said write means; first means for applying to said write means in a predetermined order bivalued signals representative of the decode information and the initial integrate information; second means, responsive to first and second control signals, for applying to said write means bivalued signals representative of first and second predetermined logical functions, respectively, of each signal read by said means; and third means including a second cyclically operable recirculating memory device for applying said first and second control signals to said second means in said predetermined order, wherein said second memory device includes write means for writing bivalued signals applied thereto, read means for reading bivalued signals applied thereto, and means for applying to said read means after a second predetermined time delay each signal rewritten by said write means, the first mentioned predetermined time delay being an integral multiple of said second predetermined time delay.

30. The combination defined in claim 29, which further includes means for initially applying to the write means of said second memory device bivalued signals having a predetermined value.

31. The combination defined in claim 30, which further includes logical gating means, coupled between the read and write means of said second memory device, normally operable to apply to the write means a bivalued signal complementary to the bivalued signal read by the read means.

32. The combination defined in claim 31, which further includes generating means for generating bivalued signals, and means, operable during predetermined periods of the integrate operation, for inhibiting the operation of said logical gating means and for applying to the write means of said second memory device a bivalued signal corresponding to the signal generated by said generating means.

33. The combination defined in claim 32, wherein said generating means is normally operable during one of the integrate and decode routines to generate a bivalued signal corresponding to the bivalued signal read by the read means of said second memory device.

34. In a multiple-integrator electronic digital differential analyzer in which the integrate operation performed in each integrator includes a decode routine for establishing the input information in accordance with previously established decode information, and an integrate routine for integrating integrate information in accordance with the established input information, the combination comprising: a cyclically operable memory device including write means for writing bivalued signals applied thereto, read means for reading bivalued signals applied thereto, and means for applying to said read means after a predetermined time delay each bivalued signal written by said write means; first means for applying to said write means in a predetermined order bivalued signals representative of the decode information and the initial integrate information; second means, responsive to first and second control signals, for applying to said write means bivalued signals representative of first and second predetermined logical functions, respectively, of each signal read by said read means; and third means including a second cyclically operable recirculating memory device for applying said first and second control signals to said second means in said predetermined order, wherein said second means includes logical gating means, responsive to an applied bivalued gating signal, for applying to said write means a bivalued signal having a value equal to the value of the signal read by said read means when said gating signal has a first value and a value complementary to the value of the signal read by said read means when said gating signal has a second value.

35. The combination defined in claim 34, wherein said second means further includes additional logical gating means, responsive to said first and second control signals, for producing said gating signal in accordance with first and second logical gating fnuctions, respectively; and means for applying said gating signal to the first-named gating means.

36. In an electronic digital differential analyzer in which the integrate operation for each integrator includes a decode routine for generating $dx$ and $dy$ inputs in accordance with interplexed $dx$ and $dy$ decode marks, respectively, and an integrate routine for performing an integration upon $r$ and $y$ numbers represented by interplexed $r$ and $y$ signals, respectively to produce an overflow digit represented by an overflow signal, the combination comprising: a cyclically operable memory device including write means for writing bivalued signals applied thereto, read means for reading bivalued signals applied thereto, and means for applying to said read means after a predetermined time delay each bivalued signal written by said write means; first means for applying to said write means in time sequence a first series of bivalued signals representing the interplexed $dx$ and $dy$ decode marks followed by a second series of bivalued signals representing the initial interplexed $r$ and $y$ numbers; second means, responsive to first and second control signals, for applying to said write means bivalued signals representative of first and second predetermined logical functions, respectively, of each signal read by said read means; and third means including a second cyclically operable recirculating memory device for applying to said second means said first and second control signals during the decode and integrate routines, respectively said second recirculating memory device being operable in synchronism with said first named memory device and including second write means for recording applied bivalued signals and second read means for reading recorded bivalued signals after a predetermined delay and further includes apparatus for applying to said second means the bivalued signals read by said second read means.

37. The combination defined in claim 36, wherein said third means includes a first signal generator for generating a first pair of complementary bivalued signals each having alternate first and second values, and a second signal generator for generating at least a second pair of bivalued signals each having alternate first and second values.

38. In an electronic digital differential analyzer in which each integrator cyclically operates upon $r$ and $y$ number signals stored in a cyclically operable memory device to produce $dz$ output signals in response to $dx$ and $dy$ input signals, one of the input signals of at least one integrator being representative of the summation of the $dz$ output signals of a plurality of other predetermined selected integrators, the combination comprising: a plurality of predetermined integrators, each cyclically operable for producing successive output signals; and a summation device for cyclically producing the one input signal as a plurality of weighted digit signals, said device including: first means for cyclically receiving the $dz$ output signals of said plurality of predetermined integrators to produce a plurality of weighted digit signals representative of the summation of the $dz$ output signals; second means for storing at least the most significant digit signal produced by said first means; and third means for storing in the memory device during each cycle of operation the remaining digit signals produced by said first means.

39. The combination defined in claim 38, wherein said third means includes means for initially storing in the memory device digit signals having predetermined values.

40. The combination defined in claim 39, wherein said first means includes means for receiving during each cycle of operation the digit signals stored in the memory device in the immediately preceding cycle, and means for combining the received digit signals with the output signals.

41. The combination defined in claim 40, wherein the digit signals produced by said first means during each cycle of operation represent the numerical value of the summation of the output signals and the digit signals stored in the memory device during the immediately preceding cycle.

42. In an electronic digital differential analyzer including a number of integrators, the combination comprising: a cyclically operable memory device; a plurality of predetermined selected integrators each having a group of $y$ number signals which are stored in said cyclically operable memory device and are changed during each cycle of operation in accordance with a $dy$ input signal, each of said predetermined integrators being cyclically operable for producing successive bivalued output signals; and a summation $dy$ device for cyclically producing as a $dy$ input signal a bilevel signal representative of the most significant digit of a plurality of weighted digits having a numerical value equal to the summation of the bivalued output signals from said plurality of predetermined integrators, said summation $dy$ device including: first means for initially storing in the memory device bivalued digit signals having predetermined values; a bistable storage element actuable to produce a bivalued signal having either a first value or a second value; second means, responsive to the output signals and the bivalued digit signals stored in the memory device, for actuating said storage element to produce a bivalued signal representing the most significant digit of the summation of the output signals and the digit signals; and third means, responsive to the output signals and the digit signals stored in the memory device, for storing in the memory device bivalued digit signals representing the remaining weighted digits of said summation.

43. The combination defined in claim 42, wherein said first means receives 1st, 2nd . . . $n$th output signals, and said first means initially stores $(n-1)$ bivalued digit signals, one digit signal for each of said 2nd through $n$th output signals.

44. The combination defined in claim 43, wherein said second means includes a logical gating network for actuating said storage element to produce a signal representative of the carry formed in the addition of each output signal, its associated digit signal and the signal produced by said storage element.

45. In an electronic digital differential analyzer in which a mathematical operation of either addition or subtraction is selectively performed upon binary $y$ and $r$ numbers in accordance with the sign of a $dx$ input signal, the combination comprising: means for generating a first train of serial bivalued signals representing the digits of the $r$ number; means for generating a second train composed of a first and successive serial bvalued signals representing the first lowest order digit and successively corresponding higher order digits respectively of the $y$ number in difference notation code, said first generated signal of said second train representing the lowest order digit of the $y$ number, each of said successive signals having one value only if the corresponding digit of the $y$ number is different from the preceding digit and having the opposite value only if the corresponding digit is the same as the preceding digit; and means, responsive to the $dx$ input signal, for combining said first and second trains to produce a third train of serial bivalued signals representing the digits of the result of the mathematical operation of addition or subtraction of the $y$ and $r$ numbers in accordance with the sign of the $dx$ input signal.

46. In an electronic digital differential analyzer responsive to bivalued $dx$ and $dy$ input signals for performing the mathematical operations of addition and subtraction upon binary $y$ and $r$ numbers when the $dx$ input signal has the values $+1$ and $-1$, respectively, the combination comprising: first means for generating a first bivalued signal representative of the least significant digit $y_1$ of the $y$ number; second means for generating a second bivalued signal representative of the least significant digit $r_1$ of the $r$ number; and third means responsive to the $dz$ input signal at its 41 value for combining said first and second bivalued signals and the $dy$ input signal to produce a third bivalued signal representing the lowest order digit of the sum of the $r$ and $y$ numbers increased by an amount equal to one half the product of the values of the $dx$ and $dy$ input signals plus one half the value of the $dx$ input signal, said third bivalued signal having a value equal to the binary sum of the values of said first signal, said second signal and said $dy$ input signal.

47. In an electronic digital computer, cyclically operable summing apparatus for forming a train of bilevel result signals representing in each cycle of operation $i$ (where $i$ has the successive values 1, 2, 3 . . . etc.) an increment $dy^i$ of a total sum $k_1Z_2+k_2Z_3 \ldots k_nZ_{n+1}$, $Z_2$, $Z_3$ . . . $Z_{n+1}$ being predetermined quantities, $k_1, k_2 \ldots k_n$ being predetermined different weighting constants, and the summation $$\sum_i dy^i$$

being proportional to the total sum, said summing apparatus comprising: a plurality of 1st, 2nd . . . $n$th cyclically operable signal generators for respectively producing 1st, 2nd . . . $n$th trains of bilevel output signals respectively representing in each cycle of operation $i$ corresponding increments $dz_2^i$, $dz_3^i$ . . . $dz_{n+1}^i$ of the quantities $Z_2$, $Z_3$ . . . $Z_n$ respectively, the summations $$\sum_i dz_2^i, \sum_i dz_3^i \ldots \sum_i dz_{n+1}^i$$

being equal to $Z_2$, $Z_3$ . . . $Z_{n+1}$, respectively; a cyclically operable accumulator having a plurality of 1st, 2nd . . . $n$th storage positions for storing bivalued digit signals representing respectively a corresponding plurality of weighted digits having weights $k_1, k_2 \ldots k_n$, respectively, of a stored remainder number $D^i$, said accumulator including decoding apparatus for applying said 1st, 2nd . . . $n$th trains of output signals to said 1st, 2nd . . . $n$th storage positions respectively, said accumulator further including 1st means responsive to said digit signals and to said applied trains of output signals for producing a train of bilevel result signals representing in each cycle of operation a quantized increment $dy^i$ corresponding in magnitude and sign to the sum $$[D^i+k_1dz_2^i+k_2dz_3^i+ \ldots k_ndz_n^i]$$

and second means responsive to said digit signals and to said applied trains of output signals for modifying the stored digit signals in each cycle of operation to represent a next stored remainder number $D^{i+1}$ proportion to $$[D^i+k_1dz_2^i+k_2dz_3^i \ldots k_ndz_{n+1}^i]-dy^i.$$

48. In an electronic digital computer, cyclically operable summing apparatus for forming a train of bilevel result signals representing in each cycle of operation $i$ (where $i$ has the successive values, 1, 2, 3 . . . etc.) an increment $dy^i$ of a total sum $$k_1Z_2+k_2Z_3 \ldots k_nZ_{n+1}, Z_2, Z_3 \ldots Z_{n+1}$$

being predetermined quantities, $k_1, k_2 \ldots k_n$ being predetermined different weighting constants, and the summation $$\sum_i dy^i$$

being proportional to the total sum, said summing apparatus comprising: a plurality of 1st, 2nd . . . $n$th cyclically operable signal generators for respectively producing 1st, 2nd . . . $n$th trains of bilevel output signals respectively representing in each cycle of operation $i$ corresponding increments $dz_2{}^i$, $dz_3{}^i$ . . . $dz_{n+1}{}^i$ of the quantities $Z_2$, $Z_3$ . . . $Z_n$, respectively, the summations $$\sum_i dz_2^i, \sum_i dz_3^i \ldots \sum_i dz_{n+1}^i$$

being equal to $Z_2$, $Z_3$ . . . $Z_{n+1}$ respectively, a 1st cyclically operable serial recirculating memory; 1st apparatus intercoupling said generators and said 1st memory and operable in each cycle of operation $i$ for storing in said 1st memory in predetermined serial order the bilevel output signals representing the increments $$dZ_2{}^i, dZ_3{}^i \ldots dZ_{n+1}{}^i$$

a second cyclically operable serial memory synchronized with said first memory and having a plurality of corresponding 1st, 2nd . . . $n$th storage positions arranged in said memory in predetermined serial order for storing bivalued digit signals representing respectively a corresponding plurality of weighted digits, having weights $k_1$, $k_2$ . . . $k_n$ respectively, of a stored remainder number $D^i$; decoding apparatus intercoupling said 1st and 2nd memories for reading in each cycle of operation the output signals stored in said 1st memory and the digit signals stored in second memory for presenting in said predetermined order the output signals representing the increments $$dZ_2{}^i, dZ_3{}^i \ldots dZ_{n+1}{}^i$$

in coincidence with the digit signals representing the corresponding weighted digits respectively; first means for serially receiving in each cycle of operation the coincidentally presented digit signals and output signals and responsive thereto for producing a train of bilevel output signals representing in each cycle of operation a quantized increment $dy^i$ corresponding to a resultant sum $D^i + k_1 dz_2{}^i + k_2 dz_3{}^i \ldots k_n dZ_n{}^i$; and second means responsive to the coincidentally presented digit signals and output signals to represent a next stored remainder number $D^{i+1}$ proportion to the difference of the resultant sum and the increment $dy^i$.

49. In an electronic digit computer, apparatus for producing a resulant train of bivalued signals representing the weighted sum of a plurality of input quantities, said apparatus comprising: a corresponding plurality of signal generators, for producing respectively a corresponding plurality of output signal trains of bilevel output signals respectively representing the corresponding plurality of input quantities; a cyclically operable accumulator having a corresponding plurality of serially presented storage positions for storing bivalued digit signals representing a corresponding plurality of differently weighted digits respectively of a remainder number, said accumulator including decoding apparatus for applying each of said output signal trains to a different one of said serially presented storage positions, said accumulator further including 1st means responsive to the applied signal trains and the stored digit signals for producing the resultant train of bilevel signals; and 2nd means operable in each cycle of operation of said accumulator in response to the output signals of the applied signal trains and the stored digit signals for modifying the digit signals to represent a new remainder number.

50. In an electronic digital computer, apparatus for producing a resultant signal train representing a resultant rate proportional to the weighted sum of a 1st plurality of input rates, said apparatus comprising: a corresponding 1st plurality of signal generators, for respectively producing a corresponding 1st plurality of output signal trains respectively representing corresponding rates of said 1st plurality of input rates; an accumulator having a 2nd plurality, equal to or exceeding said 1st plurality, of successive counting stages, each stage being operable for receiving a signal train applied thereto by the preceding stage, representing a sum rate of the preceding stage, and responsive to application of a signal train representing an input rate for combining the two applied signal trains to produce a sum signal train representing a sum rate equal to a predeterminedly scaled sum of the rates represented by the two applied signal trains, and for applying said sum signal train to the succeeding stage; 1st means coupled to said 1st plurality of signal generators for applying each of said output signal trains to a different one of said stages of said accumulator; and 2nd means coupled to at least the last stage of said 2nd plurality of successive stages and responsive to the sum signal trains produced by the stages to which it is coupled for producing the resultant signal train.

51. In an electronic computer for performing a plurality of operations upon bivalued information signals in accordance with a corresponding plurality of combinations of front panel switch signals and electronic switch signals, the combination comprising: a cyclically operable memory device for storing bivalued information signals to be operated upon, said memory device including write means, read means, and means for producing at said read means after a predetermined time delay each information signal applied to said write means; signal generating means responsive to said switch signals for generating a bivalued control signal having either a first value or a second value; and transfer means coupled between said read and write means and responsive to said control signal, for applying to said write means each signal produced at said read means, unchanged when said control signal has said first value and complemented when said control signal has said second value; said read means including a flip-flop L producing complementary output signals L and L'; said write means including a flip-flop N having input conductors SM and ZM for setting and zeroing flip-flop N, respectively, upon application of a signal thereto; and said transfer means including first and second logical gating circuits for applying signals to said SM and ZM input conductors, respectively; said first and second gating circuits being respectively mechanized in accordance with the Boolean equations:

$$SM = LX + L'X'$$

$$ZM = L'X + LX'$$

where the symbol $+$ indicates a logical "or" operation, the absence of the symbol $+$ indicates a logical "and" operation, X and X' represent said bivalued control signal, and SM and ZM represent the signals produced by said first and second gating circuits, respectively.

References Cited in the file of this patent

UNITED STATES PATENTS

| | | |
|---|---|---|
| 2,540,654 | Cohen | Feb. 6, 1951 |
| 2,609,143 | Stibitz | Sept. 2, 1952 |
| 2,643,820 | Williams | June 30, 1953 |
| 2,701,095 | Stibitz | Feb. 1, 1955 |
| 2,715,997 | Hill | Aug. 23, 1955 |
| 2,749,037 | Stibitz | June 5, 1956 |
| 2,771,595 | Hendrickson | Nov. 20, 1956 |
| 2,776,794 | Williams | Jan. 8, 1957 |
| 2,787,416 | Hansen | Apr. 2, 1957 |
| 2,792,987 | Stibitz | May 21, 1957 |
| 2,841,328 | Steele et al. | July 1, 1958 |

FOREIGN PATENTS

| | | |
|---|---|---|
| 162,263 | Australia | Mar. 30, 1955 |
| 731,140 | Great Britain | June 1, 1955 |
| 1,055,460 | France | Oct. 14, 1953 |
| 745,816 | Great Britain | Mar. 7, 1956 |

(Other references on following page)

FOREIGN PATENTS 1,094,570    France _____ Dec. 8, 1954
1,095,026    France _____ Dec. 15, 1954

OTHER REFERENCES

Palevsky: "The Design of the Bendix Digital Differential Analyzer," Proc. of the I.R.E., October 1953, pp. 1352–1356.

Functional Description of EDVAC, University of Pennsylvania, Moore School of Engineering, Jan. 11, 1949; vol. II, Figs. 104–3LD–2 and 104–3LC–3; vol. I, pp. 4–10 through 4–18.

Progress Report #2, The Computation Laboratory, Harvard University, Cambridge, Mass., pp. III–13 to 23. Received U.S. Patent Office Dec. 5, 1952.